United States Patent
Montoya et al.

(10) Patent No.: US 10,901,240 B2
(45) Date of Patent: Jan. 26, 2021

(54) ELECTRO-OPTIC BEAM CONTROLLER AND METHOD

(71) Applicant: Massachusetts Institute of Technology, Cambridge, MA (US)

(72) Inventors: Juan Montoya, Belmont, MA (US); Daniel Ripin, Needham, MA (US); Christopher Aleshire, Lexington, MA (US); Dale Martz, Medford, MA (US); Peter Colin Reeves-Hall, Northbridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 198 days.

(21) Appl. No.: 15/396,280

(22) Filed: Dec. 30, 2016

(65) Prior Publication Data
US 2017/0299900 A1 Oct. 19, 2017

Related U.S. Application Data

(60) Provisional application No. 62/291,007, filed on Feb. 4, 2016.

(51) Int. Cl.
*G02F 1/29* (2006.01)
*G02F 1/01* (2006.01)
(Continued)

(52) U.S. Cl.
CPC .......... *G02F 1/0115* (2013.01); *G02F 1/0121* (2013.01); *G02F 1/29* (2013.01);
(Continued)

(58) Field of Classification Search
CPC .. G02B 6/2821; G02B 6/2826; G02B 6/2856; G02F 2203/24; G02F 2201/58;
(Continued)

(56) References Cited

U.S. PATENT DOCUMENTS 5,129,041 A * 7/1992 Pernick ................ G06N 3/0675
706/40
6,351,579 B1 * 2/2002 Early ..................... G02B 6/351
385/16
(Continued)

FOREIGN PATENT DOCUMENTS

EP 2372420 A1 5/2011
EP 2597792 A1 5/2013
(Continued)

OTHER PUBLICATIONS

Belforte, D., "Revenues increase despite mixed global manufacturing growth" [online], Jan. 26, 2015 [retrieved on Feb. 22, 2017] Retrieved from the Internet URL: http://www.industrial-lasers.com/articles/print/volume-30/issue-1/features/fiber-lasers-continue-growth-streak-in-2014-laser-market-revenues-increase-despite-mixed-global-manufacturing-growth.html.
(Continued)

*Primary Examiner* — Akm E Ullah
(74) *Attorney, Agent, or Firm* — Hamilton, Brook, Smith & Reynolds, P.C.

(57) ABSTRACT

An electro-optic beam controller, material processing apparatus, or optical amplifier, and corresponding methods, can include an actively controlled, waveguide-based, optical spatial mode conversion device. The conversion device can include a coupler, which can be a photonic lantern, configured to combine light beams into a common light beam; a sensor configured to measure at least one characteristic of the common light beam; and a controller configured to modulate optical parameters of the individual, respective light beams to set one or more spatial modes of the common light beam. Actively controlled and modulated devices can be used to maintain a stable, diffraction-limited beam for use in an amplification, communications, imaging, laser radar, switching, or laser material processing system. Embodi- (Continued)

ments can also be used to maintain a fundamental or other spatial mode in an optical fiber even while scaling to kilowatt power.

22 Claims, 26 Drawing Sheets
(8 of 26 Drawing Sheet(s) Filed in Color)

(51) Int. Cl.
*H01S 3/00* (2006.01)
*G02B 6/28* (2006.01)

(52) U.S. Cl.
CPC ............ *H01S 3/005* (2013.01); *G02B 6/2804* (2013.01); *G02B 6/2821* (2013.01); *G02B 6/2826* (2013.01); *G02B 6/2856* (2013.01); *G02F 2201/02* (2013.01); *G02F 2201/05* (2013.01); *G02F 2201/58* (2013.01); *G02F 2203/24* (2013.01)

(58) Field of Classification Search
CPC ........ G02F 1/0115; G02F 1/29; G02F 1/0121; H01S 3/005
See application file for complete search history.

(56) References Cited

U.S. PATENT DOCUMENTS

| | | | |
|---|---|---|---|
| 6,678,294 B1 | 1/2004 | Komine et al. | |
| 6,708,003 B1* | 3/2004 | Wickham | H04B 10/1121 398/102 |
| 7,265,502 B1* | 9/2007 | Chou | H05B 47/12 315/291 |
| 9,134,538 B1* | 9/2015 | Augst | G02B 27/106 |
| 9,625,935 B2* | 4/2017 | Olson | G05G 9/047 |
| 9,647,426 B1* | 5/2017 | Fish | H04B 10/505 |
| 10,374,379 B2* | 8/2019 | Augst | H01S 3/06754 |
| 2008/0180787 A1 | 7/2008 | DiGiovanni | |
| 2010/0195195 A1 | 8/2010 | Nelson et al. | |
| 2011/0024927 A1 | 2/2011 | Galvanauskas | |
| 2011/0032604 A1* | 2/2011 | Rothenberg | G02B 6/02042 359/341.4 |
| 2011/0261580 A1 | 10/2011 | Seo et al. | |
| 2012/0014397 A1* | 1/2012 | Chann | H01S 3/1307 372/18 |
| 2015/0010265 A1* | 1/2015 | Popovich | G02F 1/13342 385/10 |
| 2016/0139266 A1* | 5/2016 | Montoya | G01S 7/4816 356/5.01 |
| 2017/0280211 A1* | 9/2017 | Damaghi | H04J 14/04 |
| 2018/0217409 A1* | 8/2018 | Kliner | G02B 6/4296 |

FOREIGN PATENT DOCUMENTS

| | | |
|---|---|---|
| WO | 1999/042871 A1 | 8/1999 |
| WO | 2013/160902 A1 | 10/2013 |

OTHER PUBLICATIONS

Birks, T. A., et al., ""Photonic lantern" spectral filters in multi-core fibre", *Optics Express*, vol. 20; No. 13; 13996-14008 (2012).
Birks, T. A., et al., "The photonic lantern", *Advances in Optics and Photonics*, vol. 7; 107-167 (2015).
Black, R. J. and Gagnon, L., "Optical Waveguide Modes: Polarization, Coupling and Symmetry", *Multicore Fibers and Multifiber Couplers*, Access Engineering; (McGraw-Hill, 2010).
Bland-Hawthorn, J., et al., "A complex multi-notch astronomical filter to suppress the bright infrared sky", *Nature Comm.*, DCI: 10.1038/ncomms15B4; 15 pages (2011).
Burns, W. K., Waveguide transitions and junctions, in Guided-Wave Optoelectronics edited by Tamir, T.; Springer Series in Electronics and Photonics 26; p. 125 (1988).
Duocastella, M. and Arnold, C. B., "Bessel and annular beams for materials processing", *Laser Photonics*, Rev. 6; No. 5; 607-621 (2012).
Eidam, T., et al., "Experimental observations of the threshold-like onset of mode instabilities in high power fiber amplifiers", *Optics Express*, vol. 19; No. 14; 13218-13224 (2011).
Fan, T. S., "The Effect of Amplitude (Power) Variations on Beam Combining Efficiency for Phased Arrays", *IEEE Journal of Selected Topics in Quantum Electronics*, vol. 15; No. 2; 291-293 (2009).
Flamm, D., et al., "Mode analysis with a spatial light modulator as a correlation filter", *Optics Letters*, vol. 37; No. 13; 2478-2480 (2012).
Fontaine, N. K., et al., "Geometric requirements for photonic lanterns in space division multiplexing", *Optics Express*, vol. 20; No. 24; 27123-27132 (2012).
Goodno, G. D., et al., "Perturbative analysis of coherent combining efficiency with mismatched lasers", *Optics Express*, vol. 18; No. 24; 25403-25414 (2010).
Hansen, K. R., et al., "Thermally induced mode coupling in rare-earth doped fiber amplifiers", *Optics Letters*, vol. 37; No. 12; 2382-2384 (2012).
Jansen, F., et al., "Thermally induced waveguide changes in active fibers", *Optics Express*, vol. 20; No. 4; 3997-4008 (2012).
Jauregui, C., et al., "High-power fibre lasers," *Nat. Photonics*, vol. 7; No. 11; 861-867 (2013).
Leon-Saval, S. G., et al., "Photonic lanterns: a study of light propagation in multimode to single-mode converters", *Optics Express*, vol. 18; No. 8; 8430-8439 (2010).
Leon-Saval, S. G., et al., "Multimode fiber devices with single-mode performance," *Optics Letters*, vol. 30; No. 19; 2545-2547 (2005).
Miller, D. A. B., "All linear optical devices are mode converters", *Optics Express*, vol. 20; No. 21; 23985-23993 (2012).
Mitchell, P., et al., "57 Channel (19x3) Spatial Multiplexer Fabricated using Direct Laser Inscription", *Optical Fiber Communication Conference; OSA Technical Digest (online)*; M3K.5; 3 pages (2014).
Montoya, J., et al., "External cavity beam combining of 21 semiconductor lasers using SRGD", *Applied Optics*, vol. 51; No. 11; 1724-1728 (2012).
Montoya, J., et al., "Optical phased-array ladar", *Applied Optics*, vol. 53; No. 31; 7551-7555 (2014).
Montoya, J., et al., "Photonic lantern adaptive spatial mode control in LMA fiber amplifiers", *Optical Society of America*, vol. 24; No. 4; 3405-3413 (2016).
Nesterov, A. V. and Niziev, V. G., "Laser beams with Axially Symmetric Polarization", *Journal of Physics D Applied Physics*, vol. 33; 1817-1822 (2000).
Noordegraaf, D., et al., "Efficient multi-mode to single-mode coupling in a photonic lantern", *Optics Express*, vol. 17; No. 3; 1988-1994 (2009).
Otto, H., et al., "Temporal dynamics of mode instabilities in high-power fiber lasers and amplifiers", *Optics Express*, vol. 20; No. 14; 15710-15722 (2012).
Otto, H., "Controlling mode instabilities by dynamic mode excitation with an acousto-optic deflector", *Optics Express*, vol. 21; No. 14; 17285-17298 (2013).
Overton, G., et al., "Laser Marketplace 2015: Lasers surround us in the Year of the Light" [online], Jan. 16, 2015 [retrieved on Feb. 22, 2017] Retrieved from the Internet URL: http://www.laserfocusworld.com/articles/print/volume-51/issue-01/features/laser-marketplace-2015-lasers-surround-us-in-the-year-of-light.html.
Redmond, S. M., et al., "Diffractive coherent combining of a 2.5 kW fiber laser array into a 1.9 kW Gaussian beam," *Optics Letters*, vol. 37; No. 14; 2832-2834 (2012).
Schulze, C., et al., "Measurement of higher-order mode propagation losses in effectively single mode fibers," *Optics Letters*, vol. 38; No. 23; 4958-4961 (2013).
Schulze, C., et al., "Mode Coupling in Few-Mode Fibers Induced by Mechanical Stress," *J. Lightwave Technol.*, vol. 33; No. 21; 4488-4496 (2015).
Smith, A. V. and Smith, J. J., "Mode instability in high power fiber amplifiers", *Optics Express*, vol. 19; No. 11; 10180-10192 (2011).

(56) References Cited

OTHER PUBLICATIONS

Veldkamp, W. B., et al., "Coherent summation of laser beams using binary phase gratings," *Optics Letters*, vol. 11; No. 5; 303-305 (1986).
Vorontsov, M. A., et al., "Adaptive phase-distortion correction based on parallel gradient-descent optimization," *Optics Letters*, vol. 22; No. 12; 907-909 (1997).
Ward, B., et al., "Origin of thermal modal instabilities in large mode area fiber amplifiers", *Optics Express*, vol. 20; No. 10; 11407-11422 (2012).
Yu, C. X., et al., "Coherent combining of a 4 kW, eight-element fiber amplifier array," *Optics Letters*, vol. 36; No. 14; 2686-2688 (2011).
International Search Report and Written Opinion for International Application No. PCT/US2017/012819, entitled: "Optical Spatial Mode Control," dated Nov. 7, 2017.
Montoya, J., et al., "Photonic lantern adaptive spatial mode control in LMA fiber amplifiers using SPGD," Optical Society of America, 8 pages (2015).
Richardson, D.J., et al., "Space-division multiplexing in optical fibres," Nature Photonics, vol. 7; 354-362 (2013).
Notification Concerning Transmittal of the International Preliminary Report on Patentability and Written Opinion of the International Searching Authority for Application No. PCT/US2017/012819, entitled "Devices and Methods for Optical Spatial Mode Control," dated Aug. 16, 2018.

\* cited by examiner

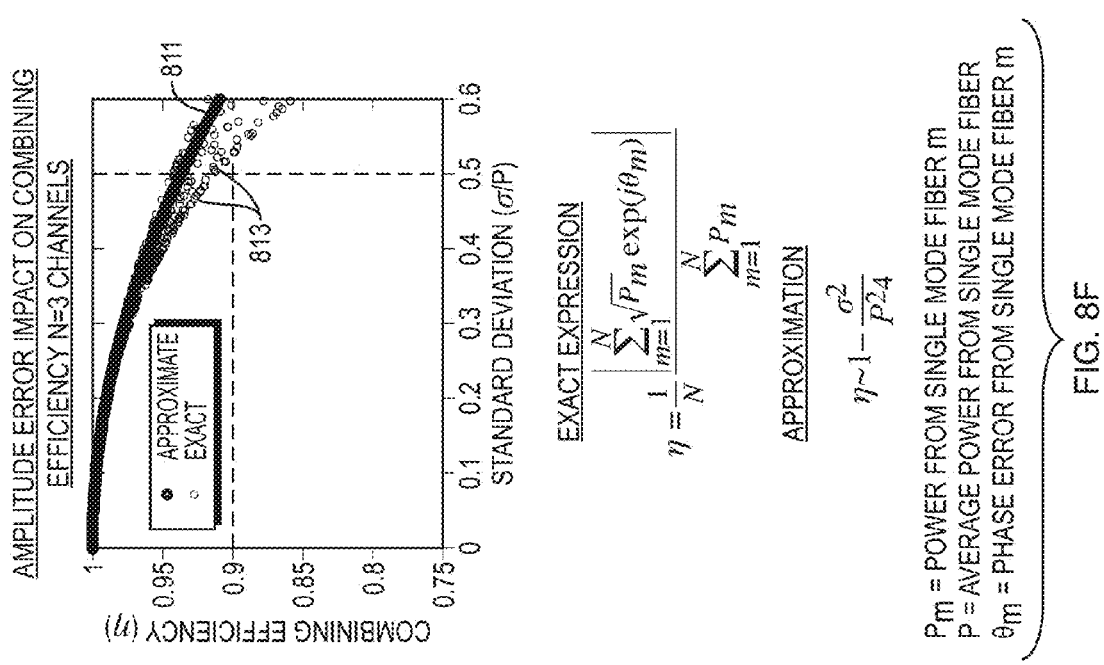
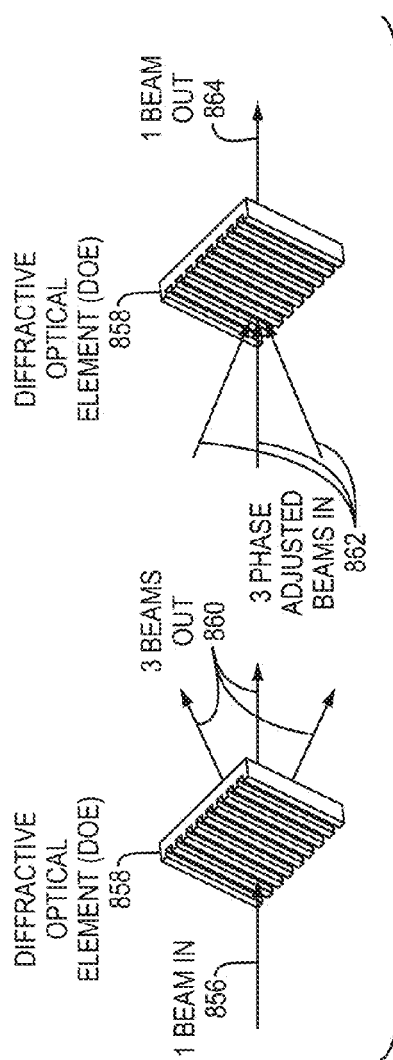
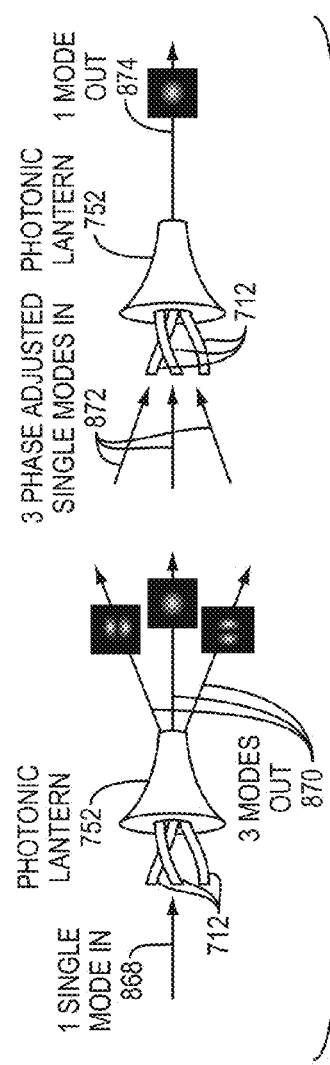

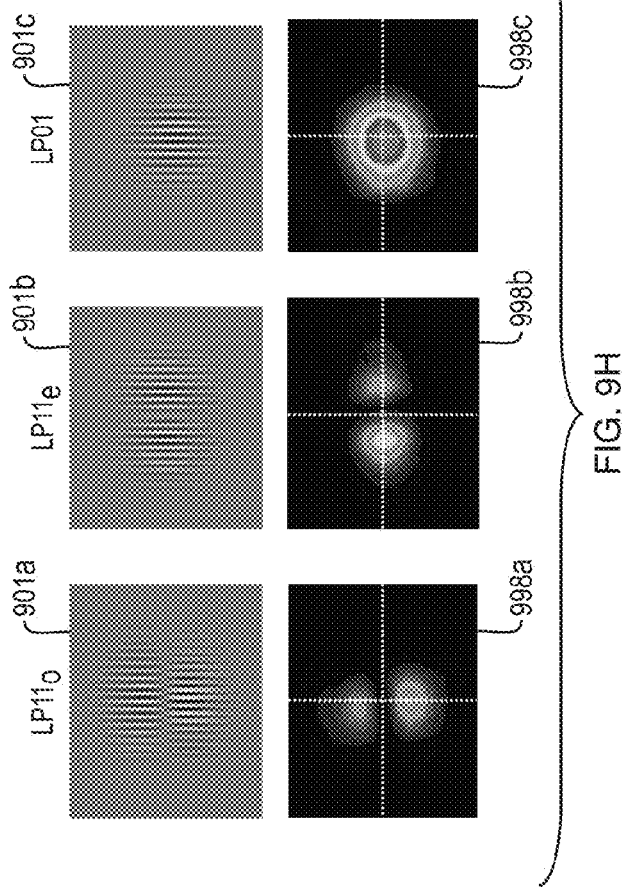
FIG. 9G
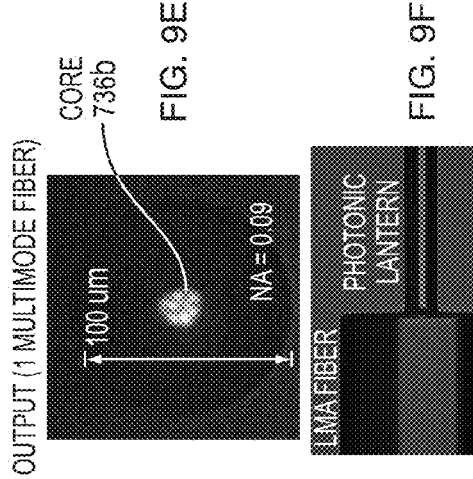
FIG. 9H
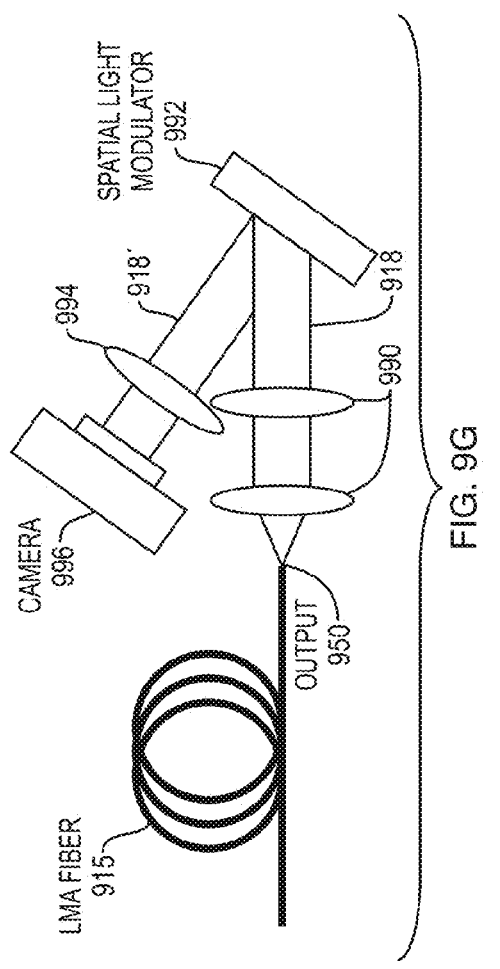
FIG. 9D
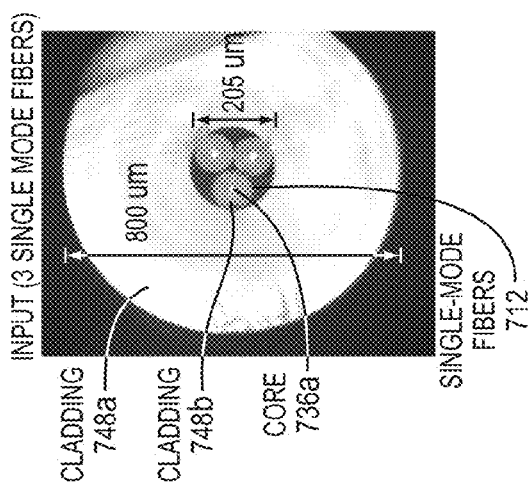
FIG. 9E
FIG. 9F

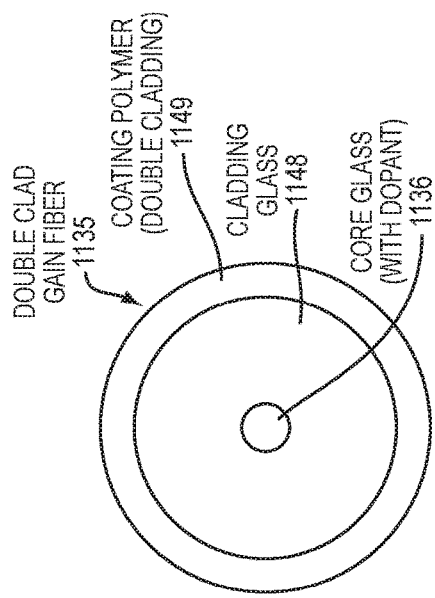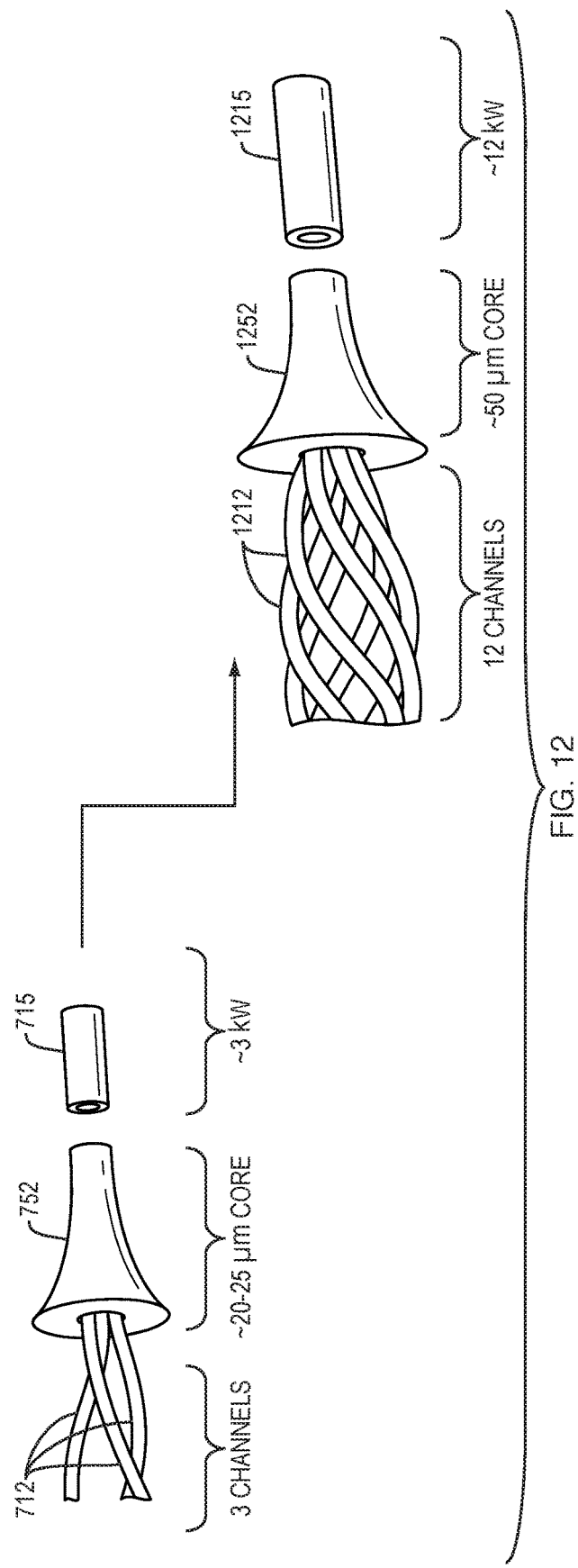

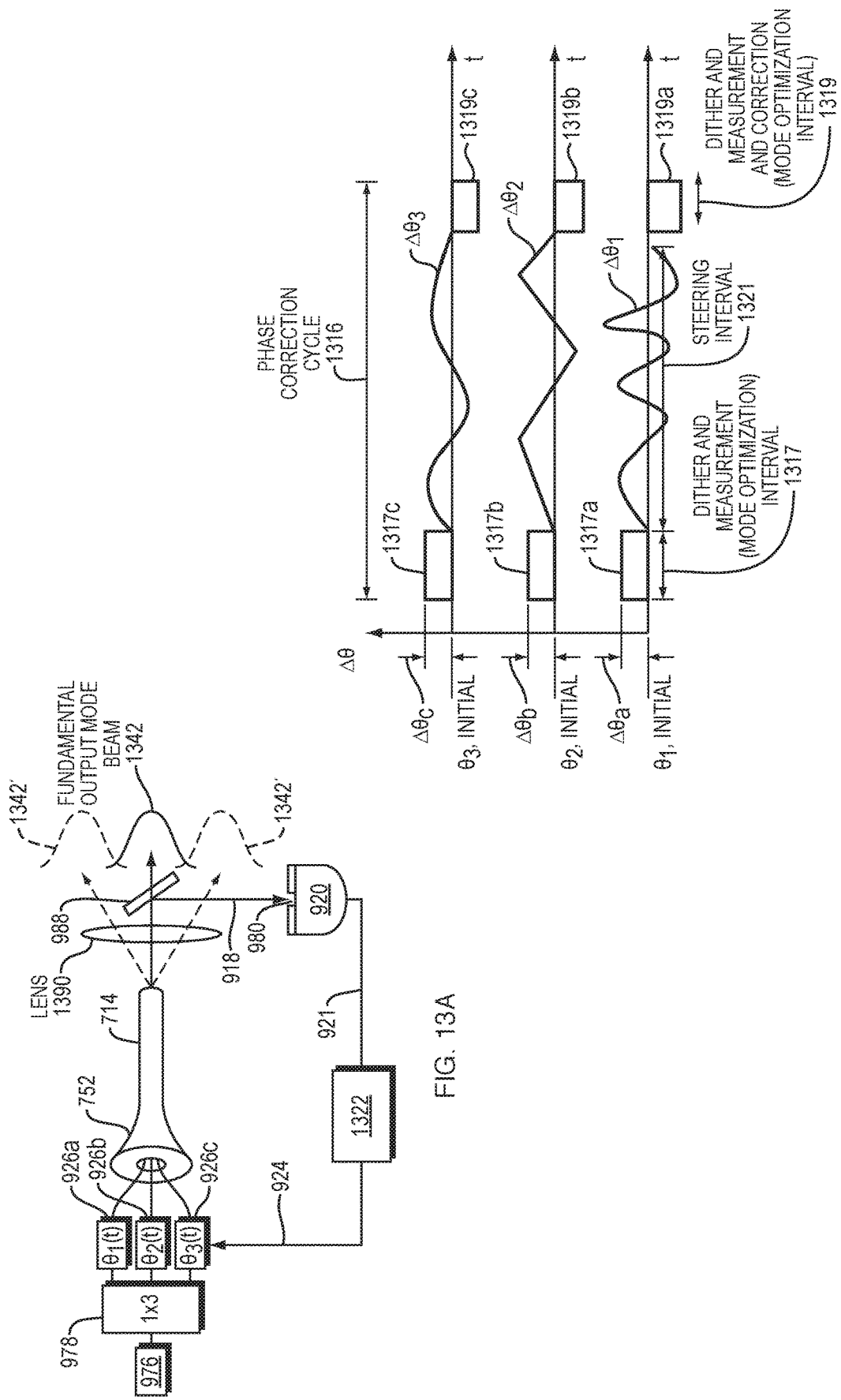

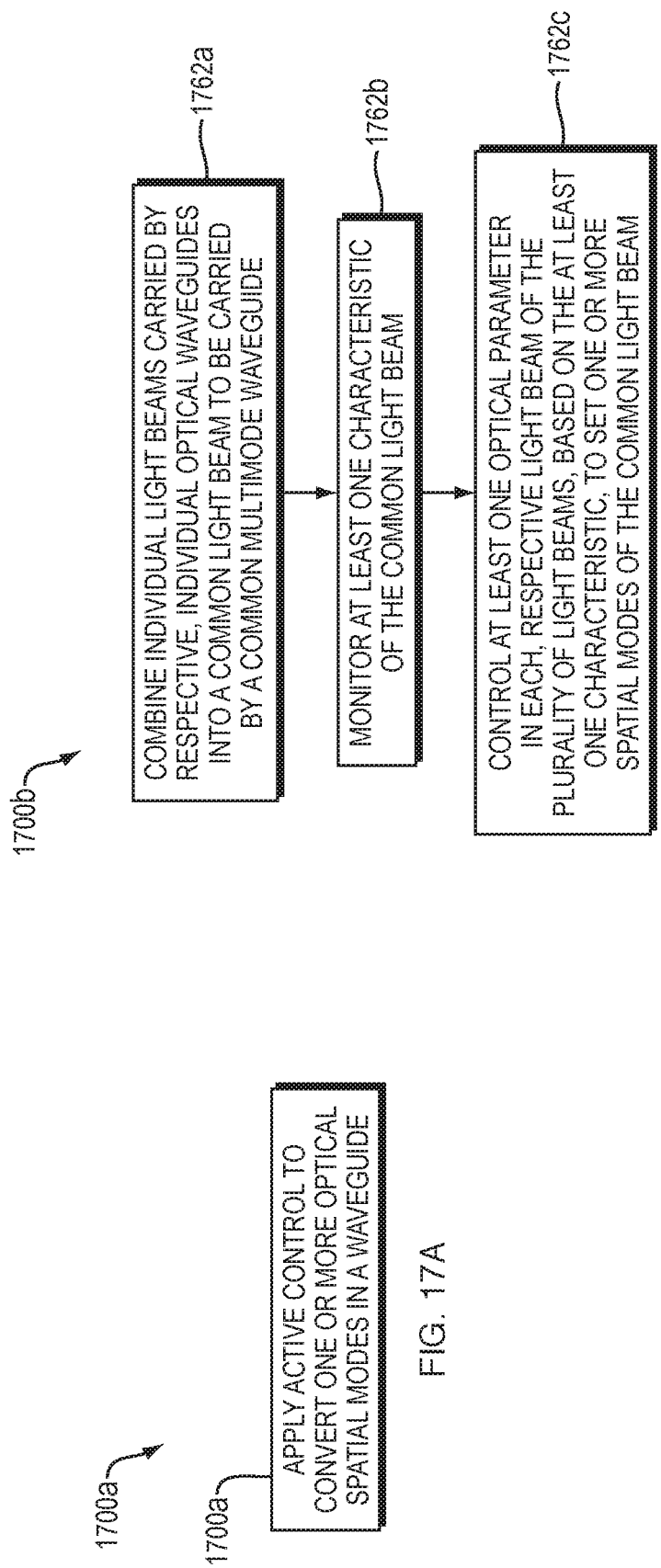

ELECTRO-OPTIC BEAM CONTROLLER AND METHOD

RELATED APPLICATION

This application claims the benefit of U.S. Provisional Application No. 62/291,007, filed on Feb. 4, 2016. The entire teachings of the above Application are incorporated herein by reference.

GOVERNMENT SUPPORT

This invention was made with government support under Contract #FA8721-05-C-0002 from The United States Airforce. The government has certain rights in the invention.

BACKGROUND

Adaptive optical correction is prevalent in a variety of optical systems. As a beam propagates through optical disturbances, the wavefront of the beam degrades. Examples of optical disturbances include propagation through turbulent media including atmospheric or biological tissue, thermal lensing in optical glasses, and reflection from non-flat surfaces. Adaptive optical correction typically involves using a free-space optic, such as a deformable mirror or spatial light modulator, to pre-distort the beam such that the desired beam is achieved after propagating through the distorting medium.

One field in which adaptive optical correction is relevant and has been applied is in fiber amplifiers. Fiber amplification has shown significant progress, as evidenced by the commercial availability of kilowatt class amplifiers. Power scaling beyond the kilowatt class has also been achieved by coherently combining several fiber amplifiers in a process referred to as coherent beam combination (CBC), which has allowed for adaptive wavefront variation in some cases. A larger aperture, with less power per unit area, can be achieved through synthesis of several sub apertures. Scaling the modal area of an individual power amplifier can similarly serve to reduce intensity. The lowering of optical intensity through modal area scaling by the use of large mode area (LMA) fibers has suppressed a number of nonlinearities. This suppression has resulted, in part, in the successful power scaling of existing fiber amplifiers.

SUMMARY

Transverse mode (spatial mode) instability (TMI) (sometimes referred to as multimode instability, MMI) still imposes significant limitations on the scaling of modal area of an individual optical fiber, such as a fiber amplifier. Conventionally, large mode area (LMA) fibers have been coiled to maintain single-mode operation by filtering out higher order spatial modes. However, significant limitations have been observed with fiber coiling methods due to thermally induced nonlinearities that drive modal power coupling within the fiber, despite the relatively large higher-order mode losses that can be achieved. Moreover, fibers cannot be bent or coiled arbitrarily due to issues of mode distortion, shrinking, and bend loss. The larger the fiber core, the more critical these issues can become.

Furthermore, free-space-based methods of coherent beam combination (CBC) have significant limitations because of system size, complexity, and alignment tolerances. Spatial light modulators, for example, tend to have power handling limitations and are generally less efficient and robust due to Fresnel losses and mode mismatch incurred using free-space optics. In particular, it is difficult to achieve and maintain proper mode matching due to the spatial alignment tolerances in these types of free-space optical combiners. Thus, new methods and systems are needed both to scale fiber amplifier power and to control optical spatial modes in a light beam, such as maintaining a diffraction-limited beam and a fundamental mode, even in turbulent media without the use of free-space optics.

Electro-optic beam controllers, and corresponding methods, as disclosed herein, allow the generation of any mode or sets of modes in a multimode fiber that are desired. Disclosed embodiments can include using a photonic lantern, a device which maps single-mode fiber inputs to the multiple modes of the fiber output. Disclosed devices and methods can also take advantage of phase modulators, amplitude modulators, and a control system that allow the desired mode or modes to be set and stabilized dynamically (actively). In some implementations, for example, a stochastic parallel gradient descent (SPGD) method can be implemented to modulate phase, amplitude, or both of single-mode fiber inputs to allow launch of an appropriate superposition of modes to achieve a diffraction-limited beam at the output of a multimode fiber. Embodiments can enable fiber power scaling to the kilowatt level (e.g., kilowatts, tens of kilowatts, etc.), for example, even while maintaining a fundamental output mode that is stabilized, without traditional CBC that relies on free-space optics. In addition to fiber power amplification, embodiments are useful in a wide variety of systems including imaging, laser radar (LADAR or LIDAR), directed energy, laser cutting and other material processing applications, beam steering, optical switching, and spatial division multiplexing, for example.

Advantages of using an all fiber-based system or other waveguide-based system can include greater robustness, greater output power, lower size and weight, and greater efficiency.

In one embodiment, an electro-optic beam controller includes an actively controlled, waveguide-based optical spatial mode conversion device. The conversion device can form at least part of at least one of a communications system, imaging system, laser radar system, fiber laser amplifier, or laser material processing system.

The conversion device can include a coupler configured to combine light beams carried by respective, individual, optical waveguides into a common light beam to be carried by a common, multimode optical waveguide. The conversion device may also include a sensor configured to measure at least one characteristic of the common light beam. The conversion device may further include a modulation controller operationally coupled to the sensor and to a plurality of modulators, each modulator of the plurality of modulators configured to modulate at least one optical parameter of one of the respective light beams, the modulation controller being further configured to control the plurality of modulators, based on the at least one characteristic of the common light beam, to set one or more spatial modes of the common light beam.

The coupler can be a waveguide-based optical combiner. The coupler can be a photonic lantern. The respective, individual optical waveguides can include single-mode or multimode optical fibers. The common, multimode optical waveguide is a multimode optical fiber, may be further configured to produce optical gain. The multimode optical fiber can include a fiber core with a diameter in a range of 20 to 200 µm, or in a range of 20 to 50 µm, or in other ranges appropriate for a given waveguide.

The sensor can be a photodiode or photomultiplier tube configured to measure the at least one characteristic of the common light beam after the common light beam exits the common, multimode optical waveguide. The sensor can be a pixel array configured to measure at least one characteristic of the common light beam after the common light beam exits the common, multimode optical waveguide.

The at least one characteristic of the common light beam can be an $M^2$ parameter, a beam profile, or a beam intensity or power of all or a portion of the common light beam. The intensity or power can be an on-axis intensity or power of the common light beam at a center position for a fundamental spatial mode. The controller can further include a mask configured to pass light corresponding to one or more mode shapes of the one or more spatial modes of the common light beam to the sensor.

The modulation controller can be further configured to control the plurality of modulators in accordance with a stochastic parallel gradient descent (SPGD) method. The modulation controller can be a closed-loop controller configured to use the at least one characteristic of the common light beam as a monitored variable and the at least one optical parameter in each respective light beam as a manipulated variable.

The plurality of modulators can include at least one of a phase modulator, amplitude modulator, and polarization modulator. One or more of the modulators can be lithium niobate modulators. The modulation controller can be further configured to control the plurality of modulators by adjusting phase of at least a subset of the respective light beams to steer the common light beam. The modulation controller can be further configured to beam steer the common light beam toward a selected one of an array of multimode optical waveguides to function as an optical switch.

The modulation controller can be further configured to control the plurality of modulators to set a fundamental spatial mode and to suppress other spatial modes in the common, multimode optical waveguide. The fundamental spatial mode can carry between 90% and 100% of a total optical power carried by the common waveguide.

The common light beam can have an optical power on the order of 10 W, on the order of 3 kW, or on the order of 12 kW.

The modulation controller can be further configured to control the plurality of modulators to set a doughnut-shaped (annular) spatial mode of the common light beam. The modulation controller can also be configured to control the plurality of modulators during alternating adjustment and fixed periods, the controller being configured to adjust the plurality of modulators to optimize the one or more set spatial modes of the common light beam during adjustment periods, the controller being further configured to leave the plurality of modulators at constant values during fixed periods. The fixed periods can be on the order of 1 ms, 10, ms, 100 ms, or 1000 ms.

The respective, individual, optical waveguides can be input waveguides, and the waveguide coupler can further include a plurality of individual, optical output waveguides tapered into the common, multimode optical waveguide. The modulation controller can be further configured to set the one or more spatial modes of the common light beam to route the common light beam, selectively, to one or more of the output optical waveguides.

The beam controller may form part of a material processing apparatus. The apparatus can further include one or more delivery optics configured to deliver at least a portion of the common light beam to a material workpiece to be processed.

The one or more delivery optics may include one or more bulk optics or a plurality of discreet optics. The plurality of discreet optics can be configured to direct respective components of the common light beam to respective material work cells to process either the material workpiece alone or the material workpiece as one of a plurality of respective workpieces.

The one or more spatial modes of the common light beam can include at least one non-fundamental spatial mode having a plurality of intensity peaks in a beam intensity profile of the common light beam. The respective components of the common light beam may include respective intensity peaks in the beam profile.

The modulation controller may be further configured to set the one or more spatial modes of the common light beam to control, dynamically, a power distribution among the respective components of the common light beam. The modulation controller may be further configured to control a power distribution of the common light beam synchronous with a relative motion between the one or more delivery optics and the material workpiece. The modulation controller can be further configured to control a power distribution of respective components of the common light beam for use at different work cells at different times.

The modulation controller can be further configured to control the plurality of modulators to adjust a beam product parameter (BPP) or beam intensity profile to optimize processing of the material workpiece, selectively, with respect to a material type or material thickness of the material workpiece or with respect to a relative motion between the one or more delivery optics and the material workpiece. The modulation controller can be further configured to control the plurality of modulators to adjust the BPP or beam intensity profile dynamically during a cutting, welding, brazing, hole drilling, or other material processing operation applied to the material workpiece. The modulation controller may be further configured to adjust the plurality of modulators to minimize a back reflection of the common light beam.

The respective, individual, optical waveguides can be input waveguides, and the waveguide coupler can further include a plurality of individual, optical output waveguides tapered into the common, multimode optical waveguide. The modulation controller can be further configured to set the one or more spatial modes of the common light beam to route the common light beam selectively to one or more of the output optical waveguides. The plurality of modulators may be phase modulators, and the modulation controller can be further configured to control the phase modulators to modulate an amplitude of the common light beam.

In another embodiment, a method of electro-optically controlling a beam includes applying active control to convert one or more optical spatial modes in a waveguide. Applying active control can include converting the one or more optical spatial modes in at least one of a communications system, imaging system, laser radar system, fiber laser amplifier, or laser material processing system.

Applying active control can include combining individual light beams carried by respective, individual optical waveguides into a common light beam to be carried by a common multimode waveguide. Applying active control may also include monitoring at least one characteristic of the common light beam. Applying active control may further include controlling at least one optical parameter in each, respective light beam of the plurality of light beams, based on the at least one characteristic of the common light beam, to set one or more spatial modes of the common light beam.

Combining the plurality of light beams into the common light beam can include using a waveguide-based optical coupler and can include using a photonic lantern. Combining the individual light beams carried by the plurality of respective, individual optical waveguides can include combining the individual light beams from single-mode or multimode optical fibers and can also include combining into a multimode optical fiber. Combining into the multimode optical fiber can include using a multimode optical fiber configured to produce optical gain. Combining into the common light beam to be carried by the multimode waveguide can include combining into a multimode optical fiber having a fiber core of diameter in a range of 20 to 200 µm or in a range of 20 to 50 µm, or in other ranges appropriate for a given waveguide. Combining individual light beams into the common light beam includes combining to produce an optical power on the order of 10 W, on the order of 3 kW, or on the order of 12 kW, or other powers achievable with a given configuration.

Monitoring can include using at least one of a photodiode and a photomultiplier tube (PMT) to measure at least one characteristic of the common light beam after the common light beam exits the common, multimode waveguide. Monitoring the at least one characteristic of the common light beam can include using a pixel array to measure the at least one characteristic of the common light beam after the common light beam exits the common, multimode waveguide.

Monitoring the at least one characteristic of the common light beam can include measuring an $M^2$ parameter, beam profile, power, or intensity of the common light beam. Measuring the intensity or power can include measuring on axis, at a center of a fundamental mode of the common light beam. Monitoring the at least one characteristic can include masking the common light beam with a shape corresponding to the one or more spatial modes of the common light beam to be set.

Controlling at least one optical parameter can include using a stochastic parallel gradient descent (SPGD) method. Controlling can be performed in closed-loop manner, with the at least one characteristic of the common light beam acting as a monitored variable and the at least one optical parameter in each respective light beam acting as a manipulated variable. Controlling at least one optical parameter can include controlling at least one of a phase, amplitude, and polarization of the respective light beam. Controlling at least one optical parameter can further include using one or more lithium niobate modulators.

Controlling can include modifying phase of at least a subset of the respective light beams to beam steer the common light beam, and controlling may further include selecting phase in each, respective light beam to optically switch the common light beam to a selected one of an array of multimode waveguides. Controlling to set the one or more spatial modes of the common light beam can include setting a fundamental spatial mode of the common light beam and suppressing other spatial modes. Setting the fundamental spatial mode and suppressing other modes can include causing between 90% and 100% of a total optical power carried by the common waveguide to be carried by the fundamental mode. Controlling to set the one or more spatial modes of the common light beam may include setting a doughnut-shaped spatial mode of the common light beam.

Controlling can include alternately adjusting the plurality of modulators to optimize the one or more set spatial modes of the common light beam during adjustment periods and leaving the plurality of modulators at constant values during fixed periods. Fixed periods can be on the order of 1 ms, 10 ms, 100 ms, 1000 ms, or other periods that are deemed appropriate.

Combining may include using respective, individual, input optical waveguides, and controlling may further include setting the one or more spatial modes of the common light beam to route the common light beam, selectively, to one or more of a plurality of individual, output optical waveguides tapered into the common, multimode optical waveguide.

In yet another embodiment, an electro-optic beam controller includes means for applying active control to convert one or more optical spatial modes in a waveguide. The means for applying active control can include: means for combining a plurality of individual light beams into a common light beam; means for monitoring at least one characteristic of the common light beam; and means for controlling at least one optical parameter in each, respective individual light beam of the plurality of individual light beams, based on the at least one characteristic of the common light beam, to set one or more spatial modes of the common light beam.

The method of electro-optically controlling a beam may form part of a method of material processing. The method of material processing may further include delivering at least a portion of the common light beam to a material workpiece to be processed. Delivering may include using one or more bulk delivery optics or a plurality of discreet optics. The plurality of discreet optics can be configured to direct respective components of the common light beam to respective material work cells to process either the material workpiece alone or the material workpiece as one of a plurality of respective workpieces.

The one or more spatial modes of the common light beam can include at least one non-fundamental spatial mode having a plurality of intensity peaks in a beam intensity profile of the common light beam. Delivering can further include directing the intensity peaks in the beam profile to respective material work cells.

Controlling may further include setting the one or more spatial modes of the common light beam to control, dynamically, a power distribution among the respective components of the common light beam. Delivering can include using one or more delivery optics, and controlling can include synchronizing a power distribution of the common light beam with a relative motion between the one or more delivery optics and the material workpiece. Controlling may further include setting a power distribution of the common light beam for use of the common light beam at different work cells at different times.

Controlling can further include adjusting a beam product parameter (BPP) or beam intensity profile to optimize processing of the material workpiece, selectively, with respect to (i) a material type or material thickness of the material workpiece, or (ii) with respect to a relative motion between the material workpiece and one or more delivery optics used to deliver the common light beam to the material workpiece. Controlling may include adjusting the BPP or beam intensity profile dynamically during a cutting, welding, brazing, hole drilling, or other material processing operation applied to the material workpiece. Controlling can further include adjusting the one or more spatial modes to minimize a back reflection of the common light beam.

Combining can include using respective, individual, input optical waveguides; and controlling can further include setting the one or more spatial modes of the common light beam to route the common light beam, selectively, to one or more of a plurality of individual, output optical waveguides tapered into the common, multimode optical waveguide.

The plurality of modulators may be phase modulators, and controlling can further include adjusting the phase modulators to modulate an amplitude of the common light beam.

In another embodiment, a material processing apparatus includes an actively controlled, waveguide-based optical spatial mode conversion device configured to output a common light beam; and one or more delivery optics configured to deliver at least a portion of the common light beam to a material workpiece to be processed.

The conversion device can include: a coupler configured to combine individual light beams carried by respective, individual, optical waveguides into the common light beam to be carried by a common, multimode optical waveguide; a sensor configured to measure at least one characteristic of the common light beam; and a modulation controller operationally coupled to the sensor and to a plurality of modulators, each modulator of the plurality of modulators configured to modulate at least one optical parameter of one of the respective light beams, the modulation controller being further configured to control the plurality of modulators, based on the at least one characteristic of the common light beam, to set one or more spatial modes of the common light beam.

The one or more spatial modes of the common light beam may include at least one non-fundamental spatial mode having a plurality of intensity peaks in a beam intensity profile of the common light beam, and the respective components of the common light beam can include respective intensity peaks in the beam profile. The modulation controller can be further configured to set the one or more spatial modes of the common light beam to control, dynamically, a power distribution among the respective components of the common light beam.

The modulation controller can be further configured to control a power distribution of the common light beam synchronous with a relative motion between the one or more delivery optics and the material workpiece. The modulation controller can be further configured to control a power distribution of respective components of the common light beam for use at different work cells at different times. The modulation controller can be further configured to control the plurality of modulators to adjust a beam product parameter (BPP) or beam intensity profile to optimize processing of the material workpiece, selectively, with respect to a material type or material thickness of the material workpiece or with respect to a relative motion between the one or more delivery optics and the material workpiece.

The modulation controller can be further configured to control the plurality of modulators to adjust a BPP or beam intensity profile dynamically during a cutting, welding, brazing, hole drilling, or other material processing operation applied to the material workpiece. The modulation controller can be further configured to adjust the plurality of modulators to minimize a back reflection of the common light beam.

The one or more delivery optics can include one or more bulk optics or a plurality of discreet optics configured to direct respective components of the common light beam to respective material work cells to process either the material workpiece alone or the material workpiece as one of a plurality of respective workpieces.

In another embodiment, a method of material processing can include: applying active control to convert one or more optical spatial modes in a waveguide; and delivering at least a portion of a common light beam output from the waveguide to a material workpiece to be processed.

Applying active control can include: combining a plurality of individual light beams carried by respective, individual optical waveguides into the common light beam to be carried by a common multimode waveguide; monitoring at least one characteristic of the common light beam; and controlling at least one optical parameter in each, respective, individual light beam of the plurality of light beams, based on the at least one characteristic of the common light beam, to set one or more spatial modes of the common light beam.

The one or more spatial modes of the common light beam can include at least one non-fundamental spatial mode having a plurality of intensity peaks in a beam intensity profile of the common light beam. Delivering can further include directing the intensity peaks in the beam profile to respective material work cells.

Controlling can further include setting the one or more spatial modes of the common light beam to control, dynamically, a power distribution among the respective components of the common light beam.

Delivering can also include using one or more delivery optics, and controlling can include synchronizing a power distribution of the common light beam with a relative motion between the one or more delivery optics and the material workpiece.

Controlling can further include: setting a power distribution of the common light beam for use of the common light beam at different work cells at different times; adjusting a beam product parameter (BPP) or beam intensity profile to optimize processing of the material workpiece, selectively, with respect to a material type or material thickness of the material workpiece or with respect to a relative motion between the material workpiece and one or more delivery optics used to deliver the common light beam to the material workpiece; adjusting a BPP or beam intensity profile dynamically during a cutting, welding, brazing, hole drilling, or other material processing operation applied to the material workpiece; or adjusting the one or more spatial modes to minimize a back reflection of the common light beam.

Delivering may include using one or more bulk delivery optics; or using a plurality of discreet optics configured to direct respective components of the common light beam to respective material work cells to process either the material workpiece alone or the material workpiece as one of a plurality of respective workpieces.

In another embodiment, a material processing apparatus can include: means for applying active control to convert one or more optical spatial modes in a waveguide; and means for delivering at least a portion of a common light beam output from the waveguide to a material workpiece to be processed.

In another embodiment, an optical amplifier can include: an actively controlled, waveguide-based optical spatial mode conversion device configured to provide a common light beam; and a waveguide-based amplifier configured to receive and amplify at least a portion of the common light beam to produce an amplified common light beam.

The amplified common light beam can have an optical power on the order of 10 W, 3 kW, or 12 kW.

The optical amplifier can further include: a waveguide coupler configured to combine individual light beams carried by respective, individual, optical waveguides into the common light beam to be carried by a common, multimode optical waveguide; a sensor configured to measure at least one characteristic of the amplified common light beam; and a modulation controller operationally coupled to the sensor and to a plurality of modulators, each modulator of the plurality of modulators configured to modulate at least one optical parameter of the respective, individual light beams, the modulation controller being further configured to control the plurality of modulators, based on the at least one characteristic of the amplified common light beam, to set one or more spatial modes of the waveguide-based amplifier.

The respective, individual optical waveguides can include single-mode or multimode optical fibers. The plurality of modulators can include at least one of a phase modulator, amplitude modulator, and polarization modulator.

The modulation controller can be further configured to: control the plurality of modulators to set a fundamental spatial mode and to suppress other spatial modes of the amplified common light beam; or control the plurality of modulators to set a doughnut-shaped spatial mode of the amplified common light beam. The respective, individual, optical waveguides can be input waveguides, and the waveguide coupler can further include a plurality of individual, optical output waveguides tapered into the common, multimode optical waveguide, and the modulation controller can be further configured to set the one or more spatial modes of the amplified common light beam to route the amplified common light beam selectively to one or more of the output optical waveguides.

The individual light beams carried by the respective, individual, optical waveguides can be outputs from one or more photonic lanterns or other waveguide-based beam combiners.

The optical amplifier can further include one or more waveguide-based pre-amplifiers optically upstream from the waveguide coupler and configured to pre-amplify one or more of the individual light beams. The plurality of modulators can be phase modulators, and the modulation controller can be further configured to control the phase modulators to modulate an amplitude of the amplified common light beam.

In another embodiment, a method of optical amplification can include: applying active control to convert one or more optical spatial modes in a waveguide configured to provide a common light beam; and receiving and amplifying at least a portion of the common light beam at a waveguide-based amplifier to produce an amplified common light beam.

Combining individual light beams into the common light beam can include combining to produce an optical power on the order of 10 W, 3 kW, or 12 kW.

Applying active control can include: combining a plurality of individual light beams carried by respective, individual optical waveguides into the common light beam to be carried by a common multimode waveguide; monitoring at least one characteristic of the amplified common light beam; and controlling at least one optical parameter in each, respective individual light beam of the plurality of individual light beams, based on the at least one characteristic of the amplified common light beam, to set one or more spatial modes of the amplified common light beam.

Combining the individual light beams carried by the plurality of respective, individual optical waveguides can include combining the individual light beams from single-mode or multimode optical fibers.

Controlling at least one optical parameter can include controlling at least one of a phase, amplitude, and polarization of the respective individual light beam. Controlling to set the one or more spatial modes of the amplified common light beam can include setting a fundamental spatial mode of the amplified common light beam and suppressing other spatial modes; or setting a doughnut-shaped spatial mode, or one or more other spatial modes, of the amplified common light beam.

The respective, individual, optical waveguides can be input waveguides, and controlling can further include setting the one or more spatial modes of the amplified common light beam to route the amplified common light beam selectively to one or more output optical waveguides tapered into the common, multimode optical waveguide.

The method can further include: receiving the plurality of individual light beams carried by respective, individual optical waveguides from one or more photonic lantern outputs; or pre-amplifying one or more of the individual light beams at one or more waveguide-based pre-amplifiers optically upstream from the waveguide coupler.

Controlling can further include adjusting the phase modulators to modulate an amplitude of the amplified common light beam.

In yet another embodiment, an optical amplifier includes a waveguide coupler configured to combine light beams carried by respective, individual, optical waveguides into a common light beam to be carried by a common, multimode optical waveguide, wherein at least a portion of the common, multimode optical waveguide is configured to effectuate optical amplification of the common light beam to produce an amplified common light beam.

The optical amplifier can also include a sensor configured to measure at least one characteristic of the amplified common light beam. The optical amplifier can still further include a modulation controller operationally coupled to the sensor and to a plurality of modulators, each modulator of the plurality of modulators configured to modulate at least one optical parameter of one of the respective light beams. The modulation controller can be further configured to control the plurality of modulators, based on the at least one characteristic of the amplified common light beam, to set one or more spatial modes of the amplified common light beam.

The optical amplifier can be configured to produce output optical power on the order of 10 W, on the order of 3 kW, on the order of 12 kW, or other power levels achievable with a given amplifier configuration. The output power can be carried principally by a fundamental spatial mode of the multimode optical waveguide. The multimode optical waveguide can be a multimode optical fiber with a fiber core of diameter in the range of about 20 to 200 μm, or in a range of between about 20 and 50 μm, or in other ranges appropriate for a given waveguide given waveguide.

In another embodiment, an optical amplifier can include: means for applying active control to convert one or more optical spatial modes in a waveguide configured to provide a common light beam; and means for receiving and amplifying at least a portion of the common light beam at a waveguide-based amplifier to produce an amplified common light beam.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 8D-8E compare a diffractive optical element (DOE)-based beam combining approach (FIG. 8D) to a photonic lantern-based combiner (FIG. 8E).

FIG. 8F is a graph and equations illustrating both exact and approximate expressions for beam combining efficiency.

FIG. 9D is a cross-sectional image showing a three-channel photonic lantern fabricated according to the pattern illustrated in FIG. 7, near the entrance of the photonic lantern.

FIG. 9E is a cross-sectional image of the multimode fiber portion of the photonic lantern of FIG. 9D corresponding to the lower cross-sectional drawing shown in FIG. 7.

FIG. 9F is a side view of the photonic lantern of FIG. 9D.

FIG. 9G is a schematic diagram illustrating a measurement apparatus that can be used as part of embodiment beam controllers, amplifiers, and corresponding methods to measure beam profile and modal decomposition to determine modes and relative strengths thereof present in an output beam from a multimode fiber.

FIG. 9H is a series of beam profile images and corresponding modulated beam images corresponding to the modes $LP_{11o}$, $LP_{11e}$, and $LP_{01}$, respectively.

FIG. 11C is a cross-sectional view of a double-clad gain fiber that can be used advantageously in embodiments for optical amplification in optical fibers.

FIG. 12 is a schematic diagram illustrating beam combiner elements of an embodiment beam controller configured to provide fundamental-mode output with power on the order of 3 kW.

FIGS. 13A-13B are a schematic diagram and graph, respectively, that illustrate how mode-optimization and beam steering can be implemented using embodiment devices and methods.

FIG. 17A is a flow diagram illustrating an embodiment method of electro-optically controlling a beam.

FIG. 17B is a flow diagram illustrating an alternative embodiment method of method of electro-optically controlling a beam.

DETAILED DESCRIPTION

A description of example embodiments of the invention follows.

Figure 1:
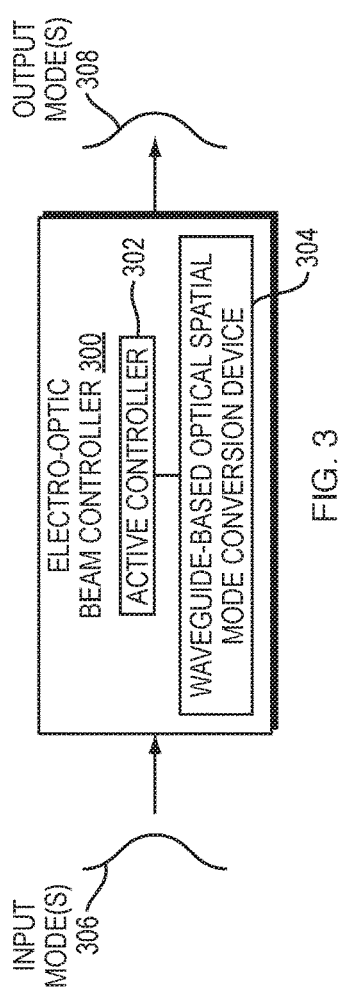
FIG. 1 is a graph illustrating the effects of higher-order modes (HOMs) on the diffraction-limited power that can be achieved per optical fiber as modal area increases.

FIG. 1 is a graph that illustrates the effects of higher-order modes (HOMs) on the diffraction-limited power that can be achieved per optical fiber as modal area increases. In particular, if HOMs are eliminated, then the diffraction-limited power per fiber increases linearly with the fibers modal area, as illustrated in the linear curve 128. However, in the presence of transverse mode instability, where HOMs are not controlled, the diffraction-limited power per optical fiber first increases with modal area, then actually decreases as modal area continues to increase, as illustrated by a nonlinear curve 130 in FIG. 1. A maximum in this curve occurs around a modal area 132 of an optical fiber having a core of approximately 20 μm in diameter. Thus, power in an optical fiber is limited by nonlinearities. Some of these nonlinearities can include stimulated Brillouin scattering (SBS), stimulated Raman scattering (SRS), and self-phase modulation, for example.

As illustrated in FIG. 1, the impact of nonlinearities scales inversely with modal area, and modal area scaling is thus limited by a HOMs. Embodiments described herein can permit increasing fiber mode diameter and scaling fiber power while maintaining a high degree of control, including active control, over HOMs. Thus, while existing methods of mitigating HOMs in optical fibers have sought to eliminate HOMs by loss of power in HOMs, embodiments described herein can actively control these modes, with low loss and high stability, by actively creating conditions that will promote coupling of various optical channels into solely a single, pre-determined mode, or set of pre-determined modes, in a multimode fiber or other waveguide. This process can also be referred to as "setting" a mode herein.

The process of setting a mode may be understood by considering launching the desired mode, such as a fundamental mode, into a multimode optical waveguide and through a coupler, in the reverse of the direction illustrated in FIGS. 4-7. The desired output mode, thus input backwards through an output end of the coupler, may couple energy into any of the modes supported by the multimode fiber. On the other hand, in the forward direction illustrated in FIGS. 4-7, the conjugate modes can be launched through individual waveguides at an input side of a coupler to reproduce the desired mode at the output multimode waveguide at the output side of the coupler.

Figure 2:
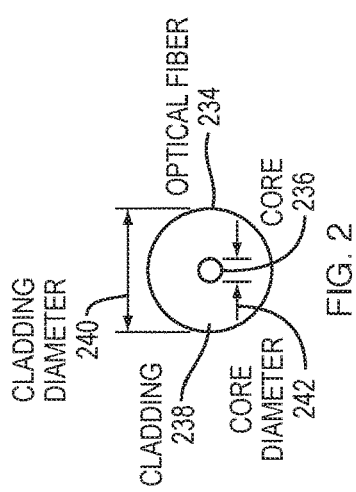
FIG. 2 is a cross-sectional view of an optical fiber illustrating various parameters for optical fibers used in embodiment beam controllers, fiber amplifiers, and corresponding methods.

FIG. 2 is a cross-sectional view of an optical fiber illustrating various parameters for optical fibers as described herein. A typical optical fiber 234 includes a core 236 having a core refractive index and a core diameter 242. The typical optical fiber 234 also includes cladding 238 surrounding the core, and the cladding 238 has a refractive index somewhat smaller than the refractive index of the core 236. The cladding typically has a cladding diameter 240. For single-mode fiber carrying telecommunications wavelengths, for example, the core diameter may be 6 to 10 μm, for example, and the cladding diameter may be 125 μm, for example, for single-mode operation.

However, embodiments described herein can operate at non-telecommunications wavelengths, and single-mode fibers used in embodiments may have other diameters for core and cladding. Furthermore, embodiments described herein can utilize multimode fibers, which can have much larger core and cladding diameters, for example. In some embodiments, for example, a multimode optical fiber constituting a common, multimode optical waveguide includes a fiber core with a diameter in a range of 20 to 200 μm. In other embodiments, example devices can include a multimode optical fiber that has a fiber core with a diameter in a range of 20 to 50 μm, for example. In addition, the multimode fiber may include a double cladding, which can enable pump light to be guided in an outer cladding while guiding a signal beam in the core.

As used herein, "optical" and "light" wavelengths refer to radiation within an ultraviolet, visible, or near-infrared, mid-infrared, or far-infrared spectrum that can be directed using any type of waveguide. Further as used herein, it should be understood that "single-mode" and "multimode" specific to a given wavelength or wavelength range. Thus, while example single-mode and multimode waveguide diameters are disclosed herein for particular tests performed using near-infrared radiation at 1 μm wavelength, diameters for single-mode and multimode operation can vary depending upon wavelength.

Described herein are alternative approaches to spatial mode control using active feedback. Embodiments described herein demonstrate the ability of active feedback to stabilize a fundamental mode output of a multimode fiber by appropriately launching a correct superposition of input modes in phase, amplitude, polarization, or a combination thereof to achieve a desired mode at the output. In effect, embodiments can include an all fiber-based adaptive optics system that can precondition multiple inputs to achieve a nearly diffraction-limited, single-mode beam at the output.

Figure 3:
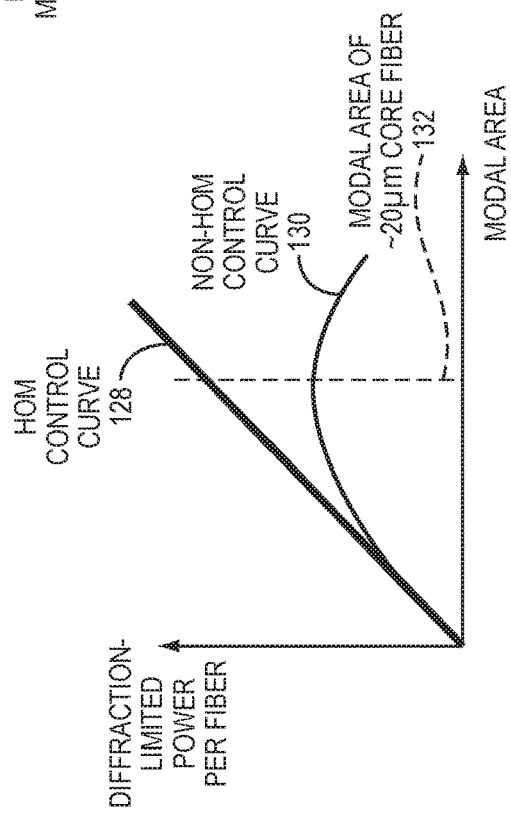
FIG. 3 is a schematic block diagram illustrating an embodiment electro-optic beam controller.

FIG. 3 is a block diagram illustrating an electro-optic beam controller 300 that can achieve these purposes. The controller 300 includes an active controller 302 and a waveguide-based optical spatial mode conversion device 304. Using the controller 300, one or more spatial (transverse) input modes 306 can be converted to one or more spatial (transverse) output modes 308. Through active control, the waveguide-based, optical spatial mode conversion device can both select and stabilize the output modes 308. "Converting" spatial modes, as used herein, denotes manipulating input modes in a plurality of input waveguides to produce a given, desired output mode in a common, multimode waveguide. The plurality of input waveguides may all be single-mode fibers supporting only a fundamental mode.

In many embodiments, setting output modes can be done by modulating the input modes 306, with the active controller 302 modulating (adjusting) amplitude, phase, polarization, or another parameter of the input modes 306 within the waveguide-based, optical spatial mode conversion device 304 to produce and stabilize one or more desired output modes 308.

It can be useful to set and stabilize, in particular, a fundamental mode of a large core multimode optical fiber in order to achieve diffraction-limited behavior of an output beam, even with high optical power and large modal area of the fiber, according to the curve 128 illustrated in FIG. 1. Such a fundamental mode and diffraction-limited behavior are useful in many types of systems and fields of use. For example, the waveguide-based, optical spatial mode conversion device 304 can form part of a communications system, imaging system, laser radar system, directed energy system, or laser material processing system for cutting, etching, welding, or otherwise processing a workpiece, for example. Some example aspects of these systems are illustrated graphically in FIGS. 15A-15D, for example.

Figure 4:
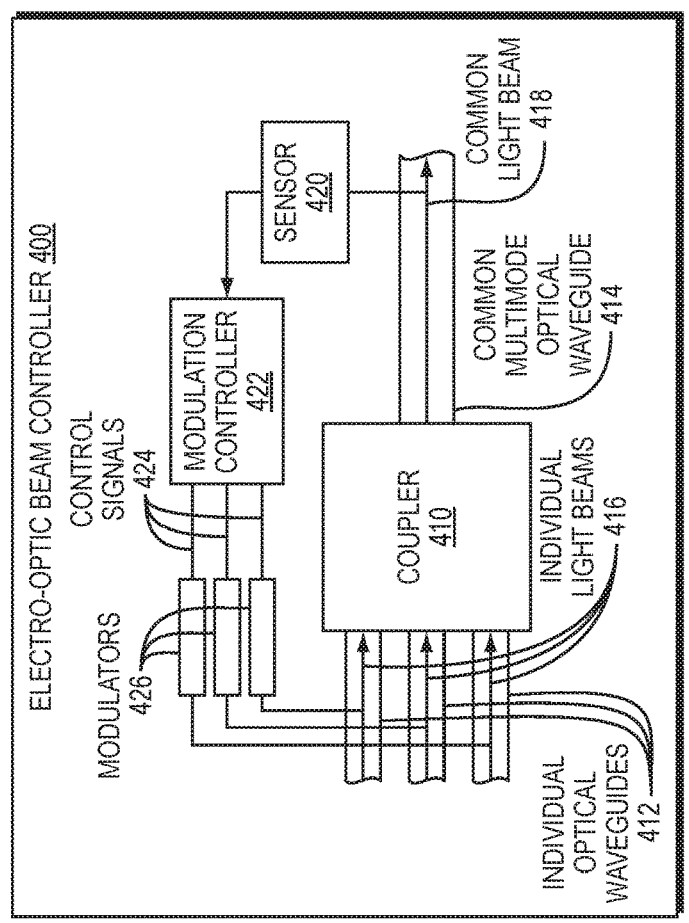
FIG. 4 is a schematic block diagram illustrating an alternative electro-optic beam controller including additional features.

FIG. 4 is a schematic block diagram illustrating an electro-optic beam controller 400 that includes many features and functions of embodiments described herein. The controller 400 includes a coupler 410 that is configured to combine light beams carried by respective, individual optical waveguides 412 into a common light beam 418 that can be carried by a common, multimode optical waveguide 414. In many embodiments, the individual optical waveguides 412 can be individual single-mode optical fibers, for example. However, in other embodiments, the individual optical waveguides 412 can be waveguides based on silica or other waveguide materials, for example. For example, the individual optical waveguides 412 can be channels in an integrated photonic chip, for example.

Furthermore, the individual optical waveguides 412 can be multimode fibers. In embodiments wherein multimode fibers or other multimode input waveguides are used, the spatial mode distribution can be controlled, actively or passively, to achieve a desired combined output. In one embodiment, individual multimode input fibers are individually mode-filtered to render them, in effect, single mode. Mode filtering can be performed by coiling the fibers or by other means.

Moreover, individual multimode fibers may be excited using a single mode fiber and mode-field adapter, each single mode fiber having a modulator or set of modulators to control one or more parameters of the beam. The individual multimode fibers may themselves use a coupler and a set of individual optical waveguides along with a corresponding set of modulators. These are examples of different methods of using individual multimode waveguides as the input waveguides 412. For power scaling purposes, it can be advantageous to incorporate a set of multimode high power fibers into a coupler 410 to generate the common light output beam 418 at even greater power. For example, kW-class amplifiers are available, and a set of multimode fiber outputs from kW-class amplifiers can be used as inputs to a high-power coupler to generate an even higher power output beam with a desired output spatial mode.

Correspondingly, the individual light beams 416 can be the result of single, fundamental modes propagating in individual optical waveguides, or one or more of the individual light beams can comprise a combination of spatial modes propagating therein, for example. Moreover, while the common light beam may be composed of only (or principally) a fundamental mode of the common waveguide, in other embodiments the common light beam is composed of a single HOM, or even a combination of spatial modes, supported by the common multimode waveguide.

"Setting" an optical mode in the common light beam, as used herein, implies conditioning the individual light beams such that only (or principally) the desired spatial mode or modes desired to be present in the common light beam are excited in the common multimode waveguide. Mode "conversion," as used herein, includes performing this conditioning such that, regardless of the initial mode or phase or amplitude or other characteristics of the individual light beams, one or more modes desired to be present in the common light beam can be stably maintained over time, including in cases in which the one or more desired modes are fewer in number than the modes supported by the common waveguide. Thus, mode "conversion" as used herein encompasses cases in which modes actually propagating in the individual input waveguides are the same as the modes actually propagating in the output, common, multimode waveguide. This includes the case in which all input waveguides are single mode and only a fundamental mode from those inputs propagates in the common waveguide. It also includes cases in which the individual input modes of the single mode waveguides are different than the output mode or combination of modes.

Still referring to FIG. 4, the coupler 410 can be a waveguide coupler in a photonic chip or integrated photonic device, for example. In some embodiments, the coupler 410 can take the form of a photonic lantern, as described further hereinafter in connection with FIGS. 7 and 8A-8C, for example. The common, multimode optical waveguide 414 can include a multimode optical fiber supporting one or more HOMs in addition to a fundamental mode, for example. However, in alternative embodiments, the common, multimode optical waveguide 414 may be part of a photonic crystal or integrated photonic device, as described hereinabove. The common, multimode optical waveguide 414 may be an output section of a photonic lantern or may be spliced thereto, for example. The output waveguide may consist of a double-clad waveguide to allow for guiding pump light. It may exhibit gain by incorporating an optically pumped rare-earth agent, for example. A double-clad output gain fiber waveguide is described hereinafter in connection with FIG. 11B, for example. Alternatively, an output waveguide may also be passive, wherein it does not exhibit gain.

The individual optical waveguides 412, coupler 410, or common multimode optical waveguide 414, or any combination thereof, may be written into a substrate using ultrafast laser inscription, which results in a change refractive index in certain portions of the substrate. Such ultrafast laser inscription is known and understood in the art of waveguide fabrication and can be applied advantageously to make and use embodiment electro-optic beam controllers described herein. However, in alternative embodiments, these components can be manufactured using other methods.

The controller 400 also includes a sensor 420 configured to measure at least one characteristic of the common light beam 418. In some embodiments, such as that described in connection with FIG. 9A, the beam characteristic can include an on-axis power of the beam. In some embodiments, this characteristic can include an $M^2$ measurement of beam quality by using a beam profiler camera such as that described in connection with FIG. 9G, for example. In some embodiments, the characteristic can include a pixel array measurement of beam profile, as illustrated in various figures described hereinafter, including FIGS. 9B and 9F, for example. In some embodiments, a beam characteristic can include a modal decomposition signal, as described in connection with FIG. 9C, for example. In some embodiments, a beam characteristic can include a ratio of on-axis power of a beam to total power of a beam, for example. Furthermore, combinations of two or more of these measurements may be used in various other embodiments.

Sensors that can make beam characteristic measurements very quickly, such as at kilohertz or megahertz rates, for example, can be preferable in many embodiments in order to provide modulation adjustments at update rates greater than characteristic rates of thermal drift of a given embodiment device, and at update time intervals much smaller than any characteristic mode drifts. Some modal drifts that can be present are described hereinafter in connection with FIG. 9C, for example.

In some embodiments, a camera as described hereinafter in connection with FIG. 9G, for example, can be used as the sensor 420 to perform a measurement of one or more characteristics of the common light beam 418, and the camera can be a beam profiler camera, for example. In some embodiments, the sensor 420 can be one of various photosensors, such as a photodiode, for example. Furthermore, in some embodiments described herein, the sensor 420 can be a detector used for stochastic parallel gradient descent (SPGD) measurements, as illustrated in FIG. 9A, for example.

Figure 11A:
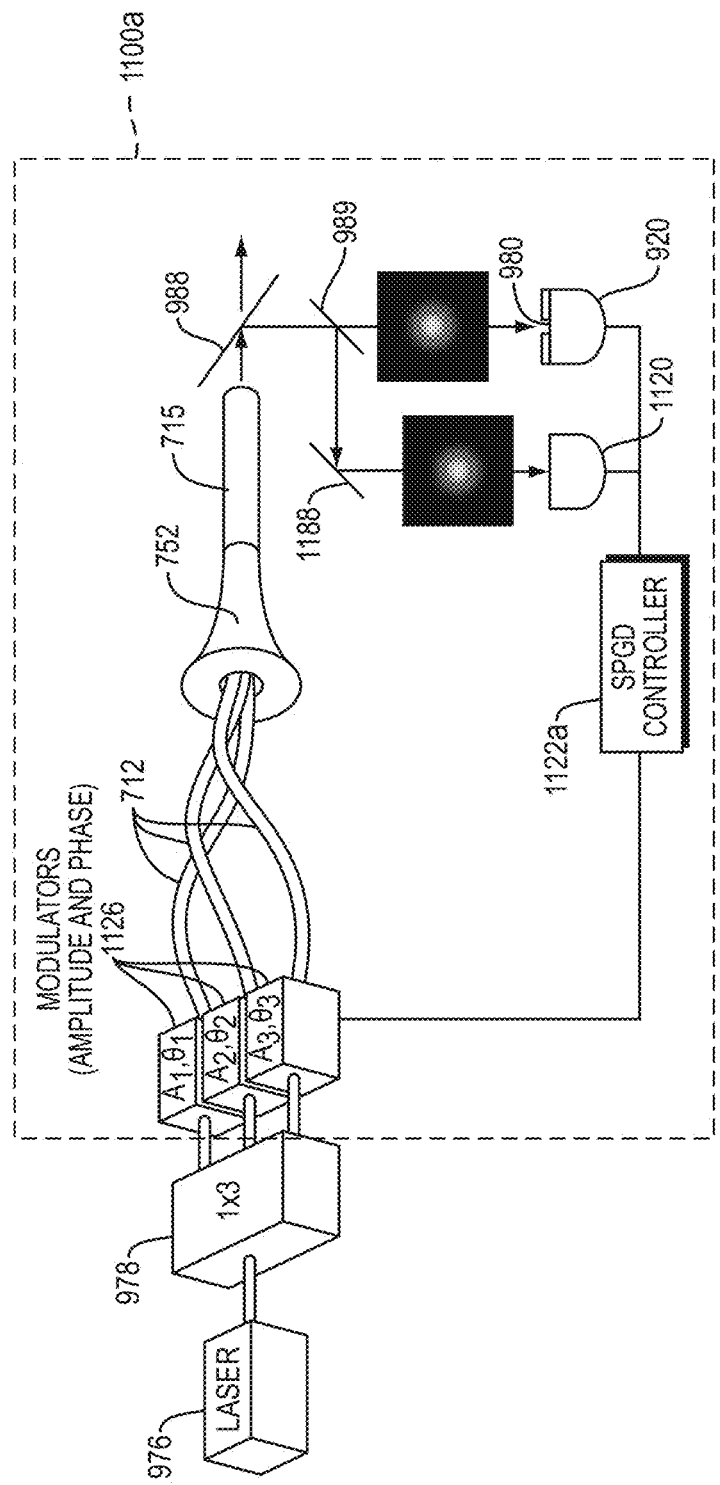
FIG. 11A is a schematic diagram illustrating how amplitude modulation can be implemented, in addition to phase modulation, in embodiment beam controller devices and methods.

Such a sensor may or may not have a mask, such as a pinhole, for example, applied thereto. A mask can define one or more modes of the common multimode optical waveguide 414 desired to be set (allowed to propagate inside and outside of the waveguide) to the exclusion of other modes of the waveguide 414, thus suppressing the other modes. The setting and suppressing of modes can be done by providing a combination of light waves in the individual waveguides 412 with given phases, amplitudes, or both such that principally the desired mode(s) are excited in the common waveguide 414, as determined by the sensor 420, in combination with any mask that may also be used. The measured characteristic of a common light beam can include on-axis power (or intensity), as illustrated in FIG. 9B, for example. Furthermore, embodiments are not limited to one sensor 420. As illustrated in FIG. 11A, for example, two or more sensors can be used to measure a characteristic of the common light beam. Furthermore, the characteristic of the common light beam can be a ratio or other combination of values, as described in connection with FIG. 11A, for example.

For example, the mask can be configured to pass light corresponding to one or more mode shapes, of the one or more spatial modes desired to be set, to the sensor. For example, the $LP_{01}$ mode is the only mode in a 3-moded fiber that has an on-axis intensity component in the far-field. Therefore, a lens can be used to produce the far-field image, and a pinhole can be used to sense the on-axis intensity. Alternatively, in order to sense an $LP_{11}$ mode, a mask containing a 180 degree phase shift across the axis of symmetry may be used to conjugate the phase of the $LP_{11}$ mode to produce an on-axis component. Effectively, in this example, an $LP_{11}$ mode gets converted to an $LP_{01}$-like mode as its phase profile is flattened to resemble the $LP_{01}$ mode, whereas an $LP_{01}$ mode is converted into an $LP_{11}$-like mode on transmission through the mask as its flattened phase obtains a 180 degree phase shift and will therefore no longer have an on-axis component in the far field. Once again, a lens and a pinhole may be used to sense the presence of the $LP_{11}$ mode by measuring the on-axis contribution after it has been converted. In general, the use of the mask allows one to project out the desired mode in the manner just described, where the on-axis intensity component is proportional to the correlation of the incoming mode with the mask. The closer the mask resembles the desired mode in polarization, amplitude, and phase, the better the discrimination and correlation will be.

However, in other embodiments, the mask may have two, off-center holes corresponding to a two-lobe shape expected for an $LP_{11o}$ or $LP_{11e}$ mode, and the entire transmitted intensity may be sensed, for example. Masks may also define more complex patterns corresponding to one or more other desired modes, and both phase and amplitude may be varied on the mask by changing the optical delay by varying thickness or index properties while varying amplitude by varying the reflective, transmissive, and absorptive properties through the choice of raw materials or applied coatings or both.

Where the sensor is a sensor array, the measured characteristic can include one or more parameters or images related to modal imaging or modal decomposition, as described in connection with FIGS. 9G-9H, for example. In such cases, a parameter can include a modal decomposition percent for a given mode or modes, as described in connection with FIG. 9C, for example.

The controller 400 in FIG. 4 also includes a modulation controller 422 that is operationally coupled to the sensor 420 and to a plurality of modulators 426. Each of the modulators 426 is configured to modulate at least one optical parameter of one of the respective individual optical light beams 416. The modulation controller 422 is further configured to control the plurality of modulators 426, based on the one or more characteristics of the common light beam 418, in order to set one or more spatial modes of the common light beam 418. In some embodiments, the controller 422 can be configured to control the modulators 42 in accordance with an SPGD control method, as further described hereinafter, but alternative control methods may also be implemented. Where the controller is closed-loop, the measured characteristic of the common light beam can be treated as a monitored variable, and the at least one optical parameter in each respective light beam, such as phase or amplitude, can be treated as a manipulated variable.

As is understood in the art of fiber optics, a multimode optical waveguide, such as a multimode optical fiber, permits propagation of more than one transverse (spatial) mode of light travel. Some of these multiple modes are illustrated in FIGS. 8C and 9H, as described hereinafter. As used herein, "setting" one or more spatial modes of the common light beam should be understood to include conditioning the individual light beams 416 such that, in view of all of the optical parameters and characteristics of a system, one or more particular desired transverse, spatial modes propagate in the multimode optical waveguide 414, as desired.

In many cases, as described hereinabove, only a fundamental mode of the multimode optical waveguide 414 is desired, as this enables the beam to be focused to a diffraction-limited spot size, determined by the size of the common light beam 418 to be obtained. Fundamental modes and diffraction-limited focal spots are useful in a wide variety of different applications including communications, imaging, laser cutting and material processing, etc., and wherever a small focal point, precision light control, or diffraction-limited behavior is desirable, for example. Thus, in the controller 400 illustrated in FIG. 4, one or more spatial modes of the common light beam can be set by measuring a beam characteristic using the sensor 420, basing modulation control of the modulators on the beam characteristic(s) measured, and setting the modulators such that the individual light beams 416, coupled by the coupler 410, produce a common beam 418 with the desired mode or modes. In some embodiments, the modulation controller 422 can include the SPGD controller illustrated in FIG. 9A, for example. However, it should be understood that the modulation control performed by the controller 422 can be implemented in a wide variety of different types of processors and modules. In some embodiments, for example, the modulation controller 422 and modulators 426 are part of a common module for control of the individual light beams 416. In other embodiments, the controller may use different methods to optimize the intensity on-axis. For example, a LOCSET method may be used. The LOCSET method determines the phase of each individual beam contribution to the on-axis intensity relative to a reference beam by appropriately modulating each individual fiber input uniquely.

For convenience of illustration in FIG. 4, the modulators 426 are shown as separate from, but operationally connected to, the individual light beams 416 in the waveguides 412. However, as will be understood by those skilled in the art, the modulators 426 can be waveguide-based modulators and can be in line with the individual optical waveguides 412, as illustrated in FIG. 9I, for example. In some embodiments, such as the one illustrated in FIG. 11B, the modulators 426 may include polarization modulation. The polarization state of all the input beams is preferably matched for efficient beam combination. Therefore, if non-polarization maintaining waveguides are used, or if the polarization states of the input beams are otherwise not sufficiently matched, polarization control can be implemented to achieve efficient beam combination.

In general, it is desirable to control all input mode properties, including amplitude, phase, and polarization, in order to reproduce the desired output mode or modes. In particular, this is best visualized by considering the process in reverse. Sending in the desired mode or modes on the output end toward the input will produce modes on the input with unique amplitude, phase, and polarization. Reversibility requires that the inputs match the amplitude, polarization, and conjugate phase to reproduce the desired output mode or modes in the forward direction. Polarization control enables setting the input polarization dynamically, even in the presence of polarization coupling amongst the modes. Under limited conditions, the polarization disturbances are static and the input polarization may be fixed to their correct values to achieve the desired polarization on the output. In the presence of polarization dynamics, the input polarization can be set dynamically through the use of a dynamic controller. An example embodiment beam controller that includes control of phase, polarization, and amplitude, as well as path length, is described hereinafter in connection with FIG. 11B.

In some embodiments, the modulators 426 may control respective phases of the individual light beams. In still further embodiments, the modulators 426 may control respective amplitudes of the individual light beams, either alone or in combination with phase control, polarization control, or other beam characteristics. While the sensor 420 can include a pixel array or photodiode, the sensor 420 can alternatively include a photomultiplier tube, for example, in other embodiments not illustrated. In some embodiments, the sensor 420 can be configured to measure the characteristic of the common light beam 418 after the common light beam exits the common multimode optical waveguide 414. Examples of such post-waveguide measurements are described in connection with FIGS. 9A, 9G, and 9I, among others. Furthermore, multiple characteristics of the common light beam may be measured, including with multiple different sensors. For example, in some embodiments, an SPGD controller can use input from one or more photodiodes, and a beam profiler can also be used to obtain beam profile and modal decomposition measurements.

In some embodiments, the linewidth of a seeding laser source may be broadened to further suppress nonlinearities. In these instances, the overall path length of the individual input fibers may be adjusted to ensure that the path lengths are matched to within an optical coherence length to achieve coherent control of the output mode. Those skilled in the art of coherent beam combination in other contexts will understand, in view of this disclosure, the requirements and tolerances of path length matching to achieve appropriate phase, amplitude, and polarization at the output of an embodiment beam combiner.

Figure 5:
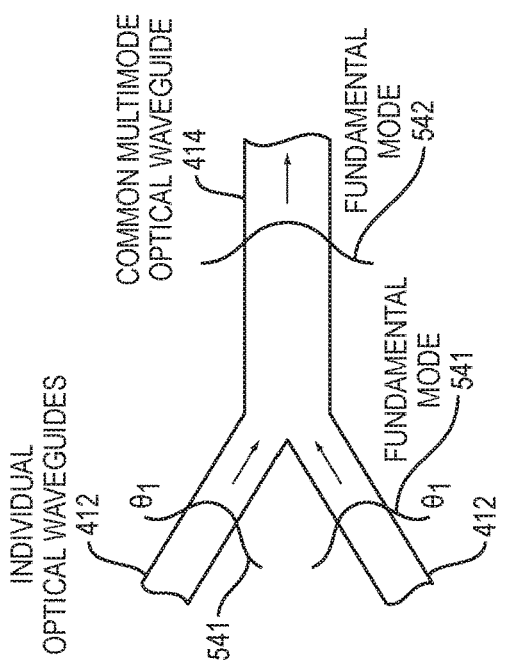
FIG. 5 is a schematic representation of a planar waveguide including two individual optical waveguides configured to couple respective, in-phase light beams into a common, multimode, optical waveguide to form a common, fundamental-mode beam in the multimode waveguide.
Figure 6:
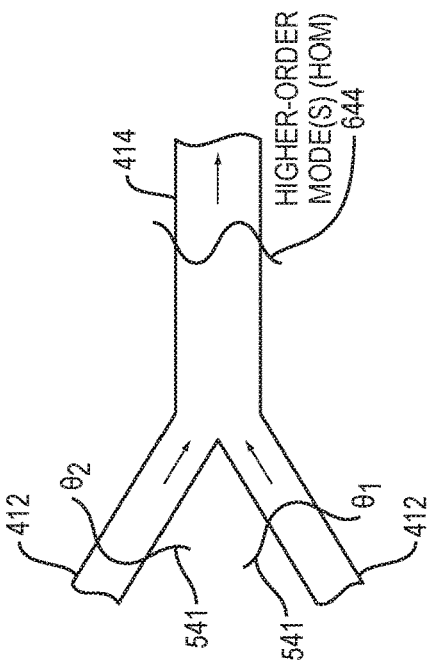
FIG. 6 is a schematic representation similar to that of FIG. 5 but with the respective light beams being out of phase and coupled to form a common beam of higher-order mode (HOM).

FIGS. 5-6 are representations of a planar waveguide including two individual optical waveguides 412 configured to couple respective light beams into a common, multimode, optical waveguide 414. The beam combination principles illustrated by these figures are applicable to many embodiments described herein, and the illustrated principles of operation are similar for other embodiments that include optical fiber waveguides. In particular, in FIG. 5, a fundamental mode 541 with phase $\theta_1$ propagates in each of the individual optical waveguides 412. Since the fundamental modes 541 are in phase with each other, they combine in the common multimode optical waveguide 414 to form, likewise, an initial fundamental mode 642. In contrast, in FIG. 6, while the fundamental mode 541 still propagates in each of the individual optical waveguides 412, one beam has phase $\theta_2$ that is 180° out of phase with $\theta_1$. As such, when the beams combine in the common optical waveguide 414, an HOM 644 is formed.

According to embodiments described herein, the phases $\theta_1$ and $\theta_2$ in the respective, individual optical waveguides 412 can be actively adjusted (also referred to herein as "modulated" or "controlled") to set the mode propagating in the common waveguide 414. Typically, this can be the fundamental mode 642, but embodiments can also include setting any desired HOM that can be formed based on a given combination of modes in the individual optical waveguides 412. Some examples of HOMs are described hereinafter in connection with FIGS. 8B-8E, for example.

The active adjustment described herein can also be referred to as "adaptive spatial mode control" (ASMC). Where the waveguides are optical fibers, this all fiber-based adaptive optic approach can make use of photonic lantern technology, which has found applications in astrophotonics and spatial division multiplexing for communications, for example. Described hereinafter are salient features of the photonic lantern that are relevant to the fiber power scaling embodiments described herein.

Figure 7:
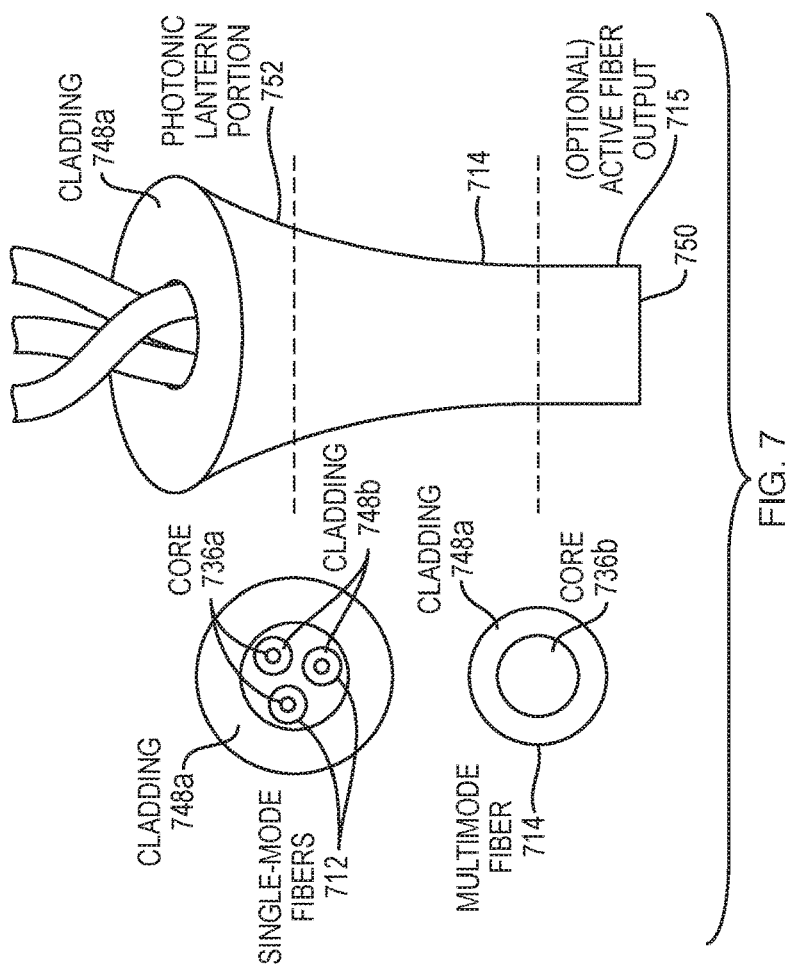
FIG. 7 is an illustration of a photonic lantern beam combiner that can be used in embodiment beam controllers and methods.

FIG. 7 is an illustration of a photonic lantern that can be used in embodiments described herein to combine beams for active control of output optical modes. The device of FIG. 7 includes individual optical fibers 712 coupled into a photonic lantern portion 752 of the device. As illustrated in the cross-sectional view of the photonic lantern portion 752, the lantern includes the single-mode fibers 712, each with core 736*a* having a refractive index $n_2$, with cladding 748*b* having refractive index $n_1$. The photonic lantern also has an outer cladding 748*a* having refractive index $n_0$, where $n_0 < n_1$, and $n_1 < n_2$.

Further in FIG. 7, the individual optical fibers 712 carry three respective, uncoupled modes. The three single-mode fibers are tapered down in core size, such that the modes spread out and become coupled to each other. The single-mode fiber cores become vanishingly small, and eventually the single-mode fiber claddings 748*b* become the new multimode fiber core 736*b*. Thus, in a multimode fiber portion 714 of the device of FIG. 7, there is a core 736*b* having refractive index $n_1$, as well as the cladding 748*a* having refractive index $n_0$. As such, at an output 750 of the device, the behavior is that of a multimode fiber carrying light in one or more transverse, spatial, optical modes.

In various embodiments, the multimode fiber portion 714 of the photonic lantern or other waveguide-based combiner can be further coupled, optionally, to an active fiber 715 or other waveguide to provide optical amplification. The fiber portion 715 is "active" in the sense that it is doped and can provide optical amplification with proper pumping. "Active" as used herein in relation to active optical fibers is, thus, different from the "active" mode control described herein, which can include modulating phase, amplitude, or other optical characteristics of input beams in order to select mode(s) propagating in, and output from, a multimode fiber. A fiber-based example of this type of amplification is illustrated in FIG. 9A, for example. However, in other embodiments, an active waveguide may be coupled to a passive multimode portion of a beam combiner in an integrated photonic chip, for example, thus providing a waveguide-based combiner that does not include an optical fiber-based photonic lantern.

Figure 8A:
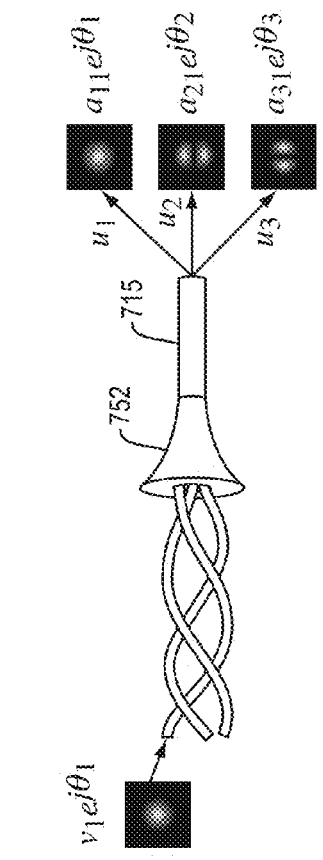
FIG. 8A illustrates the photonic lantern of FIG. 7 operating in reverse.

FIG. 8A illustrates the photonic lantern 752 operating in reverse. Considering the reverse operation can provide an understanding of the considerations involved. For example, consider launching the fundamental $LP_{01}$ mode in reverse, labeled $u_1$ in FIG. 8A, into the output of a three-moded photonic lantern. The output fiber illustrated in red at the right side of FIG. 8A, can be referred to as a delivery fiber and may be passive, active, or both (i.e. a passive splice onto an active fiber).

For an ideal lossless lantern, properly mode-matched to the delivery fiber, all of the power would be distributed among the input fibers with amplitude $v_1$ and phase $\theta_i$ irrespective of the mode coupling dynamics in the delivery fiber. In order to faithfully reproduce the desired output mode $u_1$ in the forward direction, a control system may launch the same amplitudes $v_i$ and conjugate phases $\theta_i$ on the input. Such a closed-loop control could, therefore, faithfully reproduce the desired mode output in the presence of imperfections and thermal perturbations that may be present in the delivery fiber that could not be compensated for by static (open-loop) approaches including a single-mode fiber tapered to the large mode area (LMA) fiber.

Figure 8B:
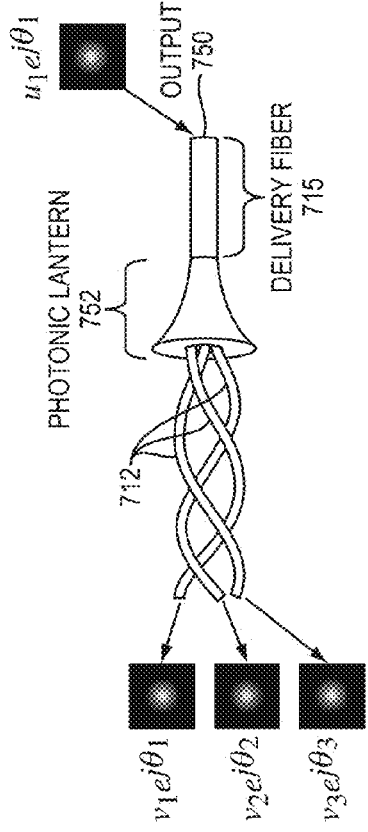
FIG. 8B illustrates the device of FIGS. 7 and 8A operating in the forward direction.
Figure 8C:
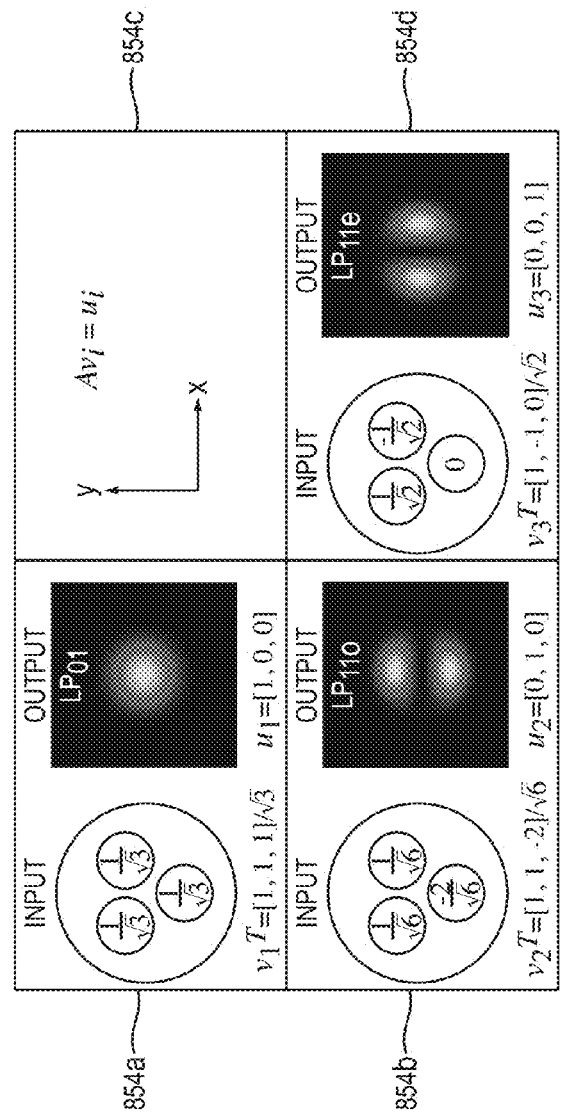
FIG. 8C illustrates a photonic lantern transfer matrix formalism applied to mode control.

FIG. 8B illustrates the device of FIG. 7 and FIG. 8A operating in the forward direction. FIG. 8B provides further insight into the operation of the photonic lantern. One may consider launching a single mode into an individual fiber input, as illustrated in FIG. 8B. As the input fiber undergoes an adiabatic taper, the output emerges as a superposition of output modes $u_i$, $u_2$, and $u_3$, representing the $LP_{01}$, $L^{11o}$, and $LP_{11e}$ modes, respectively, where the additional $LP_{11}$ subscripts {o,e} have been used to describe the orientation of the lobes with respect to their odd or even symmetry about the x-axis using a coordinate frame illustrated in FIG. 8C.

Mathematically, it can be observed that this input basis $[v_1, 0, 0]$ vector is not the appropriate basis vector to launch on the input to achieve the desired output mode $[u_1, 0, 0]$. Since the photonic lantern performs a unitary operation, there exists an appropriate set of orthogonal input vectors that will map onto a desired orthogonal set of output vectors.

Moreover, since the photonic lantern is a linear optical device, it may be considered a mode converter that maps input orthogonal sets to output orthogonal sets. In particular, a transfer matrix, as shown in Eq. (1) hereinafter, may describe the relation between the input and output in a photonic lantern. This relationship between the input and output superposition of modes in an ideal lantern, defined here as a lossless lantern, may be compactly expressed as $Av_i = u_i$, where the transfer matrix A may be derived from symmetry considerations and is expressed in Eq. (1) for a three-channel lantern with the input fibers arranged at points of an equilateral triangle, as illustrated in FIG. 8C.

$$A = \begin{bmatrix} \frac{1}{\sqrt{3}} & \frac{1}{\sqrt{3}} & \frac{1}{\sqrt{3}} \\ -\frac{1}{\sqrt{6}} & -\frac{1}{\sqrt{6}} & \frac{2}{\sqrt{6}} \\ \frac{1}{\sqrt{2}} & -\frac{1}{\sqrt{2}} & 0 \end{bmatrix} \quad (1)$$

FIG. 8C illustrates a photonic lantern transfer matrix formalism applied to mode control. For the ideal lantern transfer matrix shown in Eq. (1), it can be observed that launching $[1, 1, 1]/(3^{1/2})$ on the input would result in exciting the pure $LP_{01}$ fundamental mode $u_1$, as illustrated at 854*a* in FIG. 8C. An orthogonal input vector $[1, 1, -2]/(6^{1/2})$ would excite the $u_2$ ($LP_{11o}$) mode, as illustrated at 854*b* in FIG. 8C. Furthermore, a third orthogonal input vector with $[1, -1, 0]/(2^{1/2})$ would excite the $u_3$ ($LP_{11e}$) mode, as illustrated at 854*d* in FIG. 8C. A quadrant 854*c* in FIG. 8C illustrates an X-Y coordinate system and compact representation of the transfer matrix, as further described above.

In practice, fabrication tolerances of a photonic lantern and mode mismatch in the splicing of the lantern to an output fiber, along with any static or dynamic mode coupling in the delivery fiber, can result in a different transfer matrix from the ideal. In addition, loss may result from mode-mismatch between the lantern and the delivery fiber. Nonetheless, in general there is still a suitable input vector to completely excite the desired output mode albeit with some loss. In the most general case, the transfer matrix may then be decomposed using singular value decomposition into the form $Av_i = \sigma_i u_i$ where $\sigma_i$ represents the transmission loss in exciting mode $u_i$. For the ideal lossless lantern, $\sigma_i = 1$.

FIGS. 8D-8E compare a diffractive optical element (DOE)-based beam combining approach (FIG. 8D) to a photonic lantern-based combiner (FIG. 8E). On the left side of FIG. 8D, it can be observed that sending in a single beam 856 to the input to a DOE 858 results in three non-overlapping (orthogonal) beams 860 on the output. Similarly, on the left side of FIG. 8E, sending in a single fiber 868 to the input to the photonic lantern 752 results in three orthogonal beams 870 with different modes on the output side. It is possible to reverse the DOE operation by sending in three, appropriately phase-adjusted beams on the input to achieve a single beam on the output. Thus, on the right side of FIG. 8D, three phase-adjusted beams 862 are incident at the DOE 858, resulting in a single beam 864 at the output. Similarly, on the right side of FIG. 8E, sending in three phase-adjusted, single modes 872 into the photonic lantern 752 through the individual optical fiber 712 can result in a single mode 874, which can be a fundamental mode, at the output of the photonic lantern.

This correspondence between the photonic lantern and conventional CBC allows application of the CBC formalism to estimate the impact of various errors on combining efficiency. In particular, one can determine the impact of phase, amplitude, and polarization errors in the individual input waveguides on the combining efficiency for the common light beam. The combining efficiency is defined here as the fraction of power in the desired fundamental mode over the total power.

It should be noted that, while general CBC principles apply, the photonic lantern as used in embodiments described herein also allows for compensation of both static and dynamic mode coupling in a delivery fiber (e.g., the common, multimode optical waveguide portion 714 or active fiber portion 715 attached thereto as illustrated in FIG. 7). In this regard, the photonic lantern as used herein can be considered to be analogous to tiled-aperture phased-array CBC, in which the input phase and amplitude may be adjusted dynamically to compensate for atmospheric disturbances. The lantern has the advantage in that the number of guided modes in the delivery fiber is finite and known a priori. In this respect, the number of input channels can match the number of transverse (spatial) modes in the delivery fiber for complete compensation and lossless coupling.

For the three-channel photonic lantern with input fibers arranged as shown in FIG. 8C, it is clear from the matrix description that all three input fiber channels are required to purely excite the fundamental mode. In the most general case, N input fibers are needed to efficiently excite the fundamental mode in an N channel output fiber. Assuming for simplicity the three-channel transfer matrix, which requires equal amplitudes on the input to excite the fundamental mode, the impact of the amplitude variation on combining efficiency $\eta$ is $$\eta = \frac{1}{N} \frac{\left| \sum_{m=1}^{N} \sqrt{P_m} \exp(j\theta_m) \right|^2}{\sum_{m=1}^{N} P_m}, \quad (2)$$

where $P_m$ is the power in channel m, and N=3 for the three-channel lantern. In the limit of small amplitude errors, the combining efficiency loss $(1-\eta)$ can be approximated by $\frac{1}{4}(\sigma_P^2)/P^2$ where P is the nominal power per channel and $\sigma$ is the power standard deviation on the input channels. Similarly, the RMS phase-variation impact on combining efficiency may be expressed as $(1-\eta) \sim \sigma_\theta^2$ for small phase errors, where $\sigma_\theta$ is the RMS phase error.

FIG. 8F includes both the exact expression in Eq. (2), as well as the approximate expression for combining efficiency. FIG. 8F also includes a graph showing calculated exact combining efficiencies 813 and a curve 811 showing the approximate combining efficiency for various standard deviations as a fraction of average power from a single-mode fiber input. In particular, it will be noted that, for a combining efficiency loss of less than 10%, it is preferable that $\sigma/P$ be less than 0.5.

While the photonic lantern is similar in many respects to other CBC approaches, it offers a number of unique benefits when used in a fiber amplifier according to embodiments described herein. First, the photonic lantern may be integrated (spliced) onto the front end of a fiber amplifier. Since the photonic lantern can be used at the seeding stage, the efficiency of a high-power fiber amplifier is minimally impacted by the insertion loss of the photonic lantern and, therefore, is more forgiving than the insertion loss of a combiner used on the output of a high-power system. Furthermore, the photonic lantern can provide a path to modal-area scaling. Scaling can include using a number of input fibers matching the number of modes in the delivery fiber. As the number of channels of the photonic lantern increases, the ideal transfer matrix may in general require non-uniform channel excitation on the input to excite the fundamental mode. In these circumstances, amplitude adjustment of the input can be useful in order to maximize the power in the fundamental mode at the output.

Modal-area scaling, in turn, may enable suppression of intensity-dependent nonlinearities. Mode control also offers the promise of combating transverse mode instability (TMI) and serves as an alternative to, or can be used in conjunction with coiling a fiber to provide modal discrimination.

Other active-mitigation strategies to combat TMI have also been successfully applied. These alternate approaches have utilized acousto-optic deflection of an incident beam on a fiber, an approach that is not waveguide-based. By laterally offsetting the input launch, a different superposition of modes is launched into the gain fiber. In contrast to acousto-optic deflection, embodiment photonic lantern ASMC approaches described herein can differ from the acousto-optic modulator approach in three main aspects: (a) the input can be all fiber-based, and no free-space optics are required for active beam combination and stabilization, (b) the intrinsic mode matching allows one to selectively excite any desired mode with high efficiency, and (c) scaling to large number of modes can be done by increasing the number of input fibers with appropriate phase and amplitude adjustment in principle.

As described hereinafter, a hill-climbing method can be used to maximize the $LP_{01}$ mode by measuring the on-axis intensity while adaptively adjusting the phase input to the photonic lantern. The hill-climbing method may be implemented by using an SPGD method. Alternatively, other methods may be used to increase the intensity on-axis. One example of an alternative approach is to use a method referred to as LOCSET, which measures a phase contribution from each individual input fiber to the intensity on-axis. In particular, the phase contribution of each input fiber is measured relative to a reference beam. The phases of all input fibers are then set to the same value in order to achieve constructive interference.

For the three-moded lantern, $LP_{01}$ is the only mode that has an on-axis intensity component. As the number of modes increases beyond five, the circularly symmetric $LP_{0m}$ modes starting with $LP_{02}$ begin to contribute to the on-axis intensity. In these circumstances, a suitable correlation filter or other approach can be used to discriminate between the $LP_{01}$ and higher-order $LP_{0m}$ contributions on-axis. Thus, a wide variety of different masks corresponding to mode(s) desired to be set in a multimode output waveguide can be applied to a photodiode or other detector, as will be understood by those skilled in the art of optical filtering, in order to select a desired mode. In particular, the mask can be used to multiply the incoming fiber beam with the amplitude and phase of the desired mode. A lens can be used to obtain a measurement of a correlation between the incoming beam and the projected mode by monitoring the intensity on-axis. The intensity on-axis may be monitored by the use of a pinhole, followed by a detector.

Various masks may be used in this manner to determine appropriate inputs that can be applied in order to optimize the correlation of the output beam with the desired mode. Once these input conditions are known for the desired mode or modes, the inputs may be applied to dynamically generate the desired mode, modes, or superposition of modes. In addition, the amplitude and phase of the mask may be set electronically through the use of a deformable mirror, spatial light modulator, or other suitable device. It may also be implemented statically through the use of the insertion of a suitable optical material with the correct thickness, index, absorption, reflection, or transmissive variation to perform the function of multiplying the incoming beam with the desired mode profile.

Figure 9A:
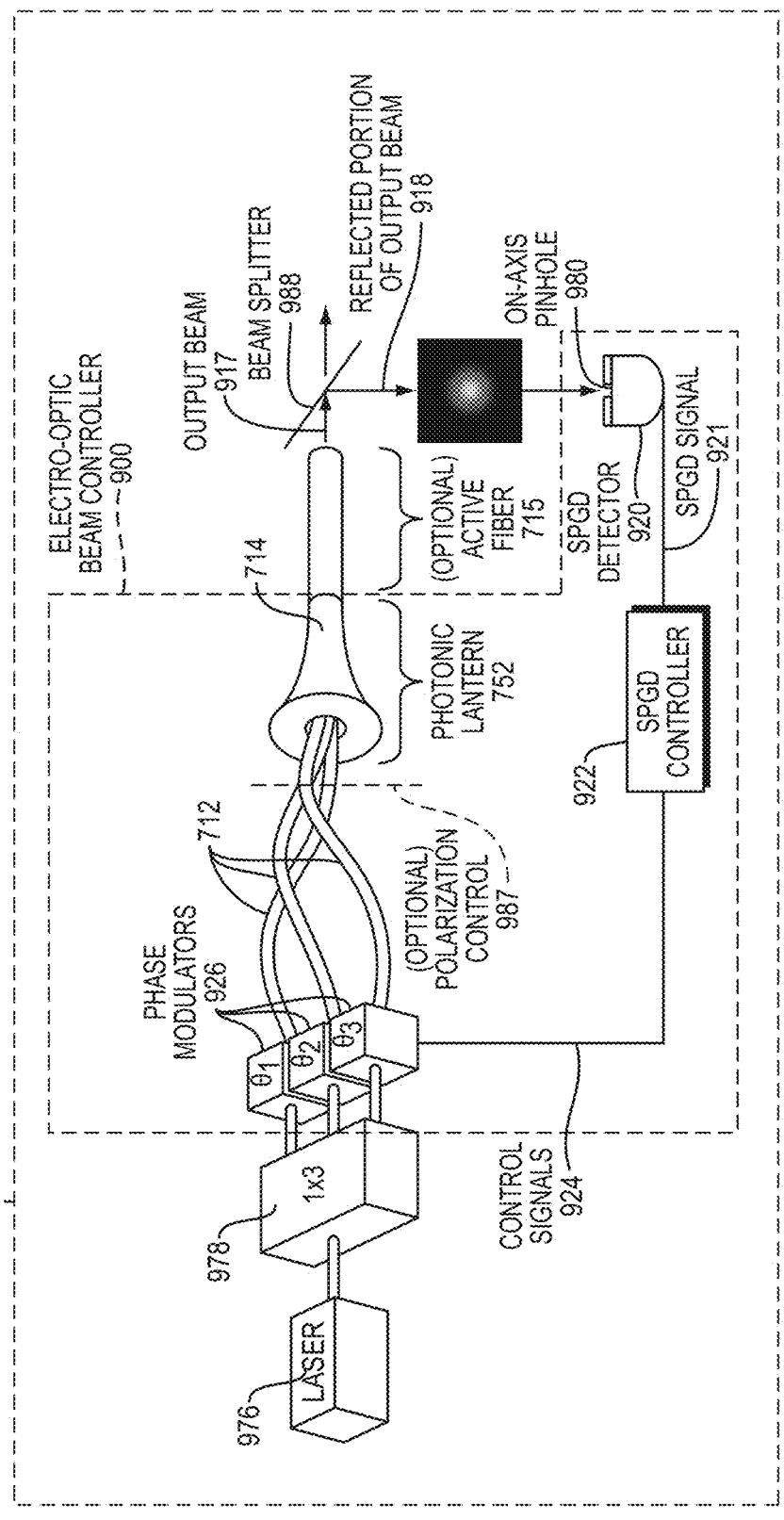
FIG. 9A is a schematic diagram illustrating an embodiment electro-optic beam controller that was built and operated for test purposes to a produce fundamental-mode output beam with output power on the order of 10 W, and FIG. 9A also illustrates a system module that incorporates the electro-optic beam controller.
Figure 9B:
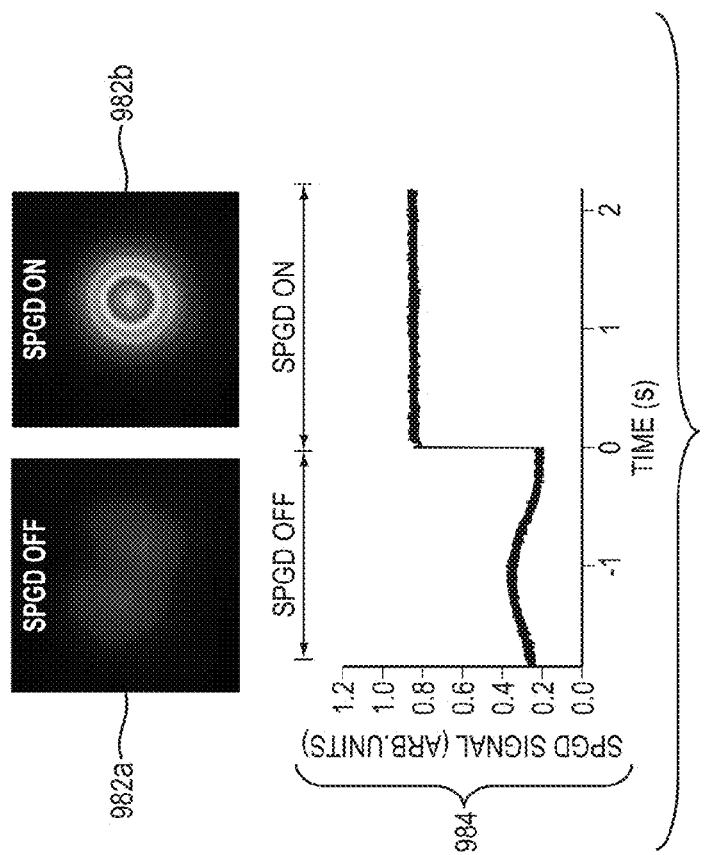
FIG. 9B includes beam profile images and a graph illustrating the effect of applying stochastic parallel gradiant descent (SPGD) control in the controller in FIG. 9A to phase modulators.

FIG. 9A is a schematic diagram illustrating an embodiment electro-optic beam controller 900 that was built and operated for test purposes in accordance with the principles described herein. The controller 900 includes the photonic lantern 752 described hereinabove in connection with FIGS. 7, 8A-8B, and 8E. The photonic lantern 752 serves as a coupler configured to combine individual light beams carried by the respective, individual optical fibers 712 into a multimode fiber portion 714 of the lantern 752.

The output of a seed laser 976 was split into three optical fibers using a polarization maintaining fiber splitter 978, in this case a 1×3 splitter. In other embodiments having more than three input waveguides, such as those described in connection with FIGS. 12 and 14, other splitters of greater dimensions may be used to obtain an appropriate number of individual input beams. The three output fibers from the splitter 978 were then routed to individually addressable lithium niobate phase modulators 926 forming part of the beam controller 900. The fiber outputs of the phase modulators 926 were spliced into the photonic lantern 752 via the individual, single-mode optical fiber 712. As also illustrated, optional polarization control 987 may be added to the input fibers 712. It should be understood that, although the modulators 926 in FIG. 9A are phase modulators, other types of modulators described herein may also be incorporated, as illustrated in the drawings and described herein.

In the absence of polarization dynamics, incoming polarizations of the input modes may be set statically to achieve a desired output mode polarization, assuming that the incoming polarization states are known and that the relationship between the input and output polarization state is also known. Incoming polarizations states may be implemented by means known in the art of achieving a desired polarization state in fibers. For example, the use of a polarized source, polarizers, polarization maintaining fiber, birefringence, or a combination of these resources may be used to achieve a known polarization state.

In other embodiments, the relationship between the incoming mode polarization states and the output polarization state may be unknown. In some situations, this relationship may change over time. Where the relationship changes over time, dynamic polarization control is useful to adaptively adjust the input polarization to achieve the desired output polarization state. One example of implementing this includes the use of input polarization modulators and an output polarizer. An on-axis SPGD detector that provides feedback for the phase control may be used to also provide feedback to dynamically adjust the incoming polarization to maximize the signal on-axis. In particular, the controller adjusts all of the outputs such that they have the required polarization to pass through the polarization controller with the output mode (or superposition of modes) to produce the maximum intensity on-axis.

The output of the photonic lantern in FIG. 9A was mode matched and fusion spliced to a delivery fiber, represented as the output portion 714, which included a passive Nufern 25/400 fiber. As also illustrated in FIG. 9A, the optional active fiber 715 can also be fiber spliced to the passive output portion of the photonic lantern. As described hereinafter in connection with FIG. 9I, for example, the optional active fiber can include a Yb-doped Nufern 25/400 double-clad fiber for further amplification, for example. Other types of active optical fibers may also be used.

In the embodiment illustrated in FIG. 9A, an output beam 917 output from the photonic lantern and active fiber 715 was measured on axis by an SPGD detector 920 (sensor) with an on-axis pinhole 980 centered on the output beam (at the center position for the fundamental spatial mode) in front of the detector 920. While various means may be used to sample output beams using various sensors in other embodiments, in the embodiment illustrated in FIG. 9A, a beam splitter 988 was used to sample the output beam by reflecting a portion 918 of the output beam toward the detector 920. The electrical output from the detector 920, an electrical SPGD signal 921, was monitored by an SPGD controller 922, which was operationally coupled to the phase modulators 926 via control signals 924 to optimize the phases $\theta_1$, $\theta_2$, and $\theta_3$ of the input beams to optimize them to produce a fundamental mode at the output of the photonic lantern. While these SPGD control methods are known, they have not been previously applied in devices and methods described herein for active control of a waveguide-based, optical spatial mode conversion device. Apart from general SPGD control techniques known in the art, specific SPGD control details for particular embodiments are described hereinafter. In the embodiment of FIG. 9A, the individual input amplitudes in the photonic lantern are said to be equal by using the 1×3 splitter 978, in accordance with the principles described at 854a in FIG. 8C.

FIG. 9A also depicts, schematically, a system module 950 that includes the electro-optic beam controller 900, the laser 976, splitter 978, gain fiber 715, and beam splitter 988 used to acquire the SPGD control signal. The system module 950 can form part of a communications system, imaging system, fiber laser system, fiber amplifier system, or laser material processing system, as further described herein. Furthermore, the system module 950 can form part of any other system that can benefit from the dynamic, electro-optic control of output beam mode that electro-optic controllers described herein can provide.

FIG. 9B includes beam profile images and a graph illustrating the effect of applying SPGD control in the controller 922 in FIG. 9A to the phase modulators 926. Beam profile measurements can be obtained using a variety of beam profilers, including the beam profile apparatus described hereinafter in connection with FIG. 9G. In particular, at 982a, a beam profile measurement of the output of the photonic lantern 752 is shown with the SPGD controller turned off and the phase modulators 926 remaining unmodulated and fixed. As can be seen at 982a, without SPGD control, the output mode of the photonic lantern 752 is multimode and is not purely fundamental. In contrast, at 982b, a beam profile is shown with SPGD control on. Under this circumstance, the output beam includes a fundamental mode and is almost entirely pure, suppressing other modes otherwise supported by the multimode fiber.

Further in FIG. 9B, at 984, a graph 984 shows SPGD signal as a function of time, with negative times showing the SPGD signal 921 with SPGD control turned off, and positive times showing the SPGD signal with SPGD control turned on.

Figure 9C:
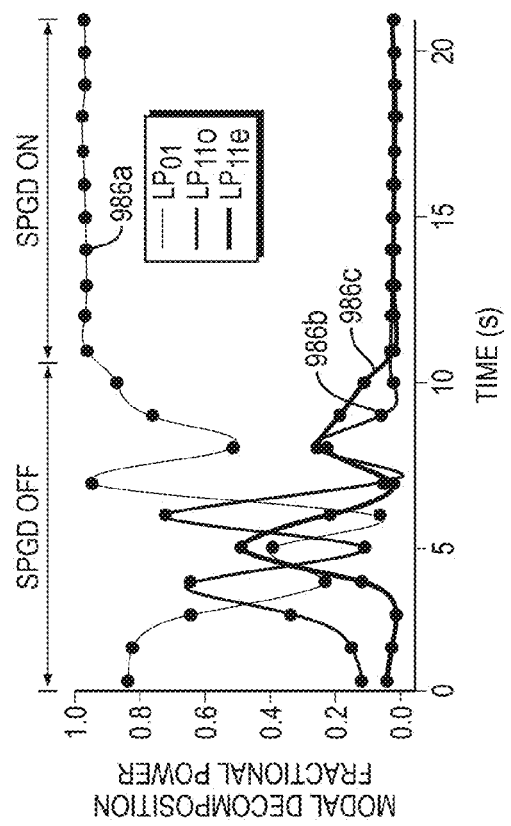
FIG. 9C is a graph showing modal decomposition fractional power as a function of time, without and with SPGD control.
Figure 9I:
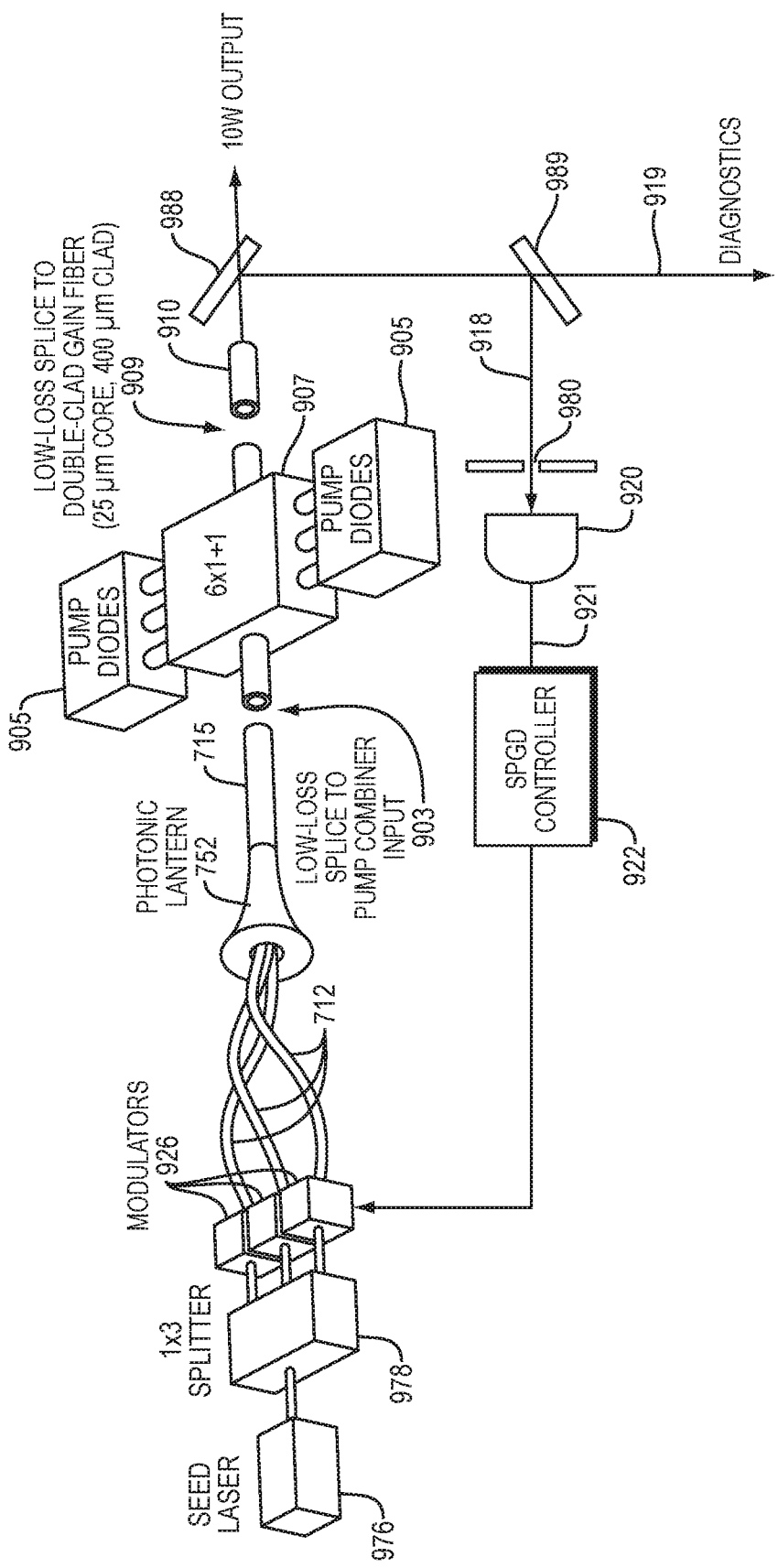
FIG. 9I is a schematic diagram showing how an electro-optic beam controller can include fiber amplification to obtain stabilized, fundamental mode outputs on the order of 10 W.

FIG. 9C is a graph showing modal decomposition fractional power as a function of time, with SPGD control in FIG. 9A turned off prior to about the 10 second mark, and SPGD control turned on after about the 10 second mark. In particular, a line 986a shows the fractional power for the $LP_{01}$ mode, with lines 986b and 986c showing fractional powers for the $LP_{11o}$ and $LP_{11e}$ modes, respectively. These modal decomposition fractional powers are further described hereinafter as a useful diagnostic for maintaining mode control at the output with the SPGD control or other methods of control. Using beam controllers and methods described herein, most of a total optical power carried by a common, multimode waveguide can be carried by the fundamental mode, such as between 90% and 100% of the total optical power. Such a percentage can be derived from measurements such as those shown in FIG. 9C. For example, if the fractional power in the fundamental mode is 0.93, then 93% of the total optical power is carried by the fundamental mode in the multimode waveguide.

FIGS. 9D-9F are images showing a three-channel photonic lantern fabricated according to the pattern illustrated in FIG. 7. In particular, FIG. 9D is a cross-sectional image near the entrance of the photonic lantern and corresponding to the upper cross-sectional drawing shown in FIG. 7. In particular, the cladding 748a had a diameter of 800 μm, while the single-mode fibers 712 were surrounded by a capillary tube having diameter 205 μm. FIG. 9E is a cross-sectional image of the multimode fiber portion 714 and multimode core 736b corresponding to the lower cross-sectional drawing shown in FIG. 7. FIG. 9F is a side view of the photonic lantern 752.

As shown in FIG. 9D, three single-mode fibers 712 are embedded in the capillary tube of lower index. As the tube and individual fibers are heated and stretched, both the individual fibers and the capillary tube are tapered. At the output, which is shown in FIG. 9E, the individual fiber cores have become vanishingly small, and the individual fiber claddings have merged to become the core of the output multimode waveguide. The capillary tube has become the cladding of the output multimode waveguide. The indices and taper diameters are designed to match the desired multimode output waveguide. In FIG. 9F, the photonic lantern is spliced onto a desired output waveguide corresponding to a double-cladding multimode fiber with a core diameter of ~25 microns and a double cladding outer diameter of approximately 450 microns.

The three-channel photonic lantern can be fabricated using a similar tapering process to that described in detail elsewhere. The fabrication process used for testing purposes is briefly summarized as follows. Three single-mode fibers are placed into a capillary tube. The input fibers are tapered until the fiber modes become guided by their cladding, which adiabatically becomes the core of the output fiber, and the capillary tube becomes the new cladding of the output fiber. The index of the capillary tube and the individual fiber claddings determine the index contrast of the output waveguide and can be chosen to match the numerical aperture (NA) of the delivery fiber. The final core size was designed to mode-match the delivery fiber, which consisted of a 0.065 NA, 25-micron core. The measured insertion loss of each individual fiber into the core of the delivery fiber was less than 3 dB.

The NA of the particular photonic lantern shown in FIG. 9E was not perfectly NA matched to the output fiber. As a result of this mismatch, there was some loss associated with imperfect input coupling at the interface between the photonic lantern output and the splice to the delivery fiber. However, this mismatch can be improved by designing the photonic lantern to match more closely the output waveguide in order to minimize the losses if necessary. In principle, losses much less than 1 dB may be achieved.

FIG. 9G is a schematic diagram illustrating a measurement apparatus that can be used to measure beam profile, as well as modal decomposition to determine modes and relative strengths thereof present in an output beam from a multimode fiber. FIG. 9G shows an LMA fiber 915, which can be the same as, or coupled to, the delivery fiber 714, 715 illustrated in FIG. 7, for example. The LMA fiber may or may not be active in the sense of providing optical amplification. In other embodiments, the LMA fiber 915 is spliced to an active amplification fiber, to another section of a delivery fiber, or to the photonic lantern 752 directly, for example. At an output 950 of the LMA fiber 915, free-space optical lenses 990 are used to provide a collimated beam 918 of appropriate diameter for further analysis. A spatial light modulator 992 is configured to mask the beam such that different modes $LP_{11o}$, $LP_{11e}$, and $LP_{01}$ can be discerned from a modulated light beam 918'. An objective lens 994 focuses the modulated light beam 918' for detection at an imaging camera 996, which can also be referred to herein as a beam profiling camera. The spatial light modulator can be used to perform modal decomposition in a manner consistent with that used in the art. In particular, the two lenses 990 are used to image relay the output of the fiber onto the spatial light modulator. The pattern on the spatial light modulator multiplies the incoming beam with a transmission amplitude and phase, herein referred to as the mask. The lens 994 is then used to image this output beam onto a Fourier plane or far field. The on-axis intensity component on this plane is proportional to the correlation between the incoming beam and the mask multiplied by the spatial light modulator. By changing the mask to conjugate the modes supported by the multimode fiber, the on-axis intensity can be measured to discern the relative correlations (modal content) of the output beam with the mode under test. For example, the $LP_{11}$ modes can be programmed on the spatial light modulator, and the on-axis component can be observed.

FIG. 9H shows a series of beam profile images 988a-c and corresponding modulated beam images 901a-c corresponding to the modes $LP_{11o}$, $LP_{11e}$, and $LP_{01}$, respectively. The images 998a and 998b denote the profile on the spatial light modulator along with the image in the far-field plane. As shown, the absence of an on-axis intensity component signifies relatively weak projection or $LP_{11}$ modal content of the output beam. On the other hand, the images 901c and 998c illustrate the $LP_{01}$ mask and the corresponding far-field image, respectively. As shown, the strong on-axis component indicates a strong $LP_{01}$ component in the output beam. The relative on-axis intensity signals then allow the relative modal content in the output beam to be determined. Using the modal decompositions provided by these images, the modal decomposition fractional powers illustrated in FIG. 9C, which can also be referred to as normalized modal weights, can be determined.

FIG. 9I is a schematic diagram showing how an electro-optic beam controller can be used in conjunction with fiber amplification to obtain stabilized, fundamental mode outputs on the order of 10 W for a 10 W gain medium. The output power may be further increased by implementing higher gain in the amplifying medium. For example, kW class amplifiers are currently available and kW output power may be achieved. Furthermore, by increasing the mode area output powers beyond what is currently available, it is possible to achieve even greater output powers.

The electro-optic beam controller 900 illustrated in FIG. 9A is coupled to the passive Nufern 25/400 fiber spliced onto an active Yb-doped Nufern 25/400 double-clad fiber to provide gain. The active fiber is diode pumped using a Dilas 30 W pump module 905 that is co-pumped using a 6×1+1 combiner 907, which is fiber-spliced using a low-loss splice 903 between the fiber 715 and the pump combiner input.

The combiner 907 serves to combine the seed signal and the pump light to the double-clad gain fiber line 910, having a 25 µm core and 400 µm cladding, using a low-loss splice 909. A beam splitter 989 is also used in conjunction with the beam splitter 988 to provide both the input light beam 918 to the SPGD sensor detector 920 and also to provide an additional diagnostic beam 919. The diagnostic beam 919 can be used as an input to the beam profiling and modal decomposition camera apparatus illustrated in FIG. 9G, for example.

Light amplitudes in the individual inputs in the photonic lantern were set to be equal. The output of the photonic lantern contribution to the fundamental mode in the passive section of the delivery fiber was observed prior to splicing onto the gain fiber. Based on the observed on-axis amplitude variations of the output for an equal amplitude excitation on the input obtained from sequential on-axis measurements with only a single input channel on at a time, a combining loss $(1-\eta)$ of ~3% was estimated, consistent with a variance of $(\sigma_P^2)/P^2 \sim 12\%$. Accordingly, in this embodiment, a 97% combining efficiency has been observed by modulating only phase. In other embodiments, combining efficiencies may be smaller, such as between 85% and 97%. Furthermore, in embodiments that do not include photonic lanterns, but only photonic chip-based combiners, for example, combining efficiencies may be still smaller, such as between 50% and 75%, for example. Furthermore, in other embodiments that include both phase and amplitude control, greater combining efficiencies, such as between 97% and 100% are possible.

For an ideal delivery fiber, absent mode-coupling dynamics, dynamic amplitude control may not be required, as the delivery fiber will have a static identity transfer matrix. However, in the presence of mode-coupling dynamics, leading to a temporally varying transfer matrix, amplitude control is advantageous for high efficiency, as the overall system transfer matrix is then a product of the lantern transfer matrix with that of the delivery fiber. The impact of amplitude errors on the combining efficiency may be estimated through Eq. (2), and, as illustrated in FIG. 8F, based on the particular time-varying disturbance. For example, the impact of non-uniform coefficients in the first row of the transfer matrix of Eq. (1) may be modeled equivalently as being similar to having uniform coefficients with unequal inputs allowing application of Eq. (2). The fact that amplitudes can be set nearly equal and that no dynamic control of amplitudes is needed in certain embodiments implies that the photonic lantern 752 is near ideal and that mode coupling in the delivery fiber is minimal.

A stochastic parallel gradient descent (SPGD) method can be used by the controller 922 to adaptively determine the appropriate phase to be applied to the input fibers 712 to maximize the on-axis intensity of the output beam 918 using the on-axis-pinhole-masked detector 920. SPGD has been successfully applied to a number of CBC demonstrations. However, for completeness, the operation of the SPGD method as applied to the embodiment of FIG. 9I is described herein.

The desired fundamental mode is the only mode that contains an on-axis component, while the $LP_{11e}$ and $LP_{11o}$ modes have an on-axis null. The pinhole 980 is, thus, placed before the SPGD detector in order to sample the on-axis (or $LP_{01}$) component of the output beam. The SPGD controller applies a dither vector across the three phase modulators, although only two phase modulators are actually needed, as the common phase need not be controlled. The same dither vector is then applied with the opposite sign. Based on the response to the applied dithers, a correction is applied to maximize the signal on-axis. A new orthonormal dither is then applied, and a correction is iteratively applied until the on-axis signal is maximized. The convergence time of the SPGD method is proportional to the number of input fibers and inversely proportional to the dither frequency. For the embodiment of FIG. 9I, frequency dithers can vary widely, and can be up to 100 kHz or higher, for example. It will be recognized that, in other embodiments where the $LP_{11e}$ or $LP_{11o}$ mode or another multimode beam having more than one intensity peak in the output beam profile is desired to be produced, a mask can include multiple holes or pinholes corresponding to respective locations of peaks in the desired beam profile.

The SPGD signal along with a representative mode before and after the SPGD is turned on in the apparatus of FIG. 9I, is shown in FIG. 9B as described hereinabove. In greater detail, when SPGD is turned off, the output of the fiber is generally a superposition of the $LP_{01}$ and both $LP_{11}$ modes. Shown at the top left of FIG. 9B is the single-frame beam profile image 982a of the output of the fiber with SPGD control off. With the SPGD turned off, the output beam resembles the $LP_{11}$ modes with reduced on-axis intensity. When SPGD is turned on, the on-axis intensity is maximized, and the SPGD signal rapidly increases.

The gain in the double-clad gain fiber 910 in FIG. 9I can be set to produce 0.5 W of output power, for example. Such a lower gain value can be used in order to maintain a low level of backward emission so as to prevent damage to the phase modulators 926 and fiber connections. Inserting isolators after the phase modulators 926 and splicing all fiber components can allow increased output power in various embodiments, including in variations of the apparatus of FIG. 9I. The output beam is observed to converge to the $LP_{01}$ mode as shown at 982b in FIG. 9B. Furthermore, since the SPGD signal increases, CBC increases the brightness of the output, as anticipated.

In order to further quantify the performance of the photonic-lantern ASMC illustrated in FIG. 9I, modal analysis of the output can be performed with a spatial light modulator (SLM) using a correlation filter method as described in connection with FIGS. 9C and 9G-9H. The desired mode to be analyzed can be projected onto the SLM. The multiplication of the incident field with the SLM pattern can result in a correlation in the far field. The on-axis component of the far field can provide the appropriate modal weighting intensity. An example modal decomposition from measurements of this type is shown in FIG. 9C, as described hereinabove. This example modal decomposition was taken from the photonic lantern output that was spliced into a passive 25/400 fiber prior to being spliced into the gain fiber.

As shown in FIG. 9C, a random time-varying phase of the individual inputs to the photonic lantern can result in a time-varying superposition of incident modes before SPGD is turned on. Once SPGD is turned on, the on-axis component rapidly increases, with the end result of achieving high combining efficiency into the desired mode. FIG. 9C shows a particular example of achieving 97% combining efficiency into the fundamental mode, for example. The example result shown in FIG. 9C is consistent with the expected combining efficiency loss resulting from applying a phase-only correction. Greater combining efficiencies, such as between 97% and 99%, can be obtained by using amplitude correction in addition to phase correction in the individual waveguide inputs.

These measurements can also be repeated after the photonic lantern is spliced into the gain fiber, as illustrated in FIG. 9I. At example output power levels of 0.5 W, the modal decomposition resulted in all of the power being delivered to the fundamental mode within the accuracy of the modal decomposition (estimated to be about ~1%). The slight increase in performance can be attributed to the improved modal overlap of the fundamental mode with the doped core, which provides additional modal discrimination. In the particular embodiment of FIG. 9I, polarization does not play a role, because the photonic lantern 752 is effectively non-birefringent. Notwithstanding the ability of the embodiment of FIG. 9I to operate at 0.5 W, it may also operate at fundamental mode output powers on the order of 10 W, such as 5 W, 10 W, 50 W, or 100 W, for example. For an output beam of 10 W power, a high fundamental mode beam quality, as indicated by an example measured $M^2$ value of 1.17, has been achieved, for example.

Figure 10A:
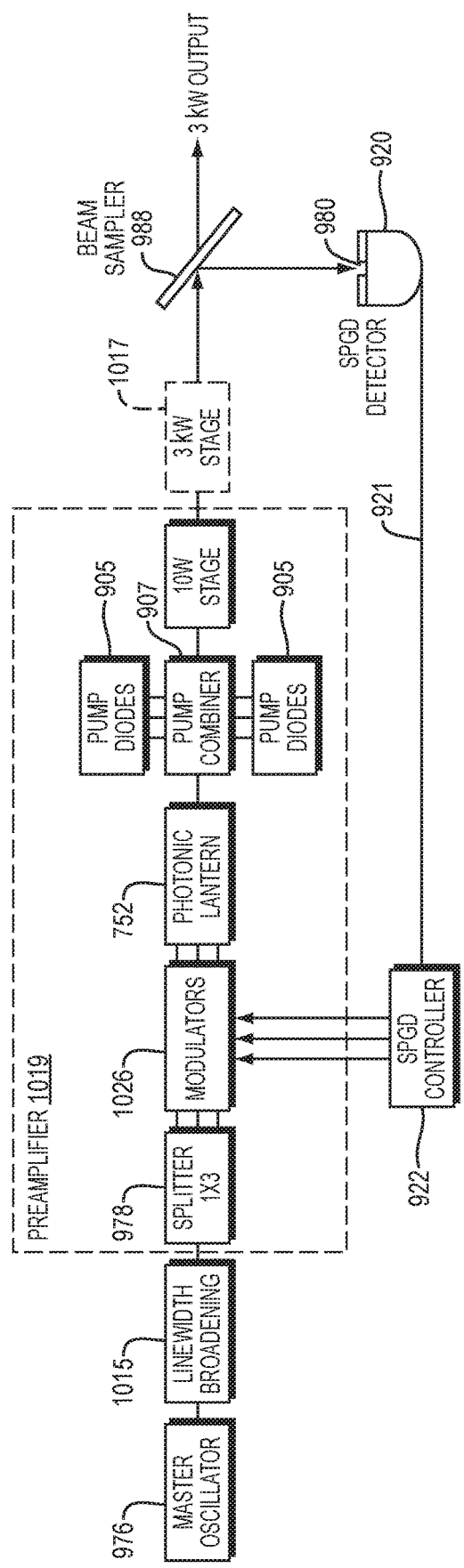
FIG. 10A is a schematic diagram illustrating an embodiment beam controller that can produce a stable, fundamental mode output on the order of 3 kW of average power.

FIG. 10A is a schematic diagram illustrating an embodiment beam controller that can produce a stable, fundamental mode output on the order of 3 kW of average power. In particular, the splitter 978, modulators 1026, photonic lantern 752, pump diodes 905, and pump combiner 907 as described in connection with FIG. 9I are used as a preamplifier 1019 providing a 10 W output to seed a 3 kW fiber amplifier 1017.

Figure 11B:
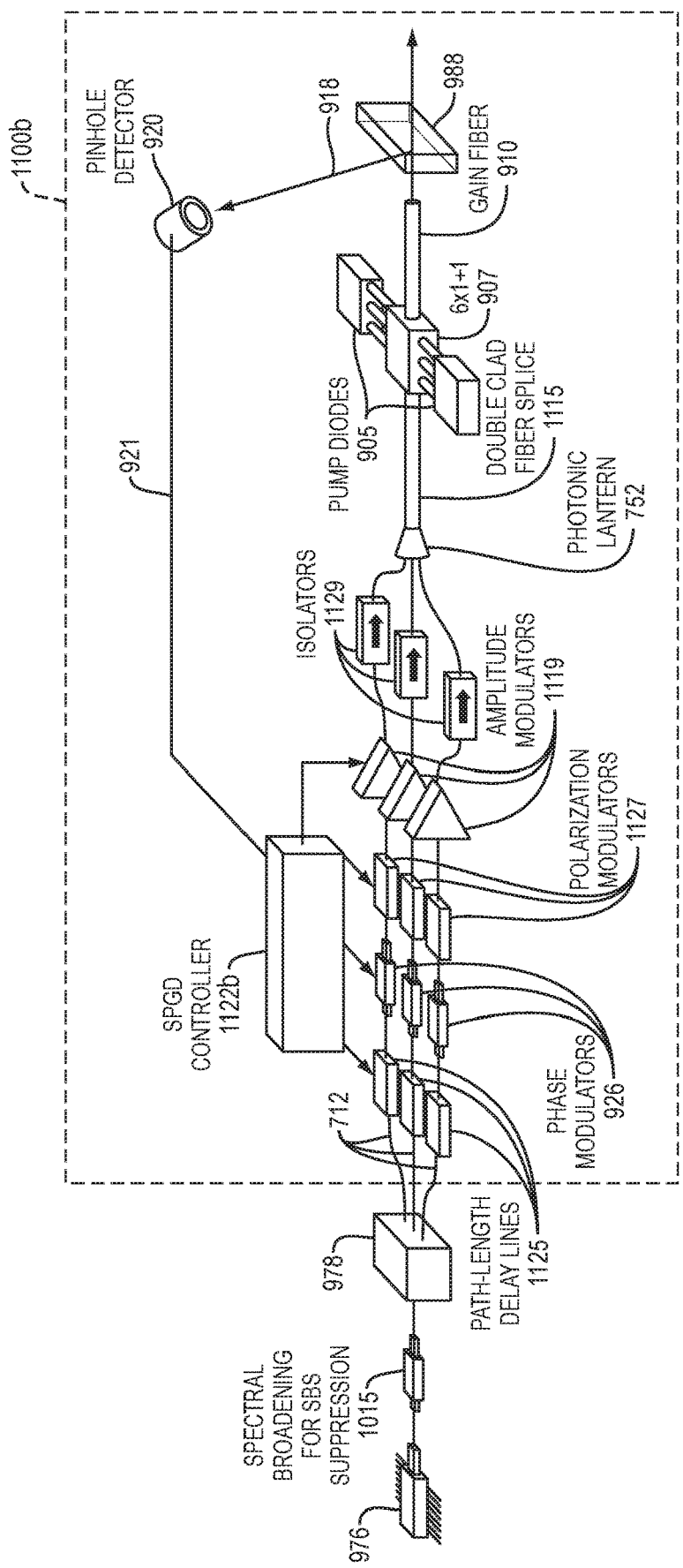
FIG. 11B is a schematic diagram illustrating an embodiment beam controller device including path-length, phase, polarization, and amplitude control with isolation.

The modulators 1026 may include polarization, phase, and amplitude modulators. Furthermore, path-length delay lines may be provided for the individual waveguide paths, as illustrated in FIG. 11B, for example. Such path-length delay lines may be controlled via an SPGD controller, as illustrated in FIG. 11B, or by a separate controller (not shown) that may be synchronized with the SPGD controller. The kW class stage may contain tap-couplers and monitors that monitor the input signal to ensure that sufficient seeding is provided to obtain high electrical-to-optical efficiency. Control circuitry may be implemented to shut down the pump diodes in case the signal level drops below a critical value. Taps may also be inserted in the kW stage to monitor the backward power, which may safely shut-off the power in the event of large reverse power buildup arising from nonlinearities. Furthermore, the kW class stage may include optical isolators to isolate the seeding stage from the high power gain stage. In addition, the kW stage may include thermal heat sinks onto which the fiber is mounted to allow for thermal cooling of the waste heat generated in the fiber. The fiber may be coiled to appropriate diameters to achieve a desired loss for the higher-order modes.

The device illustrated in FIG. 10A also includes linewidth broadening 1015. The linewidth broadening can be used to suppress a number of nonlinearities. It may be implemented by using an electronic noise source to drive a phase-modulator. Linewidths of ~30 GHz are typically used in kW class amplifiers.

It should be noted that, in the embodiment of FIG. 10A, the 3 kW output beam is sampled by the SPGD detector 920 and pinhole 980 to provide the input signal (SPGD signal) 921 to the SPGD controller 922. Thus, while existing kilowatt-class fiber amplifiers can be limited to 1.5 kW, for example, due to limitations imposed by HOMs, embodiments described herein, including that of FIG. 10A, can be used with active control of input modes to achieve powers between 0.3 kW and 30 kW (e.g. 3 kW) with a stabilized, fundamental mode output beam. The above power levels refer to continuous wave laser operation. However, other embodiment electro-optic beam controllers can operate in pulsed mode, resulting from one or more individual pulsed seed laser input sources for respective input waveguides, for example.

Figure 10B:
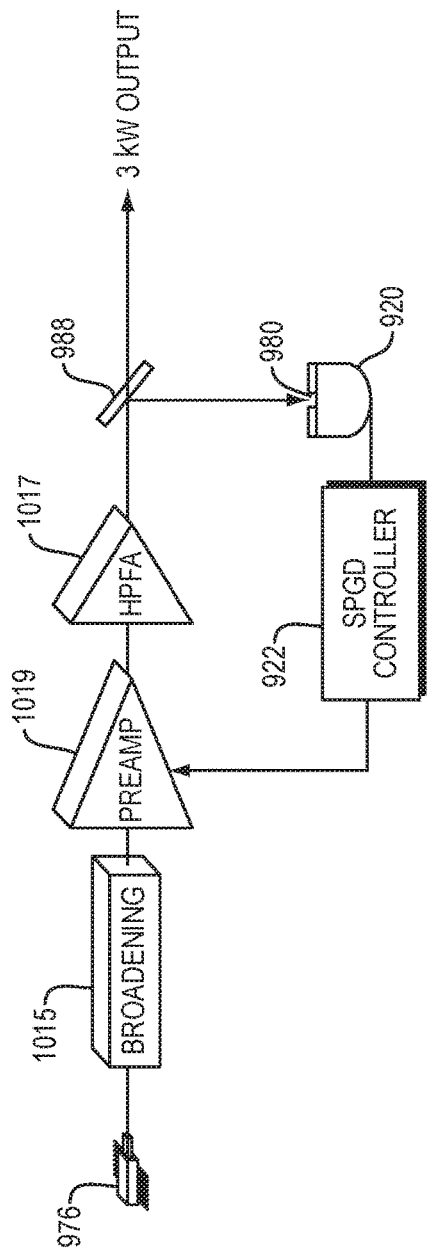
FIG. 10B is a schematic diagram illustrating, in an alternative manner, the 3 kW device as illustrated in FIG. 10A.

FIG. 10B is a schematic diagram illustrating the same 3 kW device as illustrated in FIG. 10A, an alternative form. In particular, the 3 kW stage 1017 shown in FIG. 10A is shown in the form of a high-power fiber amplifier (HPFA) in FIG. 10B. Typically, the preamp generates a 10 W output beam to seed the HPFA. The preamp may consist of the laser, linewidth broadening, splitter, polarization, phase, amplitude, and path length delay lines, followed by a photonic lantern spliced into a pump-signal combiner that seeds a 10 W output stage. The 10 W output stage may then be isolated. Alternative configurations are possible and may consist of isolated preamp stages seeding the inputs to the photonic lantern, which is then spliced directly to the HPFA stage, as described in connection with FIG. 11B, for example.

FIG. 11A is a schematic diagram illustrating how amplitude modulation can be implemented, in addition to phase modulation, in embodiment devices and methods. In general, it is desirable for the amplitudes of the various input beams to be set to particular respective values in order to achieve the desired mode with high efficiency. The impact of amplitude error on combining efficiency is generally less than the impact of phase error. Thus, embodiments may operate without any amplitude control. However, amplitude control can be implemented in embodiments in which the required mode content injected out of a photonic lantern requires dynamic amplitude variations that would degrade the combining efficiency below a desired threshold. With an array of inputs, the standard deviation of the amplitude error determines the impact of the amplitude on the combining efficiency. In this way, the impact of amplitude error is lessened by the statistical variation of the array and the laws of averaging.

The embodiment of FIG. 11A includes an electro-optic beam controller 1100a having modulators 1126 that modulate both phase and amplitude of light beams carried by the respective, individual input optical waveguide 712 based on control signals from an SPGD controller 1122a.

In the controller 922 illustrated in FIG. 9I, only on-axis power is used to control the modulators 926. The Strehl SPGD metric used by the controller 922 is insensitive to average power. Thus, in contrast to FIG. 9I, the controller 1122a in FIG. 11A is configured to use a ratio of on-axis power to total power in the output beam from the photonic lantern. For amplitude modulation, the ratio of on-axis power to total power is more suitable, as implemented in the controller 1122a.

In order to receive the necessary signals for the type of control illustrated in FIG. 11A, the embodiment of FIG. 11A includes both the additional beam splitter 989 and a mirror 1188 to obtain two samples of the output beam. One sample is detected by the SPGD sensor 920 with pinhole 980 to obtain the on-axis power, while a second SPGD sensor (photodiode) 1120 lacks a pinhole and is used to obtain an average, total power metric across the entire profile of the beam. These two signals are then input into the SPGD controller 1122a in order to obtain the ratio of the two signals.

FIG. 11B is a schematic diagram illustrating an embodiment electro-optic beam controller 1100b, together with the seed laser 976 illustrated in FIG. 9A, the linewidth-broadener 1015 to provide spectral broadening for suppression of SBS, and the 1×3 splitter 978 illustrated in FIG. 9A to couple the seed laser output into separate, individual light beams carried on the individual optical waveguide paths 712, which are also illustrated in the photonic lantern combiner of FIG. 7.

The electro-optic controller 1100b includes an SPGD controller 1122b that controls path length, phase, polarization, and amplitude. The controller 1122b performs this control via inputs to path-length delay lines 1125, the phase modulators 926 also illustrated in FIG. 9A, polarization modulators 1127, and amplitude modulators 1119, respectively, with one modulator of each type in line with a respective one of the individual fiber waveguides 712. In addition to SPGD controlled parameters, the controller 1100b also includes optical isolators 1129 in line with each of the individual fiber waveguides 712 to prevent pump light from the downstream pump diodes 905, as well as back reflections from any other downstream optical components, from reaching the seed laser 976.

As described hereinabove, with a more complete set optical parameters controlled dynamically, as in the controller 1100b, control of a desired output mode can be obtained more effectively, with greater output mode stability and greater combining efficiencies, such as between 97% and 100%, for example.

After the individual light beams are combined to produce a common output light beam by the photonic lantern 752, the common output beam can be amplified by a double-clad fiber splice 1115, which is coupled to the pump diodes 905 and downstream gain fiber 910 via the 6×1+1 splitter 907, which is also illustrated in FIG. 9I. The amplified arrangement of FIG. 11B, like the embodiment illustrated in FIG. 9I, can produce output powers output from the gain fiber 910 on the order of 10 W. However, the device of FIG. 11B can, like other embodiments, be extended to mode-controlled output powers in the kW range, such as on the order of 3 kW, as illustrated in FIGS. 10A-10B, for example. Furthermore, as described in connection with FIG. 12, still higher mode-controlled output powers can be obtained by further extension of the methods described herein, such as on the order of 12 kW or higher.

The controller 1100b also includes the beam splitter 988 and pinhole detector 920, with detector output 921 as input to the SPGD controller 1122, in order to provide single-mode beam control in the output multimode gain fibers 1115 and 910. In other embodiments, a mask other than a pinhole may be used in connection with the pinhole detector to set an output beam representing a higher order mode or combination of modes.

FIG. 11C is a cross-sectional view of a double-clad gain fiber 1135 that can be used in embodiments for optical amplification in optical fibers. For example, the double-clad fiber 1135 may be used in place of the active fiber 715 illustrated in FIG. 7, for example, with similar core sizes. A core 1136 of the fiber 1135 guides signal light and is doped for amplification. Pump light also propagates in cladding glass 1148 for pumping, and an outer (double) cladding 1149 causes confinement of the pump light within the cladding glass. The outer cladding 1149 can be made of a polymer. While single-clad gain fibers may be used in embodiments, double-clad gain fibers have the advantage that high-power electo-optic beam controller embodiments can provide kilowatt-level output powers and still maintain good beam quality of signal light (common light beam) in the core, including diffraction-limited beam quality.

FIG. 12 is a schematic diagram illustrating one way in which embodiment devices and methods can be extended to provide still higher output powers, such as on the order of 3 kW, even with a fundamental mode, by using active control similar to that described hereinabove. In particular, on the left of FIG. 12 are shown the three individual optical fiber inputs (channels) 712, the photonic lantern 752, with 20 to 25 μm core at the output, and the active gain fiber 715, with core size of 25 μm, which can be used to provide output powers up to the kilowatt range, such as on the order of 3 kW. However, for still higher output powers, it is preferable to use larger cores (modal areas) to limit the effect of nonlinearities.

While larger fiber core sizes can accommodate HOMs, which are often undesirable, additional input channels can be provided to a photonic lantern, as described above, and appropriately modulated, in order to enhance the fundamental mode propagating in the output and to inhibit (suppress) other modes. Thus, on the right of FIG. 12 is shown a photonic lantern 1252 with 12 respective, individual optical waveguides (optical fibers in FIG. 12) 1212 that can carry respective light beams that can be modulated in phase or amplitude, for example. The output of the photonic lantern 1252 includes a 50 μm core for a modal area, and optical power accommodation, of approximately four times higher than that shown at the left of FIG. 12. An active gain fiber 1215 having a core size of 50 μm, for example, can then permit propagation of a beam with a total output power on the order of 12 kW, for example. Furthermore, with appropriate modulation of the beams carried by the individual fibers 1212, most or all of the power carried by the fiber 1215, or output therefrom, can be in a fundamental mode of the fiber 1215. In order to modulate greater numbers of channels, it can be preferable for an SPGD controller to operate at higher rates. For example, the SPGD controller illustrated in FIGS. 9A, 9I, and 10A-10B has been operated at up to 800 kHz, for example.

Generally, the convergence time τ of an SPGD controller is proportional to the number of elements N being controlled and inversely proportional to the update rate f (τ=kN/f) and is related by a constant of proportionality of k~2. The inverse of the convergence time is proportional to the disturbance rejection bandwidth (Δf~1/T). For a desired rejection bandwidth, the update rate should generally be increased in proportion to the number of elements. One skilled in the art will recognize that parallel loops can be used to further increase the rejection bandwidth without increasing the update rate. For example, subarrays of input fibers may be coherently combined using arrays of pinhole detectors. The subarrays may then be combined together using a global pinhole detector.

Accordingly, as described hereinabove, a multimode optical fiber at the output of embodiment controller devices can include a fiber core with diameter in a range of 20 to 50 μm. Furthermore, in some embodiments, a common, multimode optical waveguide can include a fiber having a core with diameter in a range of 20 to 200 μm or greater, for example. Increasing the modal diameter or area will generally increase the number of modes supported and also increase the number of inputs that may be needed for optimum combining efficiency and mode control of the common light beam.

FIGS. 13A-13B are a schematic diagram and graph, respectively, that illustrate example ways in which a beam can be mode-optimized and steered during operation using the embodiment controller devices and methods. In particular, the schematic diagram in FIG. 13A illustrates various device elements included in other figures, including the master oscillator (seed laser) 976, 1×3 splitter 978, modulators 926a-c, photonic lantern beam combiner 752, multimode output fiber 714, beam splitter 988, split beam 918, SPGD detector 920 with a pinhole 980, SPGD signal 921, and control signals 924. A representative lens 1390 for collimating the output of the fiber 714 is also included in FIG. 13A. Those skilled in the art of using beams output from optical fibers will understand that a wide variety of beam collimating, beam conditioning, and beam steering optics may be used at the output of the fiber 714.

The device illustrated in FIG. 13A also has means for optimizing and steering the output beam 1342, which results from a fundamental spatial (transverse) mode propagating in the optical fiber 714. As illustrated in FIG. 9C, with SPGD control, the modal composition of the output beam 1342 can be controlled and optimized to select a fundamental mode and to suppress other modes propagating in the fiber 714 and output therefrom, for example.

With SPGD control turned off, as illustrated in approximately the first 10 seconds of the graph shown in FIG. 9C, the modal composition of the beam propagating in the output fiber 714 is uncontrolled, and various modes propagate, and this modal composition changes over time due to thermal drift in the system. However, with the SPGD control turned on, the fundamental mode is set, while the other modes are suppressed, as shown in the graph in FIG. 9C in the time range after about 10 seconds.

Over time, the signal 986a in FIG. 9C, corresponding to the fundamental mode, may still degrade, and the signals 986b-c, corresponding to other modes, may increase if no further optimization is performed, due to thermal drift or other instabilities, for example. Thus, in accordance with principles of active control, as described herein, optimization may be performed either continuously or during optimization time intervals. An example use of optimization time intervals is further described hereinafter in connection with FIG. 13B.

As illustrated in FIG. 13A, particular phase shifts $\theta_1(t)$, $\theta_2(t)$, and $\theta_3(t)$ are applied to the respective fibers input to the photonic lantern 752 by respective phase modulators 926a-c. It should be understood that in other embodiments that are variations of FIG. 13A, additional types of modulation may be included, as described in connection with other embodiments. A particular SPGD controller 1322 is configured to control the modulators 926a-c over time to optimize the output beam 1342 by optimizing the fundamental mode propagating in fiber 714 and suppressing other modes during intervals, as illustrated in FIG. 13B.

FIG. 13B is a graph illustrating changes to the three phase modulation signals $\theta_1(t)$, $\theta_2(t)$, and $\theta_3(t)$ as a function of time t. The changes can be applied to modulators 926a-c in FIG. 13A, for example, to achieve active control of output mode during a total phase correction cycle 1316. In particular, the phase signal $\theta_1(t)$ can be broken down into two components as $\theta_1(t)=\theta_{1,\ initial}+\Delta\theta_a$. The initial phase condition $\theta_{1,\ initial}$ represents the phase applied to the modulator from a previous phase correction cycle. During a time period 1317a, which can be referred to as a dither and measurement interval or mode optimization interval, a small phase (not drawn to scale) $\Delta\theta_a$ can be applied. The response (e.g. photodiode signal 921) to this applied dither can be measured on-axis (at the center of the combined beam as output from the beam combiner). At a time interval 1319a, the same phase with the opposite sign, $-\Delta\theta_a$, can be applied, and the response to this dither can be measured on-axis. Based on the response to these dithers, a correction can be made, and $\theta_{1,\ initial}$ is updated on the next iteration cycle. The measurement in response to the positive dither $\Delta\theta_a$ may be referred to as $M^+$, and the response to a negative dither as $M^-$, and the phase correction may then be written as $\theta_1=\theta_{1,\ initial}+g(M^+-M^-)/(M^++M^-)\ \Delta\theta_a$, where g is known as the SPGD gain. This iterative dither, measurement, and correction is known in the art as SPGD.

In addition to the corrections for phase modulator 926a described above, corrections for phase modulators 926b and 926c can be similarly performed using $\theta_2(t)=\theta_{2,\ initial}+\Delta\theta_b$ and $\theta_3(t)=\theta_{3,\ initial}+\Delta\theta_c$, respectively, during intervals 1317b and 1319b and 1317c and 1319c, respectively. The dithers $[\Delta\theta_a, \Delta\theta_b, \Delta\theta_c]$ are applied simultaneously in FIG. 13B and form a vector. While these dithers can be random in some embodiments, the optimal dither vectors used in subsequent cycles are orthogonal to those used in previous cycles. In the example correction and steering process illustrated in FIG. 13B, therefore, the dithering performed during time intervals 1317a-c and 1319a-c can be referred to as "modulating" the optical parameter phase of respective light beams in the individual optical fibers input into the photonic lantern 752 illustrated in FIG. 13A. Furthermore, the phase adjustments to perform steering, which are optionally completed during the steering interval 1321, can also be referred to as "modulating" the phase. The corrections made to $\theta_1$, $\theta_2$, and $\theta_3$ as described above can be referred to as controlling the plurality of phase modulators to set the one or more spatial modes desired. In the embodiment of FIG. 13A, the beam-center pinhole mask 980 is used for selection of only the fundamental mode of the output fiber 714.

As is known, in between dithers and measurements, an arbitrary phase can be applied without affecting the correction to $\theta_{1,\ initial}$. This period of the cycle can be referred to as the steering cycle or steering interval 1321. A phase could be applied to steer the beam, or to change the mode pattern. It is assumed that the change from the initial on-axis intensity mode, to the desired mode-pattern is known a priori. As such, feedback is not required during the steering cycle 1321 and it is, therefore, considered to occur in an open loop fashion during the interval 1321.

From the SPGD expression given above, it should be noted that when an optimal value is achieved, $M^+=M^-$ and no correction need be applied to the initial phase values for a phase correction cycle. This could be interpreted as having achieved a maximum (on top of a hill in a graph of measured values) in which a dither applied to either side of the peak results in the same measured response values $M^+$ and $M^-$. It should be understood that the dithering and steering intervals illustrated in FIG. 13B are representative only, and many variations thereof may be used in various embodiments. It should also be understood that "active" mode control, as used herein, encompasses optimizing the beam only at intervals. The combination of three optimization periods 1317a-c may be considered one full optimization period encompassing the three degrees of freedom included in the embodiment of FIG. 13A. This full optimization period may be followed by a fixed period during which the output mode is considered to remain optimized and can be used for the normal purposes of a specific system, such as communications, laser material processing, etc. Fixed periods during which a desired output mode may remain sufficiently stabilized without further dithering and optimization can vary in time length, depending on the degree of drift otherwise present in a system due to mechanical or thermal disturbances, for example. Such fixed periods can also vary depending on the tolerance of a given embodiment system to increasing presence of any undesired modes. Such fixed periods can be on the order of 1 ms, 10 ms, 100 ms, or 1000 ms, or other ranges, for example.

Smaller fixed intervals (corresponding to more frequent beam optimizations, such as on the order of 1 Hz, 10 Hz, 100 Hz, or 1 kHz or higher, for example) are generally preferable in order to maintain optimum beam mode in the presence of thermal drifts, mechanical disturbances, or other sources of mode degradation in an embodiment device. Degradation of mode stabilization may be indicated, for example, by a decrease in the SPGD signal 921 or a decrease in the modal decomposition fractional power for a desired mode, such as the fractional power 986a illustrated in FIG. 9C. These signals can be compared against given threshold tolerances considered acceptable in a given embodiment in order to trigger beam optimization. As an alternative, beam optimization (maintenance) may occur at regular, fixed intervals.

Other details of SPGD-type control are known in the art, and a person of ordinary skill in the art, together with the disclosure provided herein, would understand how to optimize for various particular embodiments in order to achieve desired results. Furthermore, embodiments described herein are not limited to SPGD control. Instead, embodiments may benefit from other control and optimization methods. In embodiments that include modulation of amplitudes and polarizations of the individual inputs, as well as path length delays of one or more individual inputs, these parameters can be dithered and optimized in a manner similar to that illustrated in FIG. 13B for phase optimization.

Thus, the plurality of modulators 926a-c may be controlled by the SPGD controller 1322 (modulation controller) during alternating optimization intervals (also referred to herein as adjustment periods) and any fixed periods in order to first optimize the spatial mode of the common light beam (e.g., fundamental mode) during the adjustment periods and then set the modulators to constant-value settings during fixed periods. During the fixed periods, a system incorporating embodiment beam mode controller devices and methods can operate normally. Operation of a controller may, however, include adjustment of phases for beam steering purposes, as described hereinafter.

FIG. 13B also illustrates how the $\theta_1(t)$, $\theta_2(t)$, and $\theta_3(t)$ may be varied over time to steer the output beam 1342. In general, a phase of one or more of the respective light beams input into the photonic lantern 752 may have their phase adjusted by the controller to steer the common light beam 1342 output from the multimode fiber 714. FIG. 13B illustrates a steering interval 1321, during which the phases $\theta_1(t)$, $\theta_2(t)$, and $\theta_3(t)$ are varied to change the output beam 1342, at a central position in the far field, to a pattern 1342' that is spatially varied from the central position in the far field. It should be understood that, in other embodiments, the phases can be adjusted according to other functional patterns as desired for appropriate steering of the output beam, and the phases may not be aligned for appropriate steering in various cases.

Appropriate steering of the output beam may be described by a transfer matrix mapping phases $\theta_1$, $\theta_2$, and $\theta_3$ to output beam positions. Positions may be determined based on, for example, a diagnostic camera, as illustrated in FIGS. 9G and 9H, at the position of the diagnostic beam 919 in FIG. 9I, for example. Generating a desired output pattern may include two tasks. First, the desired output pattern is represented by the basis corresponding to the modes supported in the multimode fiber. This may be performed by determining an overlap integral to find the amplitudes and phases of the coefficients of the various modes. This corresponds to determining the weights of the components used to represent the desired pattern. In general, the more modes that are used to represent the desired pattern, the finer the resolution that can be achieved, as the higher-order modes contain finer structure corresponding to more transverse variation.

Next, once the modal weights and amplitudes are known, the phases may be determined by knowledge of the systems transfer matrix that allows determination of which phase conditions on the inputs generate the desired modal content on the output. The transfer matrix of the system can be determined using a number of methods known in the art. One method may involve inputting a beam into a single fiber, one at a time, while performing a modal decomposition using a spatial light modulator as previously described.

Alternative methods of steering the beam may involve translating the SPGD detector and pinhole. The SPGD method will then find the optimal input beam parameters to maximize the intensity at a new beam axis position, off-axis from the original position. For example, the optimal output corresponds to the brightest spot possible that provides maximum overlap with the pinhole. These input parameters may be read off and used as a calibration. Once calibrated, these input values could be applied to steer the beam, in an all-electronic manner, from an on-axis position to an off-axis position during an open loop steering cycle.

It will be understood that, while optical amplification is not shown in FIG. 13A, embodiments that include amplification, such as those illustrated in FIGS. 9I, 10A and 10B, can also include beam steering by combining various features illustrated in FIG. 13A and FIG. 13B, for example. Furthermore, while the beam steering illustrated in FIGS. 13A and 13B relates to the use of three modulators and a multimode fiber of core diameter 20 to 25 µm, other embodiments, such as that illustrated in FIG. 12, may include larger diameter cores, higher numbers of input fibers, and higher output powers, and may implement beam steering using principles similar to those described in connection with FIGS. 13A-13B.

Figure 14:
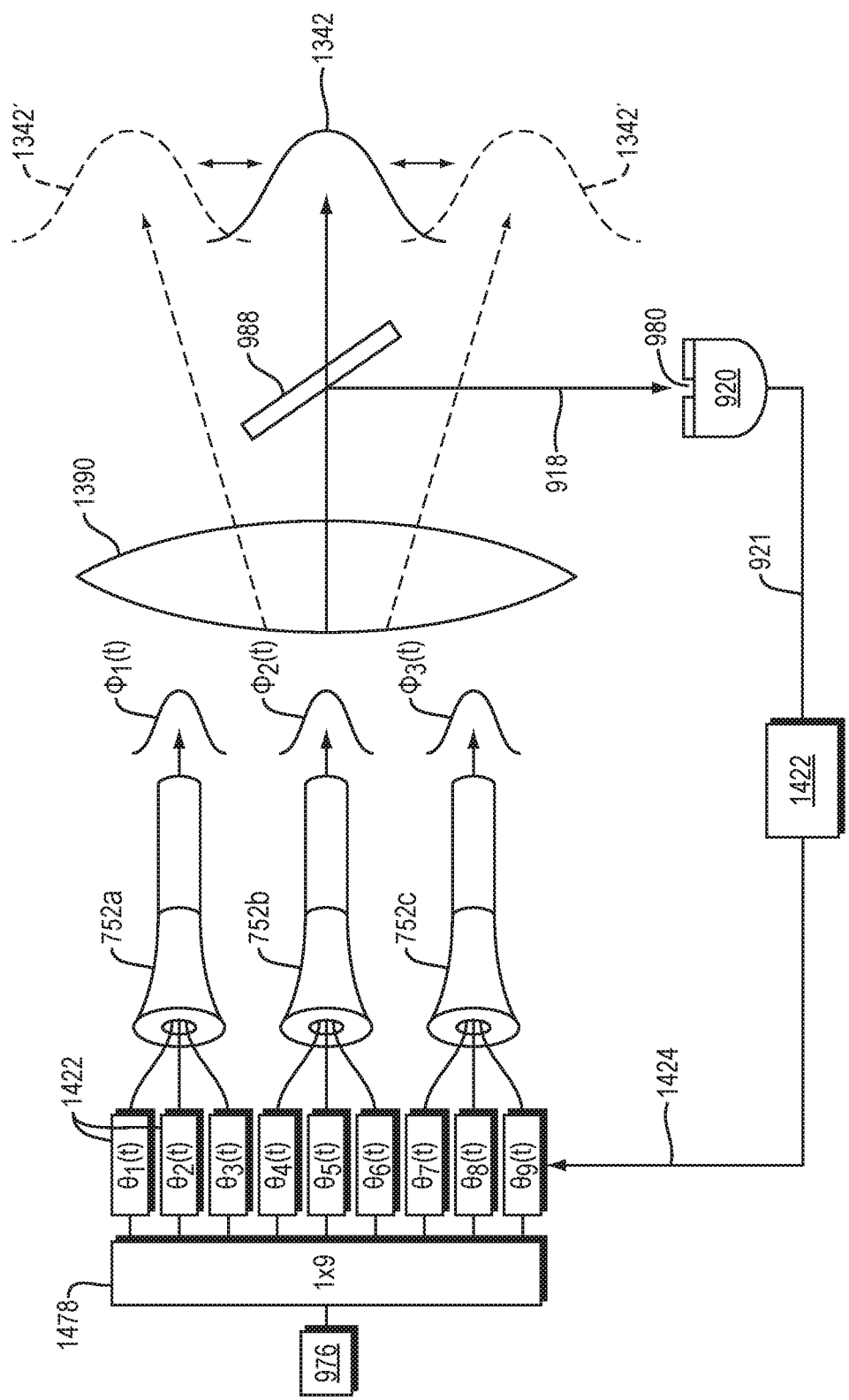
FIG. 14 is a schematic diagram illustrating how example embodiments can be arranged to perform beam steering using multiple photonic lanterns arranged in a manner analogous to a phased array.

FIG. 14 is a schematic diagram illustrating how example embodiments can be arranged to perform beam steering using multiple photonic lanterns arranged in a manner analogous to a phased array. Similar to FIG. 13A, no amplification is shown in FIG. 14. However, it should be understood that amplification, as illustrated in FIGS. 9I and 10A-10B, for example, can be implemented within embodiments having configuration similar to that illustrated in FIG. 14.

FIG. 14 includes three photonic lanterns 752a-c, each of which is coupled to three input fibers with input signals (beams) modulated by respective phase modulators 1422. For example, the photonic lantern 752a is coupled to phase modulators providing phases $\theta_1(t)$, $\theta_2(t)$, and $\theta_3(t)$, which can be optimized to maintain a fundamental mode propagating in the output fiber, as described in connection with FIGS. 13A-13B, for example. Furthermore, after fundamental mode stabilization, the phases $\theta_1(t)$, $\theta_2(t)$, and $\theta_3(t)$ can be varied to produce an overall output phase $\varphi_1(t)$ from the photonic lantern 752a. In similar fashion, the phases $\theta_4(t)$, $\theta_5(t)$, and $\theta_6(t)$ can be optimized to maintain a fundamental mode in the output fiber from the photonic lantern 752b, and then further adjusted with respect to each other to produce an overall output phase $\varphi_2(t)$ of a beam output from the photonic lantern 752b. The phases $\theta_7(t)$, $\theta_8(t)$, and $\theta_9(t)$ and input to the photonic lantern 752c can be similarly adjusted to produce a fundamental mode with output phase $\varphi_3(t)$.

With appropriate physical arrangement and output phase settings, the photonic lanterns 752a-c then act as a phased array with output phases $\varphi_1(t)$, $\varphi_2(t)$, and $\varphi_3(t)$ that can be adjusted to appropriately beam steer the output beam 1342 as desired. An SPGD controller 1422 is specifically configured to produce SPGD control signals 1424, using input from the SPGD detector 920 and using a known steering matrix, as described in connection with FIGS. 13A-13B, to steer the beam. For instance, by applying a flat phase ($\theta_1=\theta_2=\theta_3$), coherent combination on axis would be achieved. By applying a stair step that approximates a tilt ($\theta_1$, $\theta_2=\theta_1+\Delta$, $\theta_3=\theta_2+\Delta$), the spot can be made to steer off-axis. The amount of steering is proportional to A and is a function of the separation between photonic lanterns, and the focal length of the lens. In the case of phased arrays, this dependence between the phased-array tilt $\Delta$ and the far-field translation x is well known to one skilled in the art. This dependence can be written $x=\lambda f\Delta/(2\pi p)$, where $\lambda$ is the wavelength and f is the focal length of the lens used to generate the far field pattern at a distance f from the lens, and p is the spatial period of the array of lanterns. However, an arrangement of photonic lanterns individually controlled to form a phased array, as illustrated in FIG. 14, has significant advantages and flexibility over traditional phased arrays.

Figure 15A:
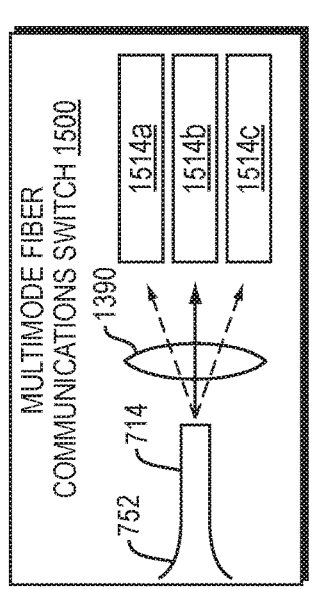
FIG. 15A is a schematic diagram illustrating a multimode fiber communications switch incorporating an embodiment beam controller.
Figure 15B:
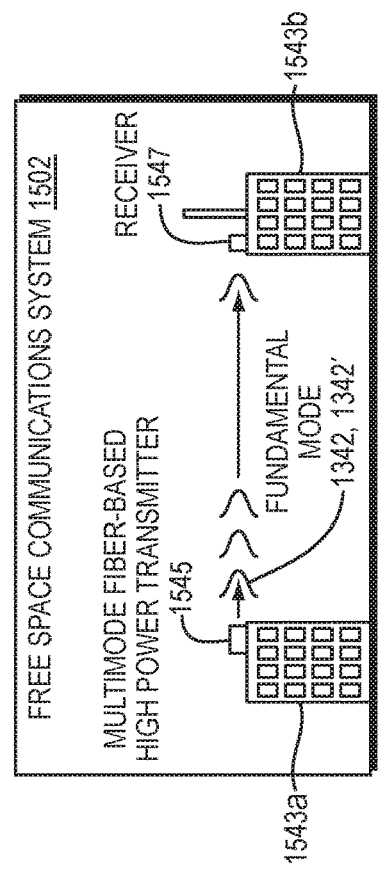
FIG. 15B is a schematic diagram illustrating a free-space optical communications system incorporating an embodiment beam controller in an optical transmitter.

FIGS. 15A-15B illustrate how various embodiments can be used in communications devices. For example, FIG. 15A is a schematic diagram illustrating a multimode fiber communications switch 1500 that can switch a signal between the multimode fiber 714 and multimode channels 1514a-c. Using components similar to those illustrated in FIG. 13A or FIG. 14 (not shown in FIG. 15A), the beam output from the photonic lantern 752 and output fiber 714 can be switched between the various multimode fiber channels 1514a-c, as desired, by using beam steering in accordance with the principles described above. In particular, the switching can be done while generating a superposition of modes in the output fiber 714 and output therefrom in order to steer the beam into one or more fibers 1514a, 1514b, or 1514c. Thus, even high optical powers can be switched using the principles described herein. In addition, the photonic lantern 752 may be replaced by an array of photonic lanterns 752a, 752b, and 752c, as illustrated in FIG. 14. As the multimode fibers carry additional mode content relative to single mode fibers, the information capacity per fiber can be increased in accordance with principles of spatial division multiplexing.

FIG. 15B is a schematic diagram illustrating how embodiment devices and methods can be used even in free-space communications. In particular, FIG. 15B illustrates a free-space communications system 1502 in which optical communication occurs between buildings 1543a and 1543b. Mounted on the building 1543a is a multimode fiber-based high-power transmitter 1545 that can include the elements illustrated in any one of the FIGS. 3, 4, 9A, 9G-9I, and 10A-14. In various embodiments, the transmitter 1545 is configured to output a fundamental mode 1342, 1342' that can include high-power, such as on the order of Watts, kilowatts, or tens of kilowatts, for example, and can be beam steered. A receiver 1547 is mounted atop the building 1543d to receive the signal. The beam steering capability, similar to that described in connection with FIGS. 13B and 14, may be used to provide wide-angle coverage, allowing one to find the device. The SPGD controller can then be used to determine the optimal input parameters to efficiently transmit a beam to the receiver, even in the presence of optical disturbances.

As understood by persons of ordinary skill in the art of laser imaging, adaptive optics have been used to perform imaging in turbulent media. For example, deformable mirrors or spatial light modulators have been used to compensate for optical disturbances arising in live biological tissue or from atmospheric effects. However, embodiments described herein offer significant advantages over known adaptive optical technologies because an existing deformable mirror or spatial light modulator can be replaced by a single, multimode fiber-based electro-optic beam conversion device as described herein.

In addition to compensating for disturbances, the spatial mode control of embodiment devices can be exploited to transmit additional bits of information along additional channels. For example, the $LP_{01}$ mode may use phase to encode a binary bit (0 or 1), while the phase in the $LP_{11}$ mode may represent another binary bit (0, or 1). By encoding phase on these higher-order modes simultaneously, information can be transmitted independently and in parallel on additional communication channels. Embodiment electro-optic beam controllers can, therefore, implement spatial division multiplexing to increase the data rate for data communication purposes.

Figure 16:
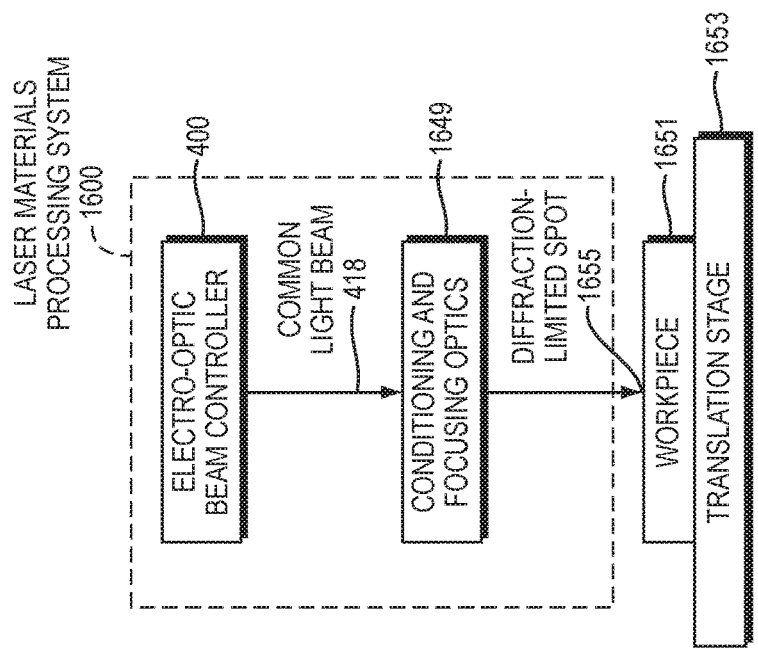
FIG. 16 is a schematic diagram illustrating a laser material processing system using a fundamental-mode, high-power output beam produced using the mode control techniques described in connection with other figures.

FIG. 16 is a schematic diagram illustrating a laser material processing system 1600 that can be used to laser cut, laser weld, or otherwise laser process materials using single-mode, high-power beams produced using the mode control techniques described herein. The system 1600 includes the electro-optic beam controller 400 described in connection with FIG. 4, which outputs the common light beam 418. The system 1600 also includes conditioning and focusing optics 1649 that are configured to produce a diffraction-limited spot 1655 at a workpiece 1651. The workpiece 651 can include any material, device, or object capable of being laser processed.

In the embodiment of FIG. 16, the workpiece 1651 is translated on a stage 1653 in order to vary the position of the workpiece being processed at different times. In other embodiments, the laser material processing system 1600 may be moved with respect to the workpiece 1651, or a multimode fiber carrying the common light beam 418 may be moved with respect to the workpiece 1651, in order to process the workpiece at different positions. For example, in some embodiments, a multimode fiber carrying the common light beam 418 can be moved with respect to the workpiece by using a robotic arm that also holds the conditioning and focusing optics 1649 in order to control the output beam with respect to the workpiece 1651. It should be understood that in other embodiments, other embodiments described herein may also be used to provide the common light beam 418. Furthermore, other components can be used, such as beam shutters, stage control modules, etc. according to principles understood in the art of control systems and robotics and laser material processing, in order to perform the material processing described.

The general use of non-uniform beams, such as beams generated based on fiber modes other than a fundamental mode and other non-Gaussian beams, is understood by persons skilled in the art of laser material processing. There are a number of ways to generate a doughnut beam, for example. One method includes changing the phase between the $LP_{11}$ modes, while an alternative method includes rotating the polarization of the $LP_{11}$ modes. Furthermore, other known methods exist for creating top-hat beams and Bessel beams, for example.

However, in accordance with various embodiments described herein, a waveguide-based electro-optic beam controller can be configured to generate arbitrary output beam patterns adaptively and dynamically from a multimode waveguide. As such, embodiment electro-optic beam controllers can be advantageously used in a wide variety of material processing applications and other applications in which a beam shape needs to be created.

Another technology in which embodiments described herein can provide significant advantages is laser radar (LADAR or LIDAR). As is known generally in laser radar, a moving spot effectively looks like a pulse of light from a target's point of view. Using a suitable detector array, the target can be imaged, and the time of flight of the returned pulse can be determined. Based on this time of flight, a range to the target can be estimated.

However, as described hereinabove, a steered spot can be generated advantageously by electronic control in an electro-optic beam controller. Photonic lantern-based systems described hereinabove enable scaling the diffraction-limited power to a target. In essence, the photonic lantern can provide the optimal mode or combination of modes to pre-compensate for atmospheric turbulence. U.S. patent application Ser. Nos. 62/079,729 and 14/939,213, filed on Nov. 14, 2014 and Nov. 12, 2016, respectively, which are hereby incorporated herein by reference in their entirety, describe LADAR based on optical phased arrays. Such an optical phased array as described in those previous applications can be advantageously replaced by an embodiment waveguide-based electro-optic beam controller including a photonic lantern, for example, to form a LADAR system that is based on electro-optic beam steering.

In addition, for imaging applications in turbid media, such as in biological tissue, a photonic lantern-based phased array can be used for adaptive optic correction (compensation for the turbulence) to obtain diffraction-limited images. As one example, a bright spot may be scanned across the target in order to obtain diffraction-limited returns in order to generate an image.

FIG. 17A is a flow diagram illustrating an example procedure 1700a for electro-optically controlling a beam. In particular, at 1760, active control is applied to convert one or more optical spatial modes in a waveguide. The procedure 1700a can be applied, for example, using the electro-optic beam controller 300 illustrated in FIG. 3 or the electro-optic beam controller 400 illustrated in FIG. 4, for example. Furthermore, the procedure 1700a can be carried out using any one of the embodiments illustrated in FIGS. 9A, 9I, 10A-10B, 11A, 11B, 13A, 15A-15B, and 16, for example.

FIG. 17B is a flow diagram illustrating a procedure 1700b for electro-optically controlling a beam, which includes some particular elements performed as part of many embodiment procedures. Similar to the procedure 1700a, the procedure 1700b can be carried out using many of the embodiment devices illustrated in other figures described herein, including FIGS. 3, 9A, 9I, 10A-10B, 11A, 11B, 13A, 15A-15B, and 16, for example.

In particular in the procedure 1700b, applying active control to convert one or more optical spatial modes in the waveguide includes, at 1762a, combining individual light beams carried by respective, individual optical waveguides into a common light beam to be carried by a common multimode waveguide. At 1762b, at least one characteristic of the common light beam is monitored. At 1762c, at least one optical parameter in each, respective light beam of the plurality of light beams is controlled, based on the at least one characteristic of the common light beam, to set one or more spatial modes of the common light beam.

Additional Material Processing Considerations and Applications of Embodiments

The use of double-clad, doped (active) fibers, such as the fiber 1135 illustrated in FIG. 11C, has been a key to the development of high-power fiber lasers and amplifiers. These fibers can allow coupling of multiple kilowatts of low-brightness pump light into the cladding glass that provides pumping of the laser dopants and signal confined to the fiber core region. In the case of ytterbium-doped fiber lasers, the pump wavelength employed is typically 910-980 nm, and the signal (emission) wavelength is typically 1020-1090 nm. Other dopants with their own corresponding pump and emission wavelengths also exist (e.g. thulium, erbium etc.).

The laser process and associated quantum defect in a doped fiber, together with absorption of pump and signal wavelengths that is greater than absorption in passive (undoped) fiber, can cause significant heating of the doped fiber in multi-kW fiber lasers and amplifiers.

The flexible beam delivery provided by fiber lasers and amplifiers has allowed advances in industrial laser processing equipment supported by hundreds of equipment manufacturers. Fiber laser machines are employed in a wide variety of market applications of material processing including: high speed thin metal (or other material) cutting, usually requiring near $M^2 \sim 1$ (single mode) beam quality; thick metal cutting, usually requiring high BPP beam to allow deep penetration; welding and brazing; surface treatments (e.g., hardening, cleaning etc.); micro-machining such as hole drilling (usually with pulsed lasers); and 3D printing and sintering (usually requiring>3 axis machines).

The high part-processing throughput that fiber lasers allow (particularly fast cutting of thin material) has pushed developments in fiber-based beam delivery and beam switching. This development push has resulted, in part, from the limitations imposed by the physical movement of cutting heads and/or parts into and out of processing stations. This physical movement can cause a significant wait times for the laser, lowering time-use efficiency of the laser system. As such, some of the issues present in the industrial laser/machine industry include:

Switching. Switching fiber-delivered laser beams between multiple work cells so that a fiber laser/amplifier may support two or more material processing machines, allowing staggered material shuffling or movement of cutting head to a next location to process. The speed of the switch and the issues of alignment and beam quality preservation (or minimizing of beam quality degradation) are paramount. Industrial fiber switches typically require several tens of milliseconds of time to switch between fiber outputs, and beam quality degradation is significant, requiring, e.g., that 50 micron core input fibers be mapped to 100 micron core output fibers.

Speed changes. As laser power is increased, the range of possible cutting speeds also increases. However, for complex shapes, the laser machine head and/or target material must often move (translate) for changes in cut direction. This movement of the laser machine head or target material is not an instantaneous operation, and it involves deceleration or acceleration using the machine's servos, which causes processing time penalties.

High power at single mode. Achieving more than 1 kW continuous wave (CW) of single mode fiber laser/ amplifier beam quality, which is very desirable for high speed thin material processing, can be very difficult due to multimode instability (MMI) and other optical issues (see further details hereinafter).

Variable Beam Product Parameter (BPP). BPP is a measure of beam quality, and various values of BPP can be desirable on laser material processing machines so that one machine can quickly change beam shape and quality. These changes in BPP can be helpful for, e.g., cutting thin metal (using a small BPP), while also being able to cut thick metal (using a large BPP). It is desirable to maximize cutting speed when working with materials of varying thickness by using variable cut quality without lengthy down times (e.g., hours) to replace or adjust optics in a beam delivery cutting head manually, and without having to purchase multiple lasers, machines, switches, or other components that can introduce additional expense and complexity. In the past few years, several inventions for variable BPP cutting heads have also quickly come to market. Most or all of these variable BPP cutting heads depend up movable optical elements in the cutting head under some control system.

For some industrial laser applications, such as brazing, welding, surface treatments, and thick plate (metal) cutting, there is the requirement for non-Gaussian ($M^2$~1) beam profiles, such as top hats, toroidal shapes, etc. These shapes are achieved using a combination of single, few-moded, or highly multimoded fiber delivered laser beams, and/or custom delivery optical fibers, and/or combined with custom optics in the beam delivery head. Recent advances and inventions include beam delivery heads with optics that allow adjustment of beam quality via physical manipulation of optical elements.

In addition to industrial lasers (typically characterized as those with power output over 1 kW and multimode optical output beams), there is growth in high-power single-mode fiber lasers in both pulsed and CW configurations for applications such as industrial high-speed thin material cutting, welding, and micromachining, and for sensor applications (e.g., LIDAR). There are also applications for pulsed and QCW (Quasi-CW) fiber lasers and amplifiers for micromachining, marking, and other material processing.

A significant issue in the scaling of single-moded optical fiber lasers to more than 1 kW is the threshold power for the onset of MMI, which is a thermo-optical effect that is detrimental to single-mode laser or amplifier beam quality, because MMI couples light out of the core LP01 mode to higher order modes. MMI is also known as transverse-mode instability (TMI). The decrease in beam quality that results from coupling into higher order modes corresponds to material processing issues, such wider affected heat zone, poor-quality cutting edge, reduced cutting speed, inability to machine to small feature sizes on the material, etc.

Embodiment beam controllers as described herein can be implemented into material processing laser systems to provide significant advantages in material processing using high-power laser systems. In particular examples described hereinafter, embodiment beam controllers can be used to (i) control beam profile dynamically; (ii) optically switch fiber beam delivery to different material processing locations (e.g., separate processing machines, separate delivery heads or optical paths in the same machine, separate work cells, etc.); and (iii) optimize material processing time and quality with respect to motion between an output laser processing beam and a material workpiece being processed. In at least these aspects, the material processing embodiments described hereinafter may be considered as more detailed variations or extensions of the laser material processing system 1600 illustrated in FIG. 16.

(i) Dynamic Beam Profile Control

As described hereinabove, embodiments can be used to control beam profile dynamically for laser-based material processing applications. Using all-fiber-based adaptive spatial mode control (AFBASMC) enabled by embodiment electro-optic beam controllers, an arbitrary intensity profile can be generated at the end of a fiber that serves as an output of a laser or amplifier module in a material processing system. AFBASMC can be considered to include a subset of embodiment electro-optic beam controllers, material processing apparatuses, optical amplifiers, and corresponding methods within the scope of the present disclosure, in which the individual input waveguides and the common multimode output waveguide include optical fibers. However, it should be understood that embodiment electro-optic beam controllers, material processing apparatus, and related methods within the scope of the present disclosure can also include non-fiber waveguides.

In conjunction with optical elements typical to a processing head of, for example, an industrial laser material processing machine, an arbitrary intensity profile, arbitrary beam product parameter (BPP), or both can be generated. This may be dynamically changed during the processing of a given material or between different types or material thicknesses of material processed through the machine.

AFBASMC can be used to vary beam parameters such as BPP, beam intensity profile, or both for optimum cutting speed and cut quality for thick and thin metals. Variation in beam parameters can be accomplished using feedback from a sensor such as the sensor 920 in FIG. 9I with a pinhole mask. Alternatively, a different mask may be used, corresponding to one or more modes other than a fundamental mode. In yet other embodiments, a beam profiler may be used for monitoring with feedback to an SPGD controller. In still other embodiments, a camera such as the camera 996 in FIG. 9G may be used with one or more spatial light modulators that are statically or dynamically changed according to characteristics desired in a common output beam, and the camera can provide feedback images or signals to an SPGD controller appropriately configured to receive them. Furthermore, in order to change beam profile, mode, or other being parameters for the material processing applications described herein, a controller such as an SPGD controller can be used to apply, actively, path-length delay, or modulation control using phase, amplitude, or polarization modulators applied to individual input waveguides, as further described hereinabove.

Figure 18A:
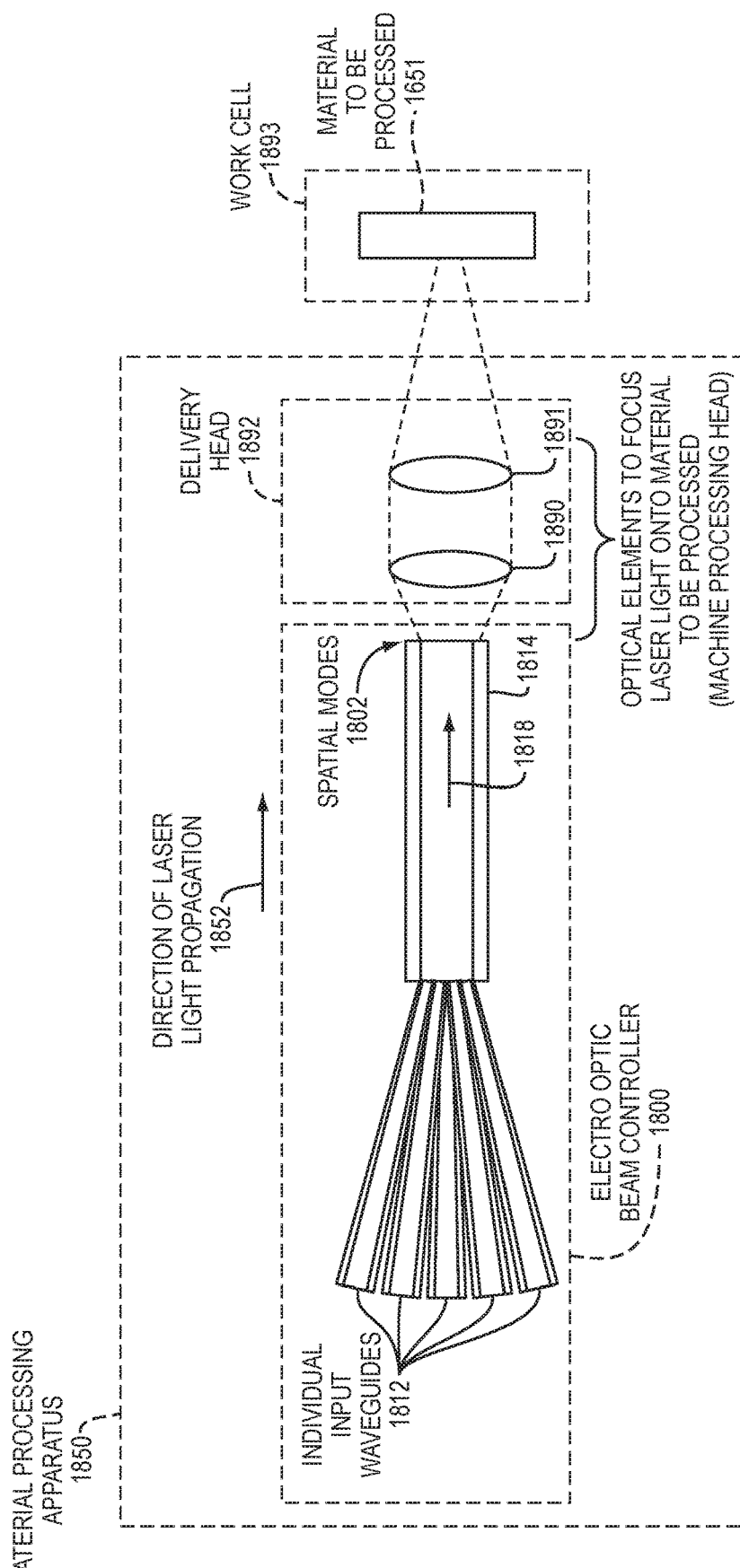
FIG. 18A is a schematic diagram illustrating a materials processing system that includes an electro-optic beam controller.

FIG. 18A is a schematic diagram illustrating an embodiment materials processing system 1858 that includes an electro-optic beam controller 1800. The electro-optic beam controller 1800 includes individual input waveguides 1812, as well as a common, multimode optical waveguide 1814 with a common, multimode optical beam 1818 propagating therein in a direction 1852. At an output side of the common, multimode waveguide 1814, one or more spatial modes 1802 of the multimode waveguide 1814 are represented in a beam profile of the being output from the waveguide.

It should be understood that the materials processing system 1850 can include many different embodiment electro-optic beam controllers as illustrated in other figures and as described hereinabove, as alternatives to the controller 1800. Furthermore, it should be understood that the beam controller 1800 can include any of the various feedback and control mechanisms, including those described in connection with FIGS. 4, 9A, 9G-9I, 10A-10B, 11A-11B, 13A-13B, and 14, for example. Thus, in the electro-optic beam controllers described hereinafter in connection with FIGS. 18A-18G, controllers including SPGD controllers, beam feedback mechanisms, modulators, etc. are not shown in order to focus on other aspects of material processing.

The material processing system 1850*a* also includes a delivery head 1892 with delivery optics 1890 and 1891. In the embodiment of FIG. 18A, the optic 1890 is a collimating lens, and the optic 1891 is an objective lens that focuses the collimated output beam from the multimode waveguide 1814 onto a material workpiece 1651 that is to be processed by the system 1858. However, it will be understood that, in other embodiments, delivery head optics can be different or more complex, according to many different designs and needs that are known in the art of laser material processing. Furthermore, delivery heads can include optical fibers, optic housings, and many other components that are known in the art, and which are omitted from FIG. 18A for simplicity.

The material workpiece 1651 can be thought of as being part of a work cell 1893 where a laser process is applied to the material. In accordance with various embodiments described herein, multiple work cells can be present on a single material workpiece, where a laser processing theme may be applied to each work cell of the workpiece. Furthermore, in some embodiments, such as some described hereinafter, various laser work cells may be formed at respective material workpieces, where a single material processing system is used to perform work at the respective work cells, or wherein light from one material processing system such as the system 1850 can be routed to multiple material processing systems for delivery to different work cells. In these cases, respective material processing systems may not require respective electro-optic beam controllers, but may still include respective delivery heads or other optics for delivery of light to material workpieces.

Using the system 1850*a*, beam quality and other beam parameters described hereinabove, for example, can be dynamically changed to process the same or different material workpieces of different types and thicknesses. Using embodiment AFBASMC systems, these dynamic changes in output beam parameters can, advantageously, occur quickly, even in the absence of adjustments to delivery head optics in a material processing system. Similar dynamic changes can be made as needed for a wide variety of other material processes including brazing, welding, etc.

BPP or beam intensity profile can also be dynamically adjusted using embodiment devices and methods employing AFBASMC during initiation of laser cut, weld, braze, hole drilling etc. to optimize the start of the process compared to a different BPP or beam intensity for bulk operations. For example, a low BPP profile can be used at a start of a cut to penetrate a surface, such as the surface of a metal material workpiece. After initial beam penetration through the surface (e.g., in a Z direction along a beam axis and perpendicular to the material workpiece surface), AFBASMC can then be used to switch or ramp towards a higher BPP to penetrate the entire depth of the workpiece and perform the rest of a cut along the workpiece (e.g., in X and Y directions). A similar process of adjustment can be used during drilling of a single hole through a workpiece, for example, or during other material processes.

Furthermore, it is within the scope of some embodiments to select, purposely, an intensity profile that minimizes damage to a laser source or sources when initiating a cut, weld, or hole drilling. With "red" metals (e.g., copper or bronze), there is very high reflectivity at 1064 nm, for example, and a back reflection from a material workpiece made of such a material can cause damage to industrial fiber laser light sources in some circumstances.

Careful selection of initial power and beam profile via AFBASMC using embodiment electro-optic beam controllers can be used to minimize backwards light coupling back into a beam combiner or fiber amplifier by one of the following techniques, or a combination of the following:

(a) Via electro-optic beam control, as described hereinabove, an output beam profile that enables shorter duration or lower intensity level of back reflections can be selected. The shorter duration or lower intensity level can be due to a fast absorption increase in the material and/or by directing the back reflected light such that damage to sensitive regions of the laser source or optics is avoided.

(b) Back reflected light can be routed to a region of a laser machine cutting head that is not as susceptible to damage (has a higher optical intensity failure threshold).

(c) Backwards coupled (back reflected) light can be routed to a region of an AFBASMC cutting head that is not as susceptible to damage (has a higher optical intensity failure threshold).

(d) Backwards coupled light can be routed into the laser source or sources in such a way that damage is less likely, where there is a higher optical intensity failure threshold (e.g., by coupling back reflected light into fiber cladding or into a much higher numerical aperture than the outgoing laser).

Each of the above techniques (a)-(d) can be completed using electro-optic beam control. Delivered light can be caused to be reflected off axis (angle with respect to a delivery axis), avoiding reflections being coupled directly back into the laser. By using AFBASMC, the direction of the light out of delivery (e.g., cutting head) optics can be purposely set to minimize direct back reflection that may cause damage. In addition, or as an alternative, AFBASMC, in conjunction with using appropriate delivery optics, can be designed for AFBASMC-controlled focal location such that back reflected light reflected back into a laser source (e.g., fiber laser source) can be of lower intensity (e.g., $W/m^2$) than light exiting the source. This can reduce a possibility of damage.

Furthermore, during a pulsed or QCW laser operation, an output beam profile, BPP, or both can be changed, particularly from pulse to pulse, to enable ablative drilling of material holes with beam profile dynamically adjusted over the pulses to maintain good hole quality, enabling high aspect ratio holes (depth:width).

AFBASMC can also be used to produce multiple spots to allow drilling, by ablation, of multiple holes simultaneously, allowing faster drilling or other material processing. This can be done, for example, by adjusting the beam controller 1800 to produce output modes such as those illustrated at 854*b* and 854*d* in FIG. 8C, for example. Furthermore, as described hereinafter in connection with FIGS. 18B, 18E, and 18F, for example, various bulk optics and optical fibers can be used to route different components of a beam, including different peaks in non-fundamental spatial modes that may be represented in the output beam, two different locations on or in the material workpiece 1651.

(ii) Optically Switching Beam Delivery

Optical fiber beam delivery can also be switched for efficient material processing using AFBASMC. Using AFBASMC, an arbitrary intensity profile can be generated at the end of a common, multimode output fiber. This arbitrary intensity profile may be used to route laser power dynamically to a desired output delivery fiber or other optic.

Applications for such dynamic power routing (switching) include routing laser power to more than one material processing machine. Furthermore, laser power may be routed to different channels or work cells pertaining to the same machine, with the work cells active at different times or the same time for various material processing steps applied to either a single or multiple material workpieces.

Embodiment material processing apparatuses and methods incorporating AFBASMC can also be used to generate a laser intensity distribution of required shape and dimensions at the output of the AFBASMC such that one or more subsequent discrete optical elements map the distributions to one of two or more (M>1) optical fibers that route the laser energy to "laser work cells," which are at one or more of (i) separate processing machines; and (ii) separate beam delivery heads or optical paths in the same machine.

It should be noted that routing laser energy to (ii) separate beam delivery heads or optical paths in the same machine can allow for different optics processing applied to a given material workpiece. Thus, different beam profiles can also be used to switch to different beam conditioning or delivery optics in different paths. This is another way to achieve the variations in material processing characteristics described hereinabove, which involve directly changing a beam profile using modulation control to change beam quality.

Figure 18B:
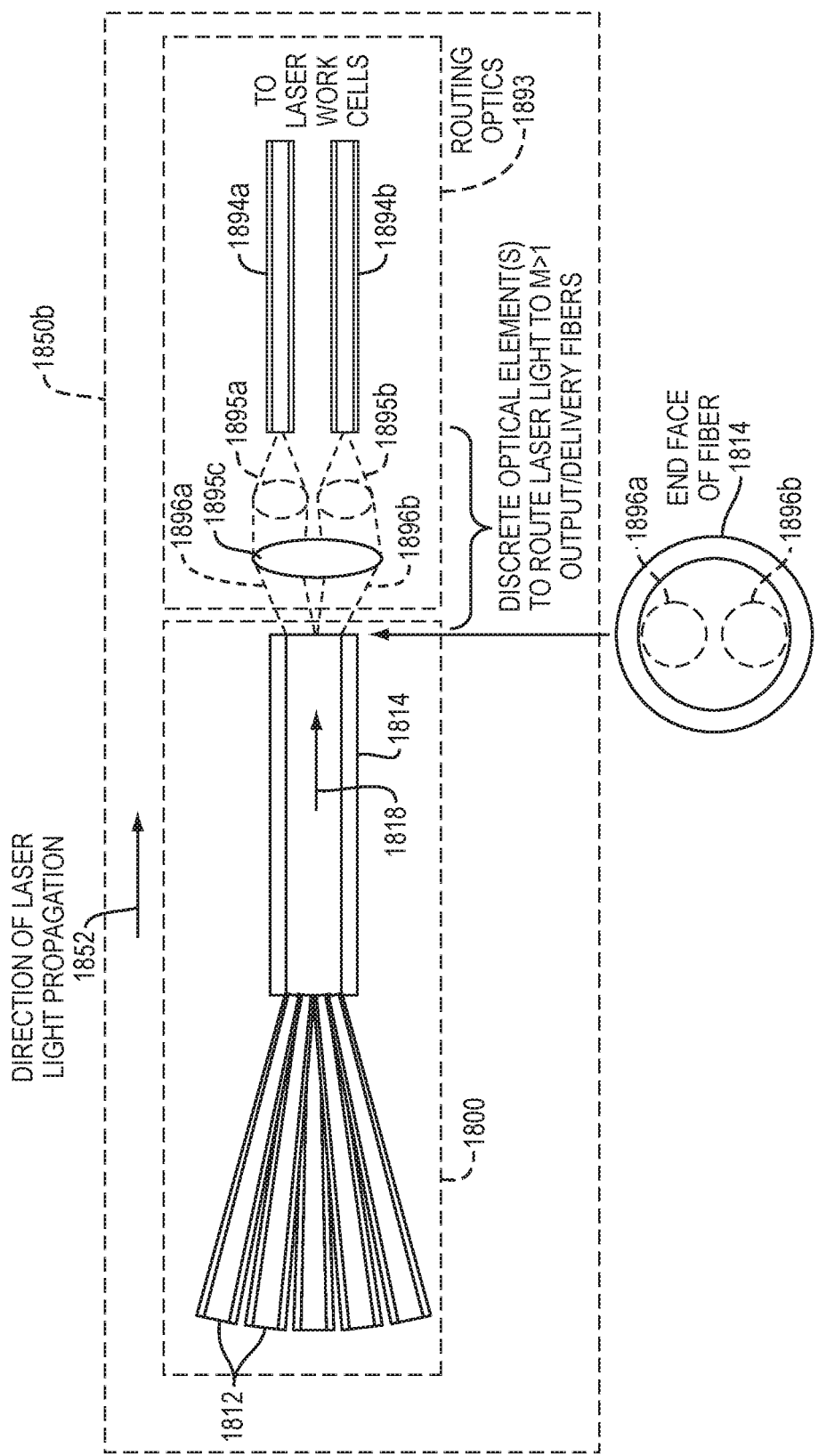
FIG. 18B is a schematic diagram illustrating a material processing that further includes routing optics to map particular parts of an intensity distribution at the end of the multimode fiber to different laser material work cells.

FIG. 18B is a schematic diagram illustrating a material processing apparatus 1850*b*. In particular, in addition to the electro-optic beam controller 1800, the apparatus 1850*b* includes routing optics 1893 designed to map particular parts of an intensity distribution at the end of the multimode fiber 1814 that are localized to a particular region of the end to corresponding optical fibers for further routing to laser material work cells. In particular, in the embodiment of FIG. 18B, the routing optics include a collimating lens 1895*c*, along with two discrete optical lenses 1895*a* and 1895*b* that route the laser beam to different laser work cells by coupling light from the output of the multimode fiber 1814 into an optical fiber 1894*a* or an optical fiber 1894*b*, respectively.

In the embodiment of FIG. 18B, the electro-optic beam controller 1800 can be configured to steer an output beam representing only a fundamental mode of the fiber 1814 to different positions, similar to the way described hereinabove in connection with FIGS. 13A and 15A, for example. Thus, at a time $t_1$, the output beam can be located at a position 1896*a*, routed through the collimating lens 1895*c*, and focused by the focusing lens 1895*a* to couple light into the fiber 1894*a*. Similarly, at a time $t_2$, the electro-optic beam controller 1800 can cause the light from the fiber 1814 to be delivered out of the fiber to a position 1896*b*, collimated by the collimating lens 1896*b*, and focused by the focusing lens 1895*b* for coupling into the fiber 1894*b*.

The fibers 1890*a-b* can be routed to the same work cell, or to different work cells, either cells operated on by the apparatus 1850*b* or by respective apparatuses. Thus, using the fast, dynamic control of beam steering, which is enabled by embodiment electro-optics beam controllers, light from a laser system can be routed very quickly to different work cells, which can include different conditioning optics to create different types of beams for different applications, or which can include similar delivery optics to process multiple workpieces or to more quickly process a single workpiece at a given time.

Furthermore, as will be understood, the beam profile regions 1896*a-b* may be both present at the same time where the electro-optic beam controller 1800 is configured to produce a multimode beam at the output of the fiber 1814, such as the multimode beam profile illustrated at 854*b* in FIG. 8C, for example. In that case, the embodiment of FIG. 18B can be used for simultaneous drilling or cutting at multiple locations of the same or different material workpieces, enabling faster processing and more efficient use of a laser beam for material processing. Furthermore, it should be understood that, using the embodiment of FIG. 18B, the intensity distribution that is steered to the position 1896*a* or 1896*b* can be a small Gaussian or top hat intensity distribution, for example.

Figure 18C:
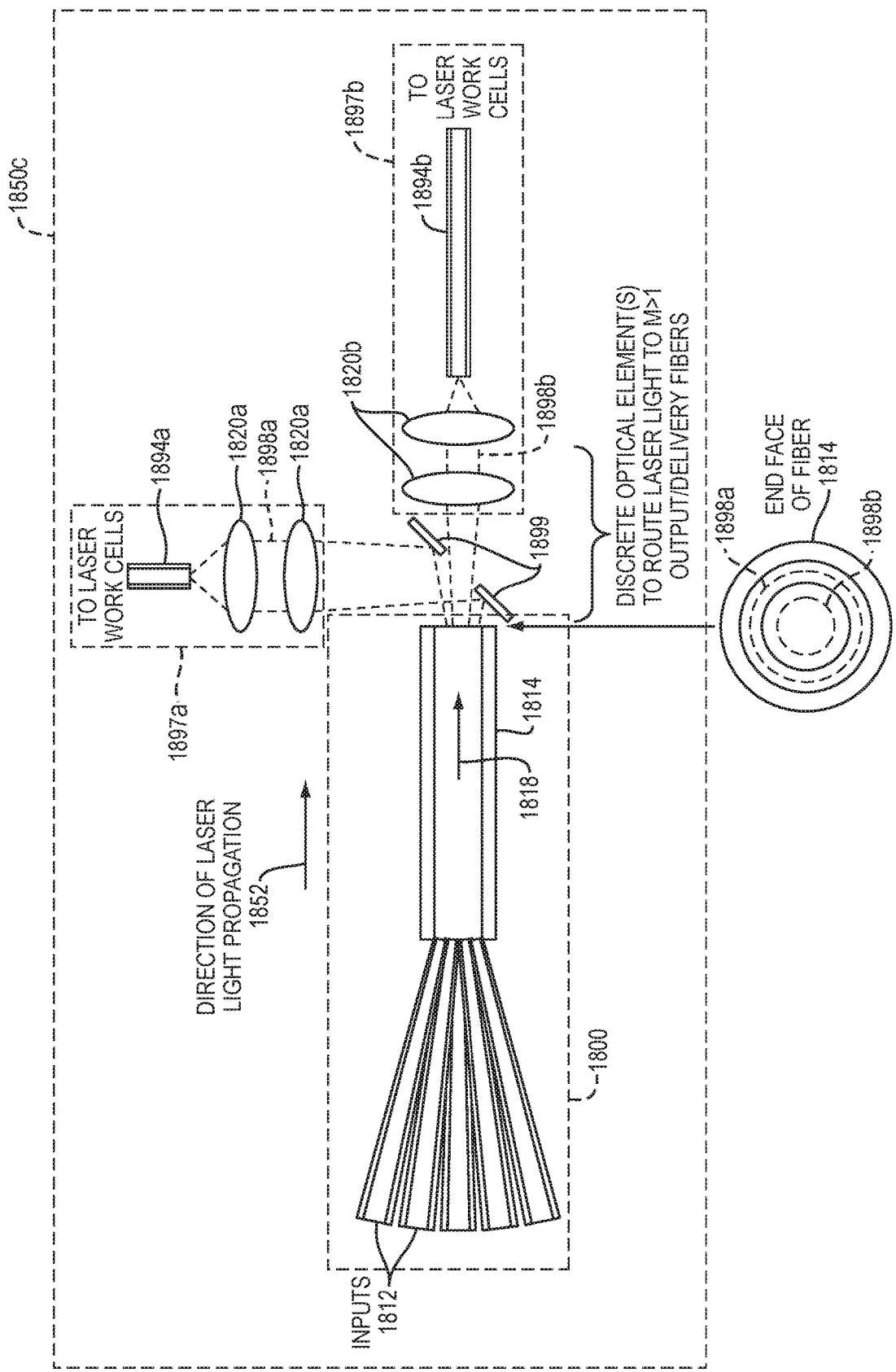
FIG. 18C is a block diagram illustrating a material processing apparatus in which an embodiment electro-optic beam controller is configured to output multimode components to differ laser material work cells.

FIG. 18C illustrates that other configurations can also be used, wherein exit diffraction angles of multimode beam components can be exploited for routing two different delivery optics or routing optics and work cells. In particular, FIG. 18C is a block diagram illustrating an embodiment material processing apparatus 1850*c*, in which the electro-optic beam controller 1800 is configured to output multimode components including a central core being 1898*b* and outer toroidal shape 1898*a* at the end of the multimode fiber 1814*b* using an aperture mirror 1899, the central component 1898*b* is permitted to pass through the mirror to routing objects 1897*b*. The routing optics 1897*b* include: collimating and focusing optics, collectively 1820*b*, that are configured to couple the central component of the light into the optical fiber 1894*b* for routing to material work cell. On the other hand, the outer, toroidal component 1898*a* of the beam is reflected by the mirror 1899 and coupled by lenses 1820*a* into the routing fiber 1894*a* for routing to a different material work cell.

Using the embodiment of FIG. 18C, it should be understood that the electro-optic beam controller 1800 can be caused to output the center and outer components 1898*b* and 1898*a*, respectively, at the same time or at different times, dynamically, as necessary, using modulation control of the individual input waveguides 1812. Where the game controller 1800 is configured to output both beam components 1898*a-b* simultaneously, the routing of the different components to the different laser material work cells can be exploited for different types of processing at different work cells at the same time. However, as will also be understood in view of the disclosure hereinabove, the beam controller 1800 can output the outer, toroidal component 1898*a* at one time, and the inner component 1898*b* at another time. This effect can be used to switch the beam completely between the two different beam configurations and corresponding work cells. The switching can be used to process the same material workpiece in different ways at different times, as further described herein, or the switching can be used to perform processing with different beam configurations at different laser work cells at different times.

Figure 18D:
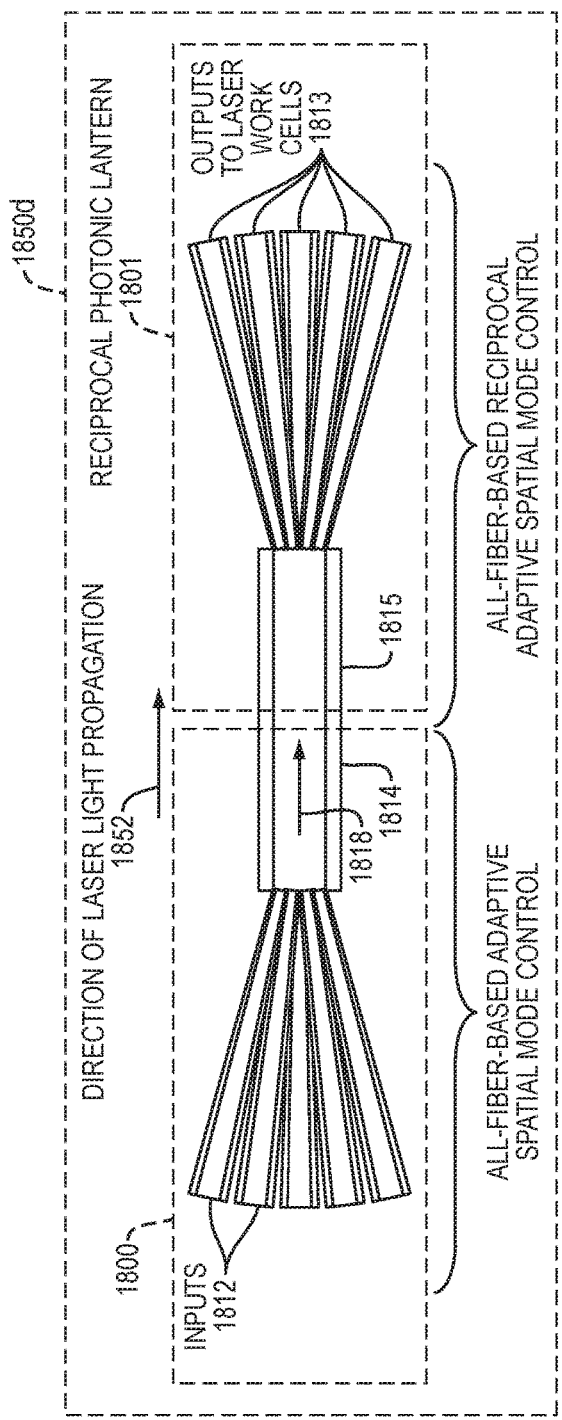
FIG. 18D is a block diagram illustrating another alternative material processing apparatus that includes an embodiment electro-optic beam controller with a reciprocal beam combiner for dynamically routing to different laser material work cells either simultaneously or at different times.

FIG. 18D is a block diagram illustrating an alternative embodiment material processing apparatus 1850*d* that does not use discrete optical elements to map the output laser light to different delivery optical fibers. Instead, the apparatus 1850*d* includes a reciprocal beam combiner, namely a reciprocal photonic lantern 1801. The reciprocal lantern 1801 has a multimode optical fiber 1815, which can be either spliced to the fiber 1814, or can be a continuing portion of the same fiber as the common fiber 1814. Tapered into the reciprocal lantern 1801, into the output side, are individual optical fibers 1813 that serve as different outputs that can be routed to different laser material work cells.

In FIG. 18D, the tapering structure between the multimode fiber 1815 and the individual optical fibers 1813 can be the same tapering structure, in reverse order, that is illustrated and described in connection with FIG. 7, for example. Using the electro-optic beam controller 1800, a selective one of the outputs 1813, or multiple outputs 1813, can be illuminated at any given time. Thus, the apparatus 1850*d* can be used to, effectively, switch between different outputs.

The reciprocal photonic lantern arrangement illustrated in FIG. 18D is not limited to material processing applications. The reciprocal platonic lantern 1801 may be used in connection with any other embodiment electro-optic beam controller described herein, or an application thereof, where beam routing to multiple fibers, or switching between different fibers or other waveguides, is desirable. It should be noted that the number of output fibers 1813 can be different from the number of input fibers 1812.

Figure 18E:
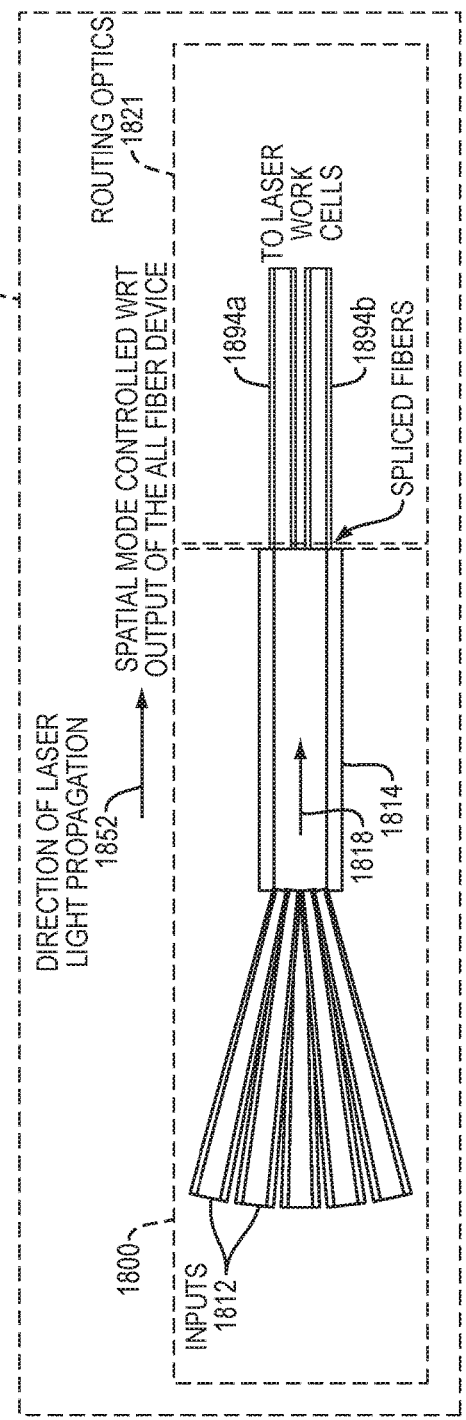
FIG. 18E is a schematic diagram illustrating a material processing apparatus in which individual output fibers are directly spliced to a common multimode waveguide for dynamically routing to different laser material work cells either simultaneously or at different times.

FIG. 18E is a schematic diagram illustrating still a further embodiment material processing apparatus 1850*e*, in which individual output fibers 1894*a-b* are directly spliced to the common, multimode waveguide 1814. The fibers 1894*a-b* are part of routing optics 1821 that can be used to route the beam, selectively, between different work cells. This configuration can also be used to route different components of the common beam 1818 to different laser work cells simultaneously. In the case of simultaneous routing, the common beam 1818 may have a mode shape as illustrated at 854*b* in FIG. 8C, for example. However, in the case of a switching application, an output beam representing fundamental mode propagation may be beam steered to switch between the output fibers 1894*a* and 1894*b*. The beam steering can be accomplished by appropriate modulation of the inputs 1812 in the manner described in connection with FIGS. 13A and 15A, for example.

In the embodiment of FIG. 18E, the output fibers 1894*a* and 1894*b* preferably have a smaller core size than the multimode fiber 1814. Furthermore, as will be understood, more than two output fibers can be spliced to the common waveguide 1814. Using still higher-order modes for the common beam 1818, coupling can occur to the more than two output fibers efficiently. Furthermore, in still other embodiments, a fundamental mode beam or other beam shape can be switched between more than two spliced output fibers using beam steering methods described hereinabove. In all of these variations, power distribution can be selected dynamically between different output fibers for the needs of material processing at various laser work cells or the same laser work cell.

(iii) Optimizing Material Processing Time and Quality With Respect to Motion

Embodiments can also be used to increase material processing speed by one or more of laser sources using electro-optic beam control. Using AFBASMC an arbitrary intensity profile can be generated at the end of the common multimode output fiber. AFBASMC may be used dynamically, in concert with beam translation, rotation, or pitch or yaw of a 2D/3D material processing machine to increase material processing speed and improve the quality of the processing.

AFBASMC can also be used to generate a laser intensity distribution of required shape and dimension at the output of the AFBASMC such that one or more subsequent discrete optical elements map the distributions to different locations along the plane of the materials surface.

The AFBASMC can be adjusted synchronously with translations, rotations, pitch, and/or yaw of the material processing optical head such that the position of the laser irradiated region of a material workpiece maintains a (nearly) constant linear (surface) velocity, even while the material processing head optics may be accelerating/decelerating with respect to the material (e.g. when making a course change such as tracing the corner of a shape). In this respect, nearly optimum cutting speed can be maintained, reducing overall material processing time with respect to a reduction in linear velocity during the material processing.

Figure 18F:
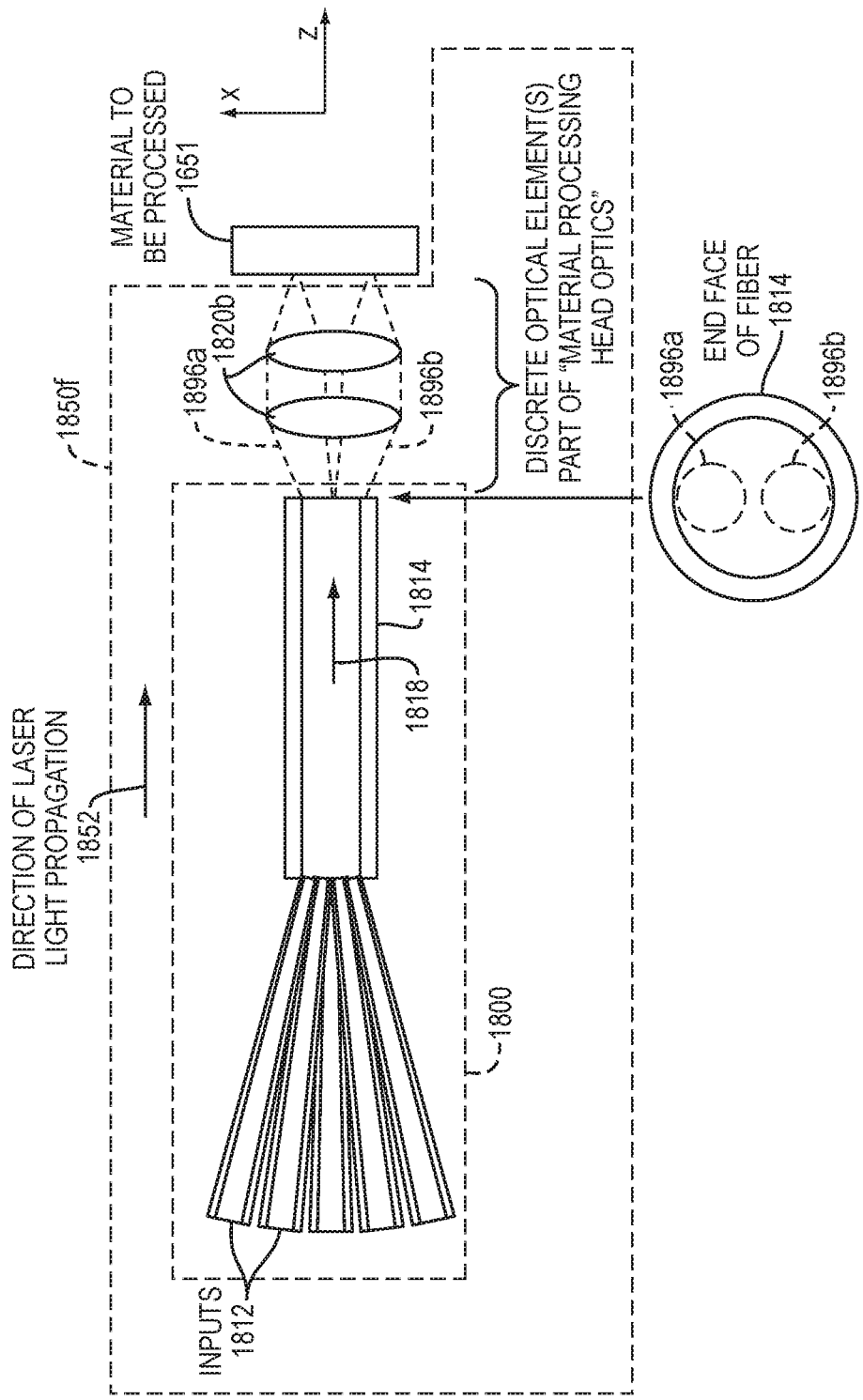
FIG. 18F is a schematic diagram illustrating a material processing apparatus that includes elements similar to those of FIG. 18B, except that different delivery head optics are configured to take advantage of beam steering performed by the embodiment electro-optic beam controller.
Figure 18G:
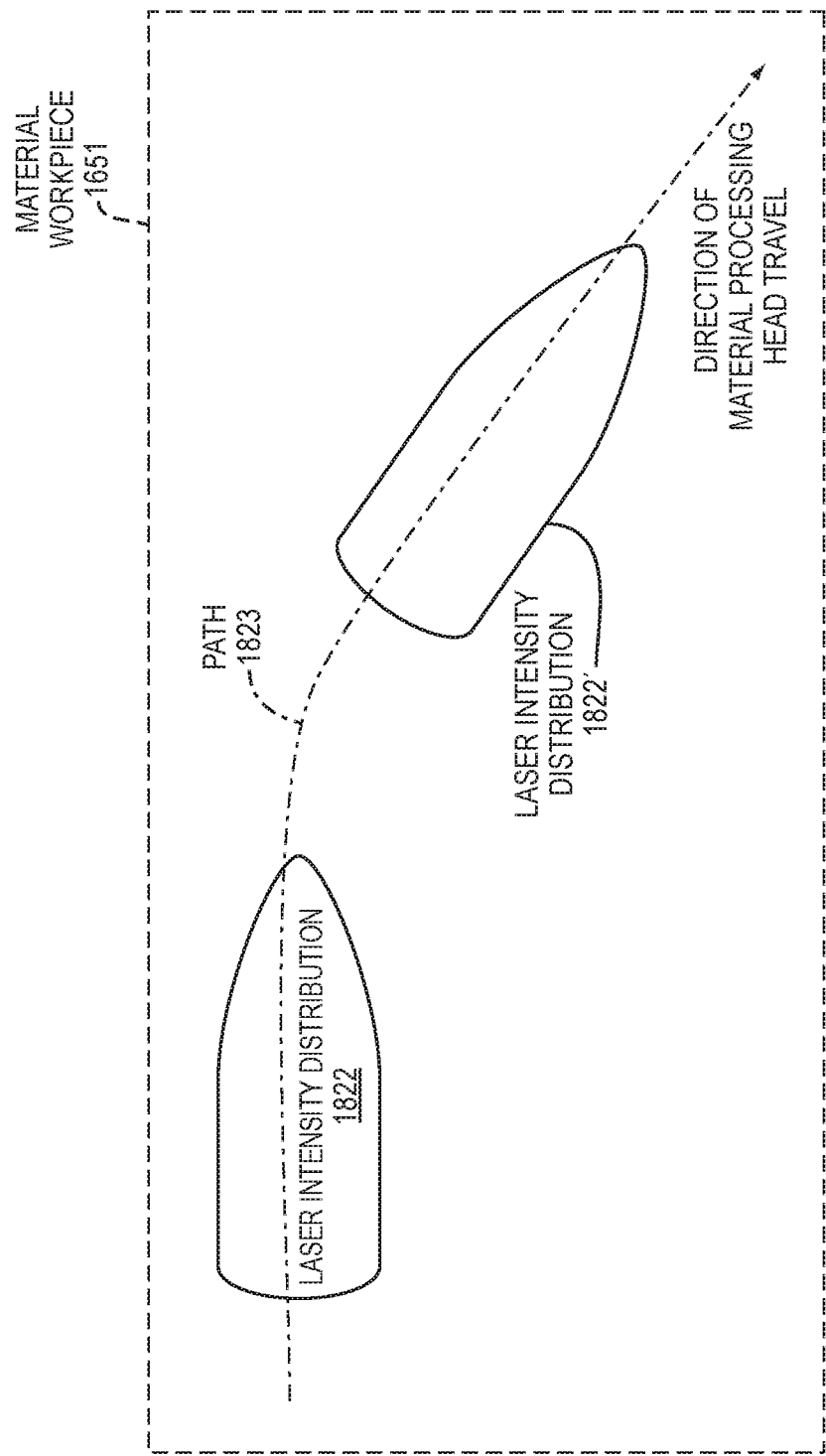
FIG. 18G is a diagram illustrating how electro-optic beam control can be implemented advantageously to rotate a beam profile during material processing.

FIGS. 18F and 18G help to illustrate these embodiments. In particular, FIG. 18F is a schematic diagram illustrating an embodiment material processing apparatus 1850*f* that includes elements similar to those in the embodiment of FIG. 18B. In particular, the electro-optic beam controller 1800 can be used to steer the common beam 1818 between two different positions, for example, namely position 1896*a* and 1896*b* at the end face of the fiber 1814. Discrete optical lenses 1820*b* are used as part of a beam delivery head to deliver the beam to the material workpiece 1651.

As will be understood by those familiar with the art of laser material processing, the workpiece 1651 may be translated with respect to the incoming laser beam in order to cut or otherwise process different portions of the workpiece 1651. For example, a translation stage such as that illustrated in FIG. 16 may be used to translate the workpiece 1651. As an alternative, the delivery head optic 1820*b*, either separate from or together with the beam controller 1800, may be translated with respect to the workpiece 1651. This is often accomplished using optical fibers for routing (not shown in FIG. 18F), with the optics 1820*b* configured at the output of the routing fibers to be translated with respect to the material. Furthermore, a material workpiece may be translated along, or rotated about, one or more axes, while delivery head optics are translated along, or rotated about, one or more different axes.

The translation or rotation exemplified above, whether by the material processing head or by the material workpiece or both, can include accelerations and decelerations, such that too little laser energy, or too few pulses, can be delivered at certain positions, while too much or too many can be delivered at other positions. Embodiment beam controllers and material processing apparatuses can be configured to compensate for this effect in order to maintain material processing quality.

In one simple example that can be illustrated by FIG. 18F, the focused beam incident on the workpiece 1651 may be translated, using a material processing head including the optics 1820*b*, for example, in the X direction, up the page with respect to the workpiece 1651. During acceleration of the processing head optics 1820*b*, the electro-optic beam controller 1800 can translate the output beam, using the beam steering principles described hereinabove, from the lower zone 1896*b* to the upper zone 1896*a*. This can cause the linear velocity of the actual beam at the material workpiece 1651 to be nearly constant with respect to the material workpiece, notwithstanding acceleration of the optics 1820*b*. Similar changes can also be made, in reverse order, upon deceleration of the optics.

Similar control can be applied and used to dwell (e.g. reduce linear velocity or "stop") the material irradiance in one location to allow, for example, start of a cut or pierce of metal, a hole drilling, or a weld initiation while the processing head continues at or near constant velocity. This can reduce processing time, as the head does not need to continue to accelerate or decelerate.

In still other applications AFBASMC can be used to generate a laser intensity distribution of required shape and dimension (the "beam profile") at the output of the AFBASMC such that one or more subsequent discrete optical elements map the beam profile to the material being processed. The common beam can be adjusted synchronously with translations, rotations, pitch, and/or yaw of the material processing optical head such that the projected beam profile is optimum for the material processing application and dynamically adjusted based upon 2D/3D direction of travel.

FIG. 18G is a diagram showing how electro-optic beam control can be used advantageously to rotate a beam profile during material processing. In particular, FIG. 18G shows a section of a front face of the material workpiece 1651 at which a laser beam from an embodiment beam controller is incident, with the beam being incident perpendicular to the page. As described hereinabove, laser intensity distribution output from a multimode fiber can be arbitrary using electro-optic beam control embodiments.

In the case illustrated in FIG. 18G, a laser intensity distribution 1822 is used, and the beam is translated along a path 1823 of the surface of the material workpiece 1651. The path 1823 is nonlinear, and electro-optic beam control can be applied to rotate the intensity distribution 1822 to an orientation 1822' as needed for the change in direction of travel of the laser beam with respect to the workpiece. In this way, the intensity distribution can be appropriately rotated, even without rotating the actual laser beam using bulk optics, for example.

For high speed metal cutting material processing applications, for example, a non-rotationally symmetric beam profile may offer cut speed and cut quality advantages in a specific direction of travel with respect to one of the orientations of the beam profile. The AFBASMC can be adjusted as the machine traces a path to keep the beam profile aligned for optimum processing speed or quality.

Spatial Light Modulation Details for Certain Embodiments

Figure 19A:
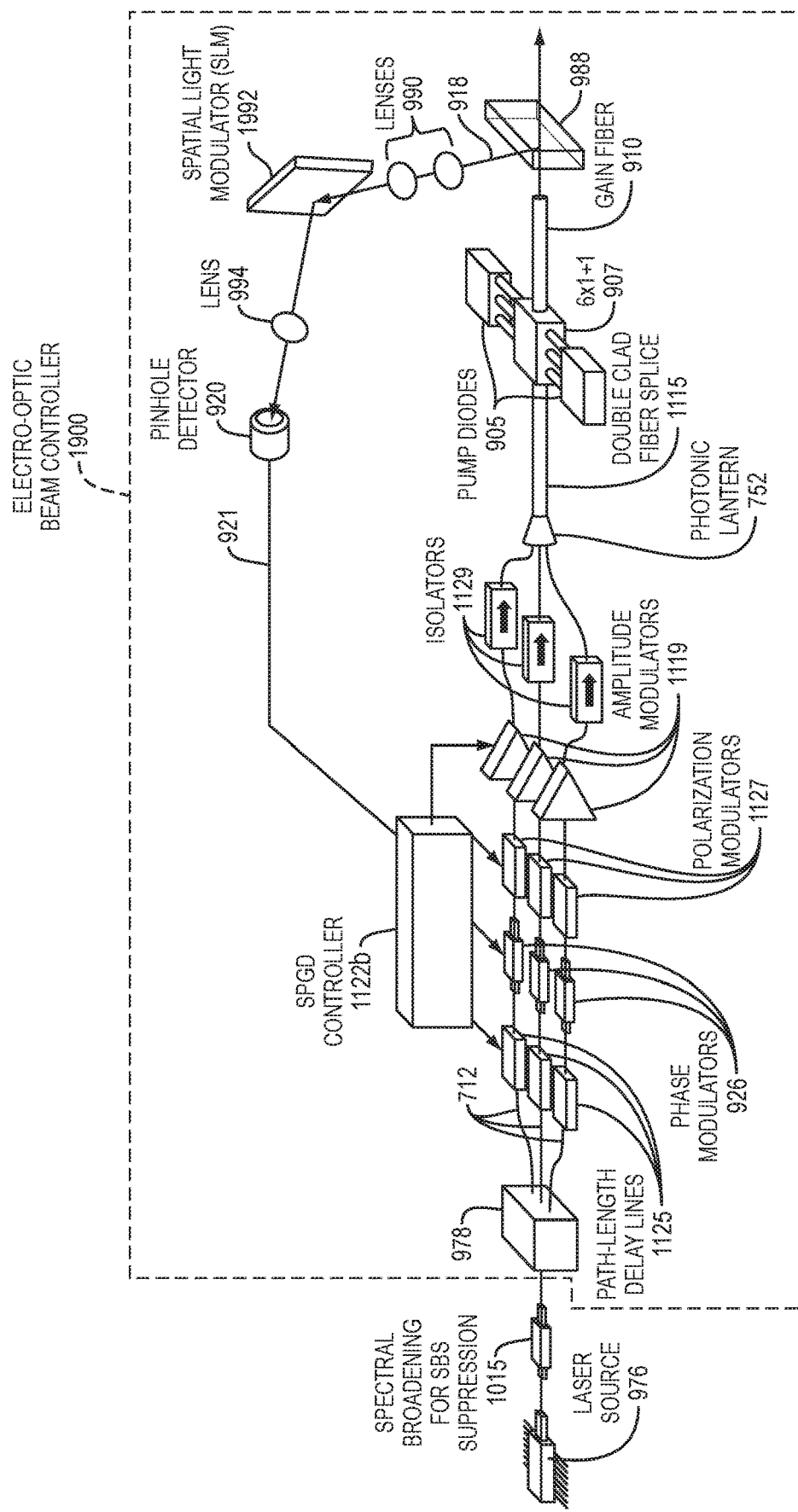
FIG. 19A is a schematic block diagram illustrating an embodiment electro-optic beam controller similar to that of FIG. 11B, except with a spatial light modulator incorporated.

FIG. 19A is a schematic block diagram illustrating an embodiment electro-optic beam controller 1900. The controller 1900 is similar in many respects to the controller 1100b illustrated in FIG. 11B, except that a spatial light modulator 1992 is incorporated for more flexible and dynamic mode control. The lenses 990 illustrated in FIG. 9H are incorporated to focus and direct the light 918 appropriately onto the spatial light modulator 1992, and the lens 994 illustrated in FIG. 9H is also used in FIG. 19A to focus light diffracted from the spatial light modulator 1992 appropriately onto the pinhole detector 920.

In particular, an SPGD controller can be used, in the embodiment of FIG. 19A and other embodiments, to excite the fundamental mode in a three-moded fiber. The fundamental mode is the only mode in a three-moded fiber to have an on-axis intensity component, and this fact can be exploited for SLM control. The control loop of FIG. 19A can seek to optimize the intensity on-axis using a pinhole mask with the detector, and thereby optimize the power in the fundamental mode.

In other circumstances, it may be of interest to use multimode (common) fibers with larger number of available modes. As mode content (the number of available modes) increases, the fibers may begin to guide other modes, including members of a set of LP0$m$ modes, which also contain an on-axis component. Under these circumstances, it can be helpful to provide sufficient discrimination between the desired LP01 mode and the higher order LP0$m$ modes by providing a correlation mask between the detector and the output of the fiber, as illustrated in FIG. 19A. In yet other embodiments, it may be desirable to excite another mode besides the LP01. This may also be accomplished by using a suitable correlation mask. In view of the present disclosure, a person of ordinary skill in the art of optical masking would recognize that there are several ways to implement such a correlation mask. Some ways include using a computer-generated hologram, or, as described hereinabove, using a programmable correlation mask using a spatial light modulator.

Three key parts of implementing a correlation mask can include: (a) The output of the fiber can be imaged onto the mask. In FIG. 19A, this is accomplished by using two lenses which act as a telescope. (b) The mask function f(x,y) can then multiply the incoming beam w(x,y). (c) A lens can then be used to produce the Fourier transform of the product f(x,y)w(x,y) in the Fourier plane of the lens. A person of ordinary skill in the art will recognize that f(x,y) may be approximated by using a spatial light modulator with a pattern that approximates the mask f(x,y) by varying the diffraction efficiency in such a way that the multiplication f(x,y) and w(x,y) is accomplished in a diffracted order. Using this approach, the LP11 modes described in connection with FIG. 19B have been generated in a fiber.

Figure 19B:
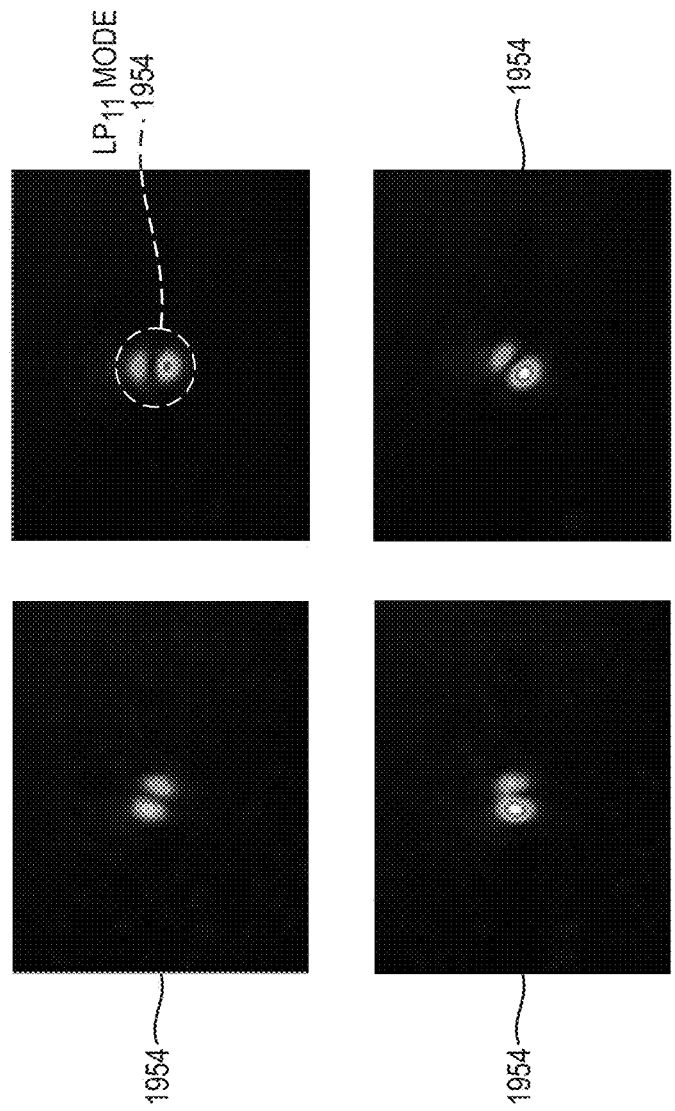
FIG. 19B is a series of beam profile measurements of the output beam in FIG. 19A, rotated by electro-optic beam control.

Using the principles of Fourier optics, it is known that the zero spatial frequency component, or the on-axis beam, then produces an intensity proportional to the correlation of f(x,y) and w(x,y). Therefore, by placing a pinhole in this plane, the intensity on-axis can be sensed and thereby close the feedback loop on the correlation of f(x,y) and w(x,y). Since the modes are orthogonal, if f(x,y) is set to a desired mode, then the on-axis signal will reflect the component of w(x,y) that has a projection of the mode on f(x,y). For example, to excite the LP11 mode in a given orientation, a mask with the LP11 phase and amplitude can be imprinted on the correlation mask. The feedback loop can then maximize the output to produce a maximum correlation with the LP11 mode. FIG. 19B shows results of producing, and controlling rotation of, an LP11 mode output beam using the electro-optic controller of FIG. 19A.

FIG. 19B is a series of beam profile measurements of the output beam 918 in FIG. 19A. The beam profile measurements show an LP11 mode 1954, similar to the modes illustrated in FIG. 8C at 854$b$ and 854$d$, but rotated to various arbitrary orientations using the apparatus illustrated in FIG. 19A.

Development and Control of High-Power Beams for Certain Embodiments

Figure 20A:
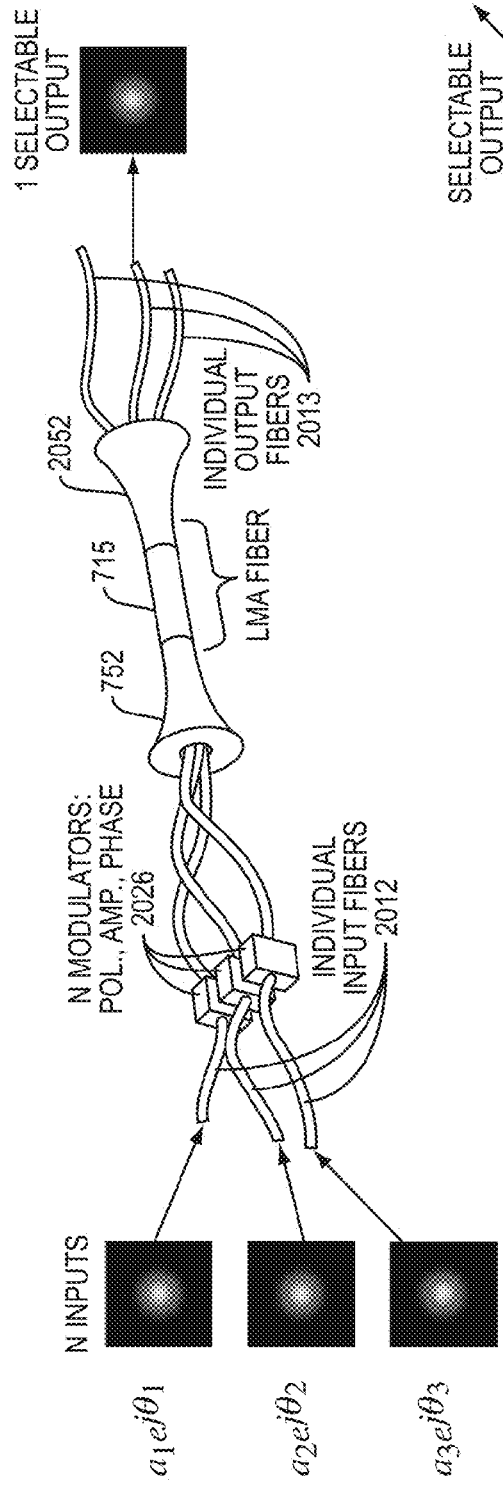
FIG. 20A is a schematic block diagram illustrating components of a waveguide-based amplifier that can be used in connection with other embodiment devices and methods described herein.

FIG. 20A is a schematic block diagram illustrating components of a waveguide-based amplifier that can be used in connection with other embodiment devices and methods described herein. It should be understood that, while the embodiments described in connection with FIGS. 20A-20B are fiber-based, other optical waveguides can be used in similar configurations in other embodiments not illustrated.

Individual input fibers 2012 carry individual single mode input beams. Modulators 2026 can include polarization, amplitude, and phase modulation, or a combination of one or more of these. The photonic lantern fiber-based waveguide coupler 752 is fiber-spliced to the optical gain, active, multimode fiber 715, which, together with an output of the photonic lantern 752, constitutes a large mode area (LMA) fiber.

The embodiment of FIG. 20A further includes a reciprocal photonic lantern 2052, which is similar to the reciprocal photonic lantern 1801 illustrated in FIG. 18D and is capable of handling high power produced at the output of the LMA fiber 715. By appropriate modulation control of the individual input beams carried by the fibers 2012, individual output fibers 2013, which are tapered into the reciprocal lantern 2052, are individually addressable. In some embodiments, the individual output fibers 2013 are multimode fibers. The one or more spatial modes represented in an output from the photonic lantern 752 and LMA gain fiber 715 can be set such that the amplified common beam output from the gain fiber 715 is selectively routed to one or more of the individual output fiber waveguides 2013. This selective routing can be in accordance with principles described hereinabove in reference to material processing, for example. In this manner, the embodiment of FIG. 20A can function as a high-power optical switch.

Figure 20B:
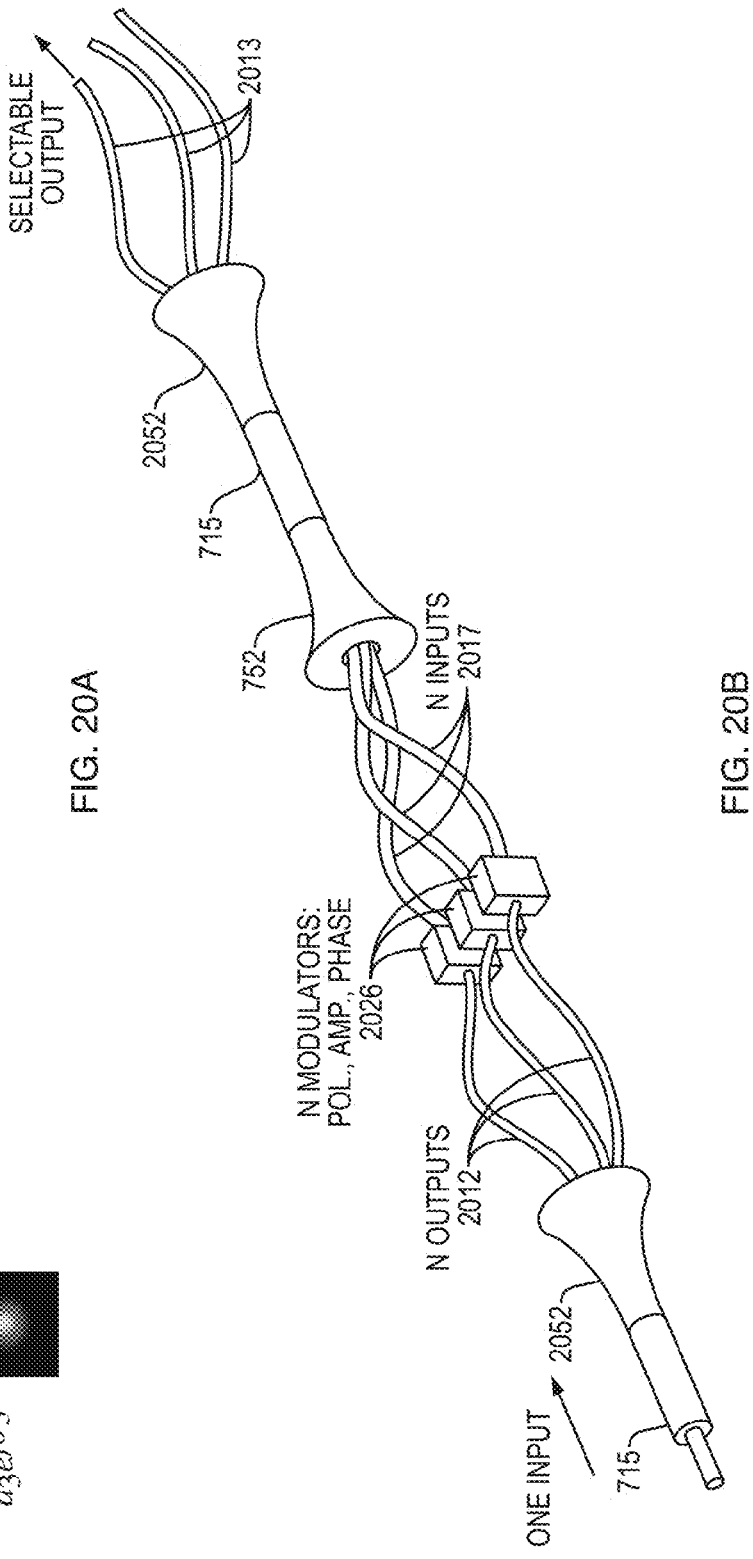
FIG. 20B illustrates the fiber-based amplifier of FIG. 20A modified to receive inputs that are outputs from another photonic lantern that handles an amplified beam.

FIG. 20B illustrates the fiber-based amplifier of FIG. 20A. However, the embodiment of FIG. 20B is modified, such that the inputs 2012 to the photonic lantern 752 are, in turn, N outputs 2012 from another reciprocal photonic lantern fiber-based waveguide coupler 2052 that handles an amplified beam. Thus, the inputs 2012 to the photonic lantern 752 are amplified outputs from the photonic lantern 2052. The amplified outputs 2012 may be referred to as pre-amplified in the sense that the amplification provided by the fiber 715 at the input to the left-most photonic lantern in FIG. 20 (optically upstream from the photonic lantern 752) provides initial amplification to the outputs 2012 prior to being input to the photonic lantern 752 and then further amplified after being output (toward the right of FIG. 20B) and further amplified in the downstream direction toward the right of FIG. 20B. It will also be recognized that the N inputs 2012 can be outputs from respective photonic lanterns, such as multiple lanterns similar to the reciprocal lantern 2052, or similar to the array of independently controlled (modulated) lanterns 752a-b illustrated in FIG. 14. As such, it should be understood that in various embodiments, chains of photonic lanterns, reciprocal photonic lanterns In some embodiments not shown in the figures, modulation of amplitude can be accomplished by changing path length of a waveguide-based interferometer. Furthermore, in yet other embodiments not specifically shown, a variable-loss mechanism may be introduced to the individual input beam paths to perform amplitude modulation. However, amplitude modulation in certain embodiments can also be performed using modulation of phase, as described in connection with FIG. 20C, for additional advantages described hereinafter.

Figure 20C:
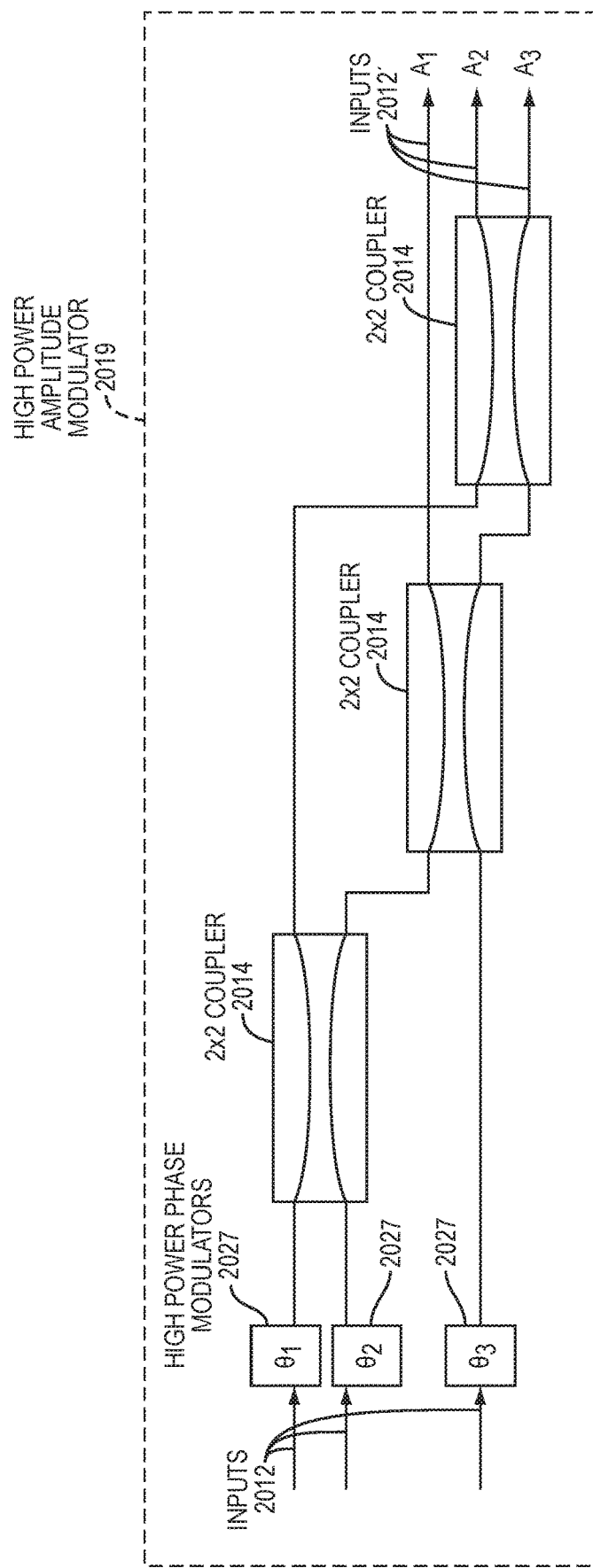
FIG. 20C is a schematic diagram illustrating a high-power amplitude modulator, based on phase modulation and beam combining, that can be used to modulate amplitude of high-power beams in various embodiments.

FIG. 20C is a schematic diagram illustrating a high-power amplitude modulator 2019. The modulator 2019 can be used to modulate amplitude of high-power beams in various embodiments. Furthermore, the arrangement illustrated in FIG. 20C, while designated as handling high-power, can also be implemented in embodiments that only include amplitude modulation of low-power inputs. For example, the high-power amplitude modulator 2019 can be used to replace the three amplitude modulators 1119 illustrated in FIG. 19A. The amplitude modulator 2019 can also be used to implement the amplitude modulator function in FIG. 11A (1126), or the amplitude modulation function in FIG. 11B (1119), for example.

Nonetheless, the amplitude modulator 2019 is particularly useful in the case of modulating amplitude of high-powered beams, such as that illustrated in FIG. 20B. As one example, the amplitude modulator 2019 may replace the three modulators 2026 illustrated in FIG. 20B. Alternatively, if the modulators 2026 also include separate modulation other than amplitude modulation, then the amplitude modulator 2019 may form part of the N modulators 2026 in FIG. 20B. The N inputs 2012 illustrated in FIG. 20B, which are N outputs from a photonic lantern 2052 that carries high power, are received by the amplitude modulator 2019. High-power phase modulators 2027, which can be controlled by an SPGD controller, are again applied to the individual inputs 2012 to modulate phase. The individual inputs 2012 are then routed through a series of three 2×2 couplers 2014 to produce N inputs 2012' with modified amplitudes A1, A2, and A3, respectively. The N inputs 2012' can then be input into the photonic lantern 752 illustrated in FIG. 20B, in place of the N inputs 2012, for example.

One advantage of the phase-based amplitude modulation illustrated in FIG. 20C is the ability to vary amplitude in an energy-conserved manner. If there is a power decrease at one output channel 2012', then, in accordance with interference and energy conservation principles, power can increase by a corresponding amount at one or more other output channels 2012'.

While this invention has been particularly shown and described with reference to example embodiments thereof, it will be understood by those skilled in the art that various changes in form and details may be made therein without departing from the scope of the invention encompassed by the appended claims.

What is claimed is:

1. An electro-optic beam controller comprising:
    an actively controlled, waveguide-based optical spatial mode conversion device, the device including a plurality of individual, input optical waveguides and a common, multimode output optical waveguide, the conversion device comprising:
        a coupler configured to combine individual light beams carried by the respective, individual, optical waveguides into a common light beam to be carried by the common, multimode optical waveguide;
        a sensor configured to measure at least one characteristic of the common light beam; and
        a modulation controller operationally coupled to the sensor and to a plurality of modulators, each modulator of the plurality of modulators configured to modulate at least one optical parameter of one of the respective individual light beams, the modulation controller being further configured to control the plurality of modulators, based on the at least one characteristic of the common light beam, to set the one or more optical spatial modes of the common light beam.

2. The beam controller of claim 1, wherein the coupler is a photonic lantern.

3. The beam controller of claim 1, wherein the respective, individual optical waveguides include single-mode or multimode optical fibers.

4. The beam controller of claim 1, wherein the common, multimode optical waveguide is configured to produce optical gain.

5. The beam controller of claim 1, wherein the common, multimode optical waveguide is a multimode optical fiber that includes a fiber core with a diameter in a range of 20 to 200 μm.

6. The beam controller of claim 1, wherein the sensor is a pixel array configured to measure at least one characteristic of the common light beam after the common light beam exits the common, multimode optical waveguide.

7. The beam controller of claim 1, wherein the at least one characteristic of the common light beam is an on-axis intensity of the common light beam at a center position for a fundamental spatial mode.

8. The beam controller of claim 1, further comprising a mask configured to pass light corresponding to one or more mode shapes of the one or more spatial modes of the common light beam to the sensor.

9. The beam controller of claim 1, wherein the plurality of modulators includes at least one of a phase modulator, amplitude modulator, and polarization modulator.

10. The beam controller of claim 1, wherein the modulation controller is further configured to control the plurality of modulators by adjusting phase of at least a subset of the respective light beams to steer the common light beam.

11. The beam controller of claim 10, wherein the modulation controller is further configured to beam steer the common light beam toward a selected one of an array of multimode optical waveguides to function as an optical switch.

12. The beam controller of claim 1, wherein the modulation controller is further configured to control the plurality of modulators to set a fundamental spatial mode and to suppress other spatial modes in the common, multimode optical waveguide.

13. The beam controller of claim 12, wherein the fundamental spatial mode carries between 90% and 100% of a total optical power carried by the common waveguide.

14. The beam controller of claim 1, wherein the common light beam has an optical power on the order of 10 W.

15. The beam controller of claim 1, wherein the common light beam has an optical power on the order of 3 kW or on the order of 12 kW.

16. The beam controller of claim 1, wherein the modulation controller is further configured to control the plurality of modulators to set a doughnut-shaped spatial mode of the common light beam.

17. The beam controller of claim 1, wherein the modulation controller is configured to control the plurality of modulators during alternating adjustment and fixed periods, the controller being configured to adjust the plurality of modulators to optimize the one or more set spatial modes of the common light beam during adjustment periods, the controller being further configured to leave the plurality of modulators at constant values during fixed periods.

18. The beam controller of claim 1, wherein the respective, individual, optical waveguides are input waveguides, and wherein the waveguide coupler further includes a plurality of individual, optical output waveguides tapered into the common, multimode optical waveguide, and wherein the modulation controller is further configured to set the one or more spatial modes of the common light beam to route the common light beam selectively to one or more of the output optical waveguides.

19. The beam controller of claim 1, wherein the plurality of modulators are phase modulators, and wherein the modulation controller is further configured to control the phase modulators to modulate an amplitude of the common light beam.

20. An electro-optic beam controller comprising:
  means for applying active control to convert one or more optical spatial modes in a waveguide, the means for applying active control comprising:
    means for combining a plurality of individual light beams carried by respective, individual, input optical waveguides into a common light beam to be carried by a common, multimode output optical waveguide;
    means for monitoring at least one characteristic of the common light beam; and
    means for controlling at least one optical parameter in each, respective individual light beam of the plurality of individual light beams, based on the at least one characteristic of the common light beam, to set one or more spatial modes of the common light beam.

21. A material processing apparatus comprising the electro-optic beam controller of claim 1, wherein:
  the actively controlled, waveguide-based optical spatial mode conversion device is configured to output a common light beam,
  the apparatus further comprising one or more delivery optics configured to deliver at least a portion of the common light beam to a material workpiece to be processed.

22. The beam controller of claim 1, wherein the conversion device forms at least part of at least one of a communications system, imaging system, laser radar system, fiber laser amplifier, or laser material processing system.

* * * * *